United States Patent
DeBruin et al.

(10) Patent No.: US 12,454,604 B2
(45) Date of Patent: Oct. 28, 2025

(54) TREATED WASTE PLASTIC MATERIALS

(71) Applicant: Eastman Chemical Company, Kingsport, TN (US)

(72) Inventors: Bruce Roger DeBruin, Gray, TN (US); Kyle Lyn Collings, Jonesborough, TN (US); Robert Ryan Stanley, Church Hill, TN (US)

(73) Assignee: Eastman Chemical Company, Kingsport, TN (US)

( * ) Notice: Subject to any disclaimer, the term of this patent is extended or adjusted under 35 U.S.C. 154(b) by 634 days.

(21) Appl. No.: 17/759,457

(22) PCT Filed: Feb. 10, 2021

(86) PCT No.: PCT/US2021/017330
§ 371 (c)(1),
(2) Date: Jul. 26, 2022

(87) PCT Pub. No.: WO2021/163096
PCT Pub. Date: Aug. 19, 2021

(65) Prior Publication Data
US 2023/0087754 A1 Mar. 23, 2023

Related U.S. Application Data

(60) Provisional application No. 62/972,267, filed on Feb. 10, 2020.

(51) Int. Cl.
| | |
|---|---|
| C08G 63/00 | (2006.01) |
| A61L 11/00 | (2006.01) |
| B29B 17/02 | (2006.01) |
| C08J 11/06 | (2006.01) |
| C08L 23/00 | (2006.01) |
| C08L 67/02 | (2006.01) |
| B29K 23/00 | (2006.01) |
| B29K 27/06 | (2006.01) |
| B29K 67/00 | (2006.01) |

(52) U.S. Cl.
CPC .............. *C08J 11/06* (2013.01); *A61L 11/00* (2013.01); *B29B 17/02* (2013.01); *C08L 23/00* (2013.01); *C08L 67/02* (2013.01); *B29B 2017/0203* (2013.01); *B29B 2017/0244* (2013.01); *B29K 2023/00* (2013.01); *B29K 2027/06* (2013.01); *B29K 2067/003* (2013.01); *C08J 2323/00* (2013.01); *C08J 2367/02* (2013.01); *C08J 2427/06* (2013.01); *C08J 2467/02* (2013.01); *C08L 2201/22* (2013.01); *C08L 2207/20* (2013.01)

(58) Field of Classification Search
USPC ................ 521/48.5; 528/190, 193, 194
See application file for complete search history.

(56) References Cited

U.S. PATENT DOCUMENTS

| | | | | |
|---|---|---|---|---|
| 4,338,243 | A | * | 7/1982 | Hecht ............... C08K 3/18 524/297 |
| 4,617,111 | A | * | 10/1986 | Grimm ............. B29B 17/02 209/4 |
| 4,728,045 | A | | 3/1988 | Tomaszek |
| 4,849,116 | A | | 7/1989 | Weinmann et al. |
| 5,248,041 | A | | 9/1993 | Deiringer et al. |
| 5,253,813 | A | | 10/1993 | Belliveau et al. |
| 5,358,119 | A | | 10/1994 | Stahl et al. |
| 5,513,807 | A | | 5/1996 | Stricker |
| 6,197,838 | B1 | | 3/2001 | Scwartz et al. |
| 6,460,788 | B1 | | 10/2002 | De Feraudy |
| 10,544,276 | B2 | | 1/2020 | Charra et al. |
| 2002/0011303 | A1 | | 1/2002 | Eastman |
| 2003/0134914 | A1 | | 7/2003 | Inagaki |
| 2005/0004390 | A1 | | 1/2005 | Nakao et al. |
| 2006/0074136 | A1 | | 4/2006 | Smith et al. |
| 2008/0190819 | A1 | | 8/2008 | Schlummer et al. |
| 2009/0194465 | A1 | | 8/2009 | Toida et al. |
| 2012/0174369 | A1 | | 7/2012 | Ming et al. |
| 2012/0245257 | A1 | | 9/2012 | Fascio |
| 2013/0210964 | A1 | | 8/2013 | Cernohous et al. |
| 2015/0193973 | A1 | | 7/2015 | Lee et al. |

(Continued)

FOREIGN PATENT DOCUMENTS

| | | |
|---|---|---|
| CN | 104 284 925 B | 5/2017 |
| EP | 1227075 A1 | 7/2002 |

(Continued)

OTHER PUBLICATIONS

DeMarco I et al: "Pyrolysis of the rejects of a waste packaging separation and classification plant," Journal of Analytical and Applied Pyrolysis, Elsevier BV, NL, vol. 85, No. 1-2, May 1, 2009; pp. 384-391.
Dodbiba, G. et al., "Combination of sink-float separation and flotation technique for purification of shredded PET-bottle from PE or PP flakes," International Journal of Mineral Processing, 2002, vol. 65, No. 1, pp. 11-29.
Lopez A et al: "Pyrolysis of municipal plastic wastes: Influence of raw material composition," Waste Management, Elsevier, New York, NY; vo. 30, No. 4, Apr. 1, 2010; pp. 620-627.
Notification of Transmittal of the International Search Report and the Written Opinion of the International Searching Authority with Date of Mailing May 27, 2021 for International Application No. PCT/US2021/017317.

(Continued)

*Primary Examiner* — Terressa Boykin
(74) *Attorney, Agent, or Firm* — Dennis V. Carmen

(57) ABSTRACT

Isolated quantities of plastic solids having greater than 70% by weight polyethylene terephthalate (PET) also include a) from 0.1% to 10% by weight polyvinyl chloride (PVC), and a moisture content of less than 4% by weight, or b) from 0.05% to 10% or 0.1% to 4% by weight halogens, or c) from 0.1% to 4% by weight polyvinyl chloride (PVC), and at least 0.1% by weight of solid materials that do not phase change below 270° C. and 1 atm. The quantities of these solid plastics are suitable for use as feedstocks to various chemical recycling processes.

13 Claims, 15 Drawing Sheets

(56) References Cited

U.S. PATENT DOCUMENTS

| | | |
|---|---|---|
| 2017/0008826 A1 | 1/2017 | Essaddam |
| 2017/0182500 A1 | 6/2017 | Tamir |
| 2017/0268773 A1 | 9/2017 | Wui |
| 2019/0275486 A1 | 9/2019 | Peltekis et al. |

FOREIGN PATENT DOCUMENTS

| | | |
|---|---|---|
| EP | 1 234 812 A1 | 8/2002 |
| JP | H07 197041 A | 8/1995 |
| JP | 07-308922 A | 11/1995 |
| JP | 09-192533 A | 7/1997 |
| JP | 2001-347543 A | 12/2001 |
| JP | 2002-086448 A | 3/2002 |
| JP | 2002 167469 A | 6/2002 |
| JP | 2004 231855 A | 8/2004 |
| JP | 2006-016594 A | 1/2006 |
| JP | 2006-110531 A | 4/2006 |
| JP | 2007-125520 A | 5/2007 |
| JP | 2008-095024 A | 4/2008 |
| JP | 2009-167274 A | 7/2009 |
| JP | 2011-136467 A | 7/2011 |
| WO | WO 2009/010435 A2 | 1/2009 |
| WO | WO 2016/123558 A1 | 8/2016 |
| WO | WO 2019/174656 A1 | 9/2019 |

OTHER PUBLICATIONS

Notification of Transmittal of the International Search Report and the Written Opinion of the International Searching Authority with Date of Mailing Jun. 1, 2021 for International Application No. PCT/US2021/017322.
Notification of Transmittal of the International Search Report and the Written Opinion of the International Searching Authority with Date of Mailing Jun. 2, 2021 for International Application No. PCT/US2021/017330.
Notification of Transmittal of the International Search Report and the Written Opinion of the International Searching Authority with Date of Mailing May 28, 2021 for International Application No. PCT/US2021/017333.
Notification of Transmittal of the International Search Report and the Written Opinion of the International Searching Authority with Date of Mailing Sep. 10, 2021 for International Application No. PCT/US2021/026967.
Notification of Transmittal of the International Search Report and the Written Opinion of the International Searching Authority with Date of Mailing Sep. 3, 2021 for International Application No. PCT/US2021/026975.
Notification of Transmittal of the International Search Report and the Written Opinion of the International Searching Authority with Date of Mailing Sep. 3, 2021 for International Application No. PCT/US2021/026978.
Notification of Transmittal of the International Search Report and the Written Opinion of the International Searching Authority with Date of Mailing Aug. 27, 2021 for International Application No. PCT/US2021/026981.
Notification of Transmittal of the International Search Report and the Written Opinion of the International Searching Authority with Date of Mailing Sep. 9, 2021 for International Application No. PCT/US2021/026985.
Notification of Transmittal of the International Search Report and the Written Opinion of the International Searching Authority with Date of Mailing Sep. 16, 2021 for International Application No. PCT/US2021/026963.
Notification of Transmittal of the International Search Report and the Written Opinion of the International Searching Authority with Date of Mailing Sep. 23, 2021 for International Application No. PCT/US2021/026970.
Co-pending U.S. Appl. No. 17/759,457, filed Jul. 26, 2022; DeBruin et al. Published as US 2023-0087754.
Co-pending U.S. Appl. No. 17/759,440, filed Jul. 26, 2022; DeBruin et al. Published as US 2023-0078550.
US Third Party Observation with Submission Date of Sep. 22, 2023 for U.S. Appl. No. 17/7589457.
Third Party Submission Under 37 CFR 1.290 Concise Description of Relevance with Submission Date of Sep. 22, 2023 for U.S. Appl. No. 17/7589457.
US Third Party Observation with Submission Date of Sep. 27, 2023 for U.S. Appl. No. 17/7589457.
Third Party Submission Under 37 CFR 1.290 Concise Description of Relevance with Submission Date of Sep. 27, 2023 for U.S. Appl. No. 17/7589457.
Co-pending U.S. Appl. No. 17/759,438, filed Jul. 26, 2022; Bruce Roger DeBruin et al.
Co-pending U.S. Appl. No. 17/759,458, filed Jul. 26, 2022; Bruce Roger DeBruin et al.; now U. S. Publication No. 2023-0070962.
Chen, Feifei et al; Kinetics of Glycolysis of Poly(ethylene terephthalate) Under Microwave Irradiation; Journal Applied Polymer Science; 2012; 7 pages.
Al-Salem, S. M. et al. Recycling and recovery routes of plastic solid waste (PSW): A review Waste Management 29 (2009) 2625-2643.†
Lahtela, V. et al. Composition of Plastic Fractions in Waste Streams: Toward More Efficient Recycling and Utilization. Polymers (2019) 11, 69.†
Brouwer, M. T. et al. Predictive model for the Dutch post-consumer plastic packaging recycling system and implications for the circular economy. Waste Management (2018) 71, 62-85.†
Hegberg, B. A. et al. Mixed Plastics Recycling Technology. (1992) Noyes Data Corporation.†
Thoden van Velzen, E. U. et al. Efficiency of recycling post-consumer plastic packages. AIP Conf. Proc. (2017) 1914, 170002-1-170002-5.†
Brouwer, M. T. et al. Predictive model for the Dutch post-consumer plastic packaging recycling system and implications for the circular economy Waste Management (2018) 71, 62-85, Wageningen University & Research.†
Thoden van Velzen, E.U. et al. Technical quality of rPET Food & Biobased Research (2016).†

\* cited by examiner
† cited by third party

TREATED WASTE PLASTIC MATERIALS

CROSS-REFERENCE TO RELATED APPLICATION(S)

This application is a national stage filing under 35 USC § 371 of International Application Number PCT/US2021/017330, filed on, Feb. 10, 2021 which claims the benefit of the filing date to U.S. Provisional Application No. 62/972,267, filed on Feb. 10, 2020, the entire disclosures of which are incorporated by reference herein.

BACKGROUND

Embodiments of the technology are generally directed toward quantities of particulate plastic solids derived from mixed plastic waste that are suitable for use as feedstocks to various chemical recycling processes.

The recycling of plastic materials is viewed as highly desirable across many aspects of society. In addition to reducing the demand for petroleum products to manufacture virgin plastic materials, recycling also provides health and environmental benefits. Recycling initiatives often keep the public mindful not to carelessly discard used plastic items reducing the amount of litter in the environment. Recycling also conserves landfill space and/or reduces the amount of greenhouse gases emitted by municipal incinerators. More and more municipalities are mandating recycling of various materials, including plastics. Thus, in certain regions, sanitation providers are responsible for collecting and disposing of recyclable materials.

It is common that once collected, the recyclables are taken to a municipal recycling facility (also referred to as materials recovery facility or MRF) in which at least some attempt is made to sort them into quantities of like materials. For example, colored plastics can be separated from clear plastics. Glass, paper, and metals can be separated from the plastics. Polyethylene terephthalate (PET) plastics can be separated from other types of plastic. Often, at least some initial aspects of this sorting are performed manually. In other aspects, machines including optical sorters and magnetic sorters are used to conduct a more refined culling of the various materials present in the recyclables.

Once separated, often the recovered plastics are melted, pelletized, or placed in some other form to be ready to create new articles from the plastics. Generally, though, the plastics retain their same, or at least very similar, compositional characteristics and are not transformed into entirely new chemicals.

There is also a push in many aspects of society for manufacturers to create products that include some recycled content. But, as noted above, unless the products are compositional similar to the recycled materials, options for including recycled content in other products is limited. Therefore, a need exists in the art for a way of recycling plastic materials so that the recycled plastics can be used to create new materials with recycled content that are not limited to being of the same composition as the original plastic material recovered through recycling.

SUMMARY

According to one embodiment of the present invention there is provided an isolated quantity of particulate plastic solids comprising greater than 70% by weight polyethylene terephthalate, from 0.1% to 10% by weight polyvinyl chloride, and a moisture content of less than 4% by weight.

According to another embodiment of the present invention there is provided a quantity of particulate plastic solids comprising greater than 70% by weight polyethylene terephthalate and from 0.05% to 10% or 0.1% to 4% by weight halogens.

According to still another embodiment of the present invention there is provided a quantity of particulate plastic solids comprising greater than 70% by weight polyethylene terephthalate, from 0.1% to 4% by weight polyvinyl chloride, and at least 0.1% by weight of solid materials that do not phase change below 270° C. and 1 atm.

According to a further embodiment of the present invention there is provided a quantity of particulate plastic solids comprising at least 50% by weight polyolefins on a dry plastic basis, less than 10% by weight PET on a dry plastic basis, and less than 10,000 ppm of halogens, on a dry plastic basis.

According to yet another embodiment of the present invention there is provided a quantity of particulate plastic solids comprising at least 50% by weight polyolefins on a dry plastic basis, a moisture content of less than 4% by weight, and at least 0.1% by weight nylons and/or at least 0.001% by weight multicomponent polymers on a dry plastic basis.

According to another embodiment of the present invention there is provided a quantity of particulate plastic solids comprising at least 50% by weight polyolefins on a dry plastic basis, less than 10,000 ppm halogens on a dry plastic basis, and at least 0.1% by weight of solid materials that do not phase change below 270° C. and 1 atm.

In still a further embodiment of the present invention there is provided at least first and second co-located quantities of plastic solids. The first quantity of plastic solids comprises plastic solids that have not been processed to reduce the level of microorganisms thereon, and the second quantity of plastic solids comprises plastic solids that have been processed to reduce the level of microorganism thereon.

In yet a further embodiment of the present invention there is provided at least first and second co-located quantities of plastic solids that have been processed to reduce the level of microorganisms thereon. The first quantity of plastic solids is enriched in polyolefins relative to the second quantity of plastic solids, and the second quantity of plastic solids is enriched in polyethylene terephthalate relative to said first quantity of plastic solids.

DETAILED DESCRIPTION

When a numerical sequence is indicated, it is to be understood that each number is modified the same as the first number or last number and is in an "or" relationship, i.e. each number is "at least," or "up to" or "not more than" as the case may be. For example, "at least 10 wt. %, 20, 30, 40, 50, 75 . . . " means the same as "at least 10 wt. %, or at least 20 wt. %, or at least 30 wt. %, or at least 40 wt. %, or at least 50 wt. %, or at least 75 wt. %," etc.

All concentrations or amounts are by weight unless otherwise stated.

Weight percentages expressed on the MPW are the weight of the MPW as fed to the first stage separation and prior to addition of any diluents/solutions such as salt or caustic solutions.

References to MPW throughout this description also provide support for particulate plastics or MPW particulates or size reduced plastics or a plastics feedstock to the separation process. For example, references to weight percentages of ingredients in the MPW also describes and provides support for those same weight percentages on particulate plastics or size reduced plastics or the plastics as fed to the first stage separation prior to combining them with caustic or salt solutions.

Figure 1:
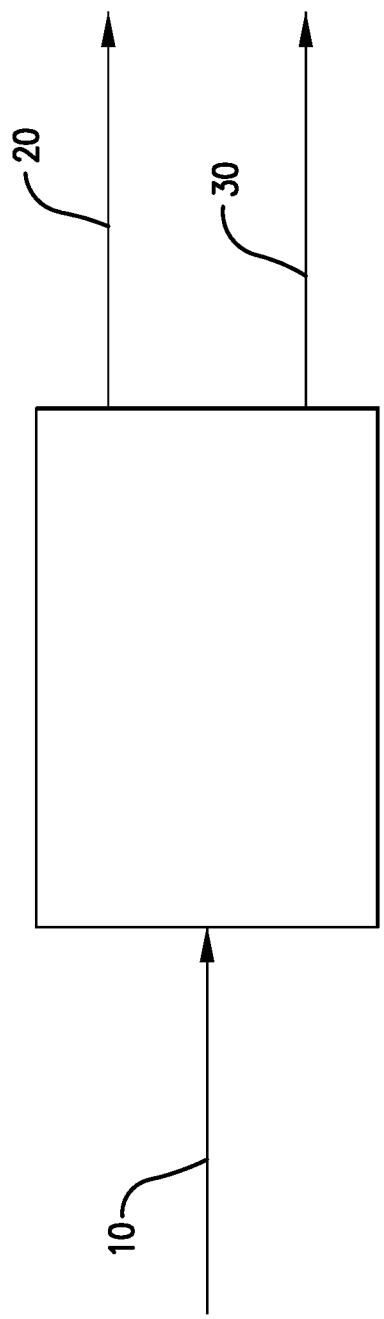
FIG. 1 depicts a general process for separating mixed plastic waste (MPW) into a polyethylene terephthalate (PET)-enriched stream and a PET-depleted stream according to one embodiment of the present invention.

Generally described herein are methods for waste plastic separation, as well as facilities and systems for handling of particulate plastic solids obtained from the waste plastic separation system. As depicted in FIG. 1, in one embodiment or in combination with any of the mentioned embodiments, the method generally comprises separating a mixed plastic waste (MPW) 10 into a polyethylene terephthalate (PET)-enriched stream 20 and a PET-depleted stream 30. In one embodiment or in combination with any of the mentioned embodiments, the PET-enriched stream 20 comprises at least two PET-enriched streams, which may have the same or different compositions. Additionally, in one embodiment or in combination with any of the mentioned embodiments, the PET-depleted stream 30 comprises at least two PET-depleted streams. In one embodiment or in combination with any of the mentioned embodiments, the separating comprises the use of one or more density separation stages. Although they comprise different compositions, each of the PET-enriched stream(s) 20 and the PET-depleted stream(s) 30 comprises at least 90 weight percent plastic materials. Further, the concentration of PET in the PET-depleted stream 30 is lower than the concentration of PET in the PET-enriched stream 20, and the concentration in the PET-enriched stream 20 is higher than the concentration of PET in the PET-depleted stream 30.

The mixed plastic waste (MPW) may be provided in a variety of forms. For example, the MPW may be in the form of whole articles, particulates (e.g., comminuted, pelletized, fiber plastic particulates), bound bales (e.g., whole articles compressed and strapped), unbound articles (i.e., not in bales or packaged), containers (e.g., box, sack, trailer, railroad car, loader bucket), piles (e.g., on a concrete slab in a building), and/or loose materials conveyed physically (e.g., particulates on a conveyor belt) or pneumatically (e.g., particulates mixed with air in a convey pipe). The MPW may be provided from a variety of sources, including but not limited to, municipal recycling facilities or reclaimer facilities or other mechanical or chemical sorting or separation facilities, manufacturers or mills or commercial production facilities or retailers or dealers or wholesalers in possession of post-industrial and pre-consumer recyclables, directly from households/businesses (i.e., unprocessed recyclables), landfills, or on docks or ships or warehouses thereon.

The plastics include any organic synthetic polymers that are solid at 25° C. at 1 atm. The polymers can be thermoplastic or thermosetting polymers. The polymer number average molecular weight can be at least 300, or at least 500, or at least 1000, or at least 5,000, or at least 10,000, or at least 20,000, or at least 30,000, or at least 50,000 or at least 70,000 or at least 90,000 or at least 100,000 or at least 130,000. The weight average molecular weight of the polymers can be at least 300, or at least 500, or at least 1000, or at least 5,000, or at least 10,000, or at least 20,000, or at least 30,000, or at least 50,000, or at least 70,000, or at least 90,000, or at least 100,000, or at least 130,000, or at least 150,000, or at least 300,000.

In one embodiment or in combination with any of the mentioned embodiments, the polymer number average molecular weight can be at least 300, or at least 1000, or at least 5,000, or at least 10,000, or at least 50,000, or at least 130,000. The polymer number average molecular weight can be from 300 to 500,000, or from 1000 to 400,000, or from 5,000 to 300,000, or from 10,000 to 250,000, or from 50,000 to 200,000, or from 100,000 to 150,000. The weight average molecular weight of the polymers can be at least 300, or at least 1000, or at least 10,000, or at least 50,000, or at least 100,000, or at least 150,000, or at least 300,000. The weight average molecular weight of the polymers can be from 300 to 1,000,000, or from 1000 to 750,000, or from 10,000 to 600,000, or from 50,000 to 500,000, or from 100,000 to 450,000, or from 150,000 to 400,000, or from 300,000 to 350,000.

In one embodiment or in combination with any of the mentioned embodiments, the MPW includes post-consumer and/or post-industrial (or pre-consumer) materials.

In one embodiment or in combination with any of the mentioned embodiments, the MPW comprises one or more plastic solids described herein, which may be unprocessed or subject to mechanical size reduction and/or pre-treatment.

Examples of plastics include those that are solid at 25° C. at 1 atm. In one embodiment or in combination with any other embodiments, the MPW includes, but is not limited to, plastic components, such as polyesters, including those having repeating aromatic or cyclic units such as those containing a repeating terephthalate or naphthalate units such as PET and PEN, or those containing repeating furanate repeating units, and although within the definition of PET, it is worth mentioning also those polyesters having repeating terephthalate units and one or more residues or moieties of TMCD (2,2,4,4-tetramethyl-1,3-cyclobutanediol), CHDM (cyclohexanedimethanol), propylene glycol, or NPG (neopentylglycol), isosorbide, isophthalic acid, 1,4-butanediol, 1,3-propane diol, and/or diethylene glycol, or combinations thereof and aliphatic polyesters such as PLA, polyglycolic acid, polycaprolactones, and polyethylene adipates; polyolefins (e.g., low density polyethylene, high density polyethylene, low density polypropylene, high density polypropylene, crosslinked polyethylene, amorphous polyolefins, and the copolymers of any one of the aforementioned polyolefins), polyvinyl chloride (PVC), polystyrene, polytetrafluoroethylene, acrylobutadienestyrene (ABS), cellulosics such as cellulose acetate, cellulose diacetate, cellulose triacetate, cellulose acetate propionate, cellulose acetate butyrate, and regenerated cellulose such as viscose; epoxides, polyamides, phenolic resins, polyacetal, polycarbonates, polyphenylene-based alloys, poly(methyl methacrylate), styrenic containing polymers, polyurethane, vinyl-based polymers, styrene acrylonitrile, thermoplastic elastomers other than tires, and urea containing polymers and melamines.

In one embodiment or in combination with any of the mentioned embodiments, the MPW contains thermosetting polymers. Examples of the amounts of thermosetting polymers present in the MPW can be at least 1 wt. %, or at least 2 wt. %, or at least 5 wt. %, or at least 10 wt. %, or at least 15 wt. %, or at least 20 wt. %, or at least 25 wt. %, or at least 30 wt. %, or at least 40 wt. %, based on the weight of the MPW. The amounts of thermosetting polymers present in the MPW can be at least 1 wt. %, or at least 10 wt. %, or at least 20 wt. %, or at least 40 wt. %, based on the weight of the MPW The amounts of thermosetting polymers present in the MPW can be from 1 to 80 wt. %, or from 10 to 70 wt. %, or from 20 to 60 wt. %, or from 40 to 50 wt. %, based on the weight of the MPW.

In one embodiment or in combination with any of the mentioned embodiments, the MPW contains plastics at least a portion of which are obtained from cellulosics, such as cellulose derivates having an acyl degree of substitution of less than 3, or 1.8 to 2.8, such as cellulose acetate, cellulose diacetate, cellulose triacetate, cellulose acetate propionate, cellulose acetate butyrate.

In one embodiment or in combination with any of the mentioned embodiments, the MPW contains plastics at least a portion of which are obtained from polymers having repeating terephthalate units, such as polyethylene terephthalate, polypropylene terephthalate, polybutylene terephthalate, and copolyesters thereof.

In one embodiment or in combination with any of the mentioned embodiments, the MPW contains plastics at least a portion of which are obtained from copolyesters having multiple dicyclohexane dimethanol moieties, 2,2,4,4-tetramethyl-1,3-cyclobutanediol moieties, or combinations thereof.

In one embodiment or in combination with any of the mentioned embodiments, the MPW contains plastics at least a portion of which are obtained from low density polyethylene, high density polyethylene, linear low-density polyethylene, polypropylene, polymethylpentene, polybutene-1, and copolymers thereof.

In one embodiment or in combination with any of the mentioned embodiments, the MPW contains plastics at least a portion of which are obtained from eyeglass frames, or crosslinked polyethylene.

In one embodiment or in combination with any of the mentioned embodiments, the MPW contains plastics at least a portion of which are obtained from plastic bottles.

In one embodiment or in combination with any of the mentioned embodiments, the MPW contains plastics at least a portion of which are obtained from diapers.

In one embodiment or in combination with any of the mentioned embodiments, the MPW contains plastics at least a portion of which are obtained from Styrofoam, or expanded polystyrene.

In one embodiment or in combination with any of the mentioned embodiments, the MPW contains plastics at least a portion of which are obtained from flashspun high density polyethylene.

In one embodiment or in combination with any of the mentioned embodiments, the MPW contains plastics having or obtained from plastics having a resin ID code numbered 1-7 within the chasing arrow triangle established by the SPI. In one embodiment or in combination with any of the mentioned embodiments, at least a portion of the MPW contains one or more plastics that are not generally mechanically recycled. These would include plastics having numbers 3 (polyvinyl chloride), 5 (polypropylene), 6 (polystyrene), and 7 (other). In one embodiment or in combination with any of the mentioned embodiments, the MPW contains at least 0.1 wt. %, or at least 0.5 wt. %, or at least 1 wt. %, or at least 2 wt. %, or at least 3 wt. %, or at least 5 wt. %, or at least 7 wt. %, or at least 10 wt. %, or at least 12 wt. %, or at least 15 wt. %, or at least 20 wt. %, or at least 25 wt. %, or at least 30 wt. %, or at least 40 wt. %, or at least 50 wt. %, or at least 65 wt. %, or at least 85 wt. %, or at least 90 wt. % plastics having or corresponding to a number 3, 5, 6, 7, or a combination thereof, based on the weight of the plastics in the MPW. The MPW can comprise plastics having or obtained from plastics having at least 30, at least 35, at least 40, at least 45, at least 50, at least 55, at least 60, at least 65, at least 70, at least 75, at least 80, at least 85, at least 90, at least 95, or at least 99 weight percent of at least one, at least two, at least three, or at least four different kinds of resin ID codes.

In one embodiment or in combination with any of the mentioned embodiments, the MPW contains at least 0.1 wt. %, or at least 1 wt. %, or at least 10 wt. %, or at least 25 wt. %, or at least 50 wt. %, or at least 90 wt. % plastics having or corresponding to a number 3, 5, 6, 7, or a combination thereof, based on the weight of the plastics in the MPW. The MPW may contain from 0.1 to 99.9 wt. %, or from 1 to 99 wt. %, or from 10 to 98 wt. %, or from 25 to 97 wt. %, or from 50 to 95 wt. %, or from 90 to 93 wt. % plastics having or corresponding to a number 3, 5, 6, 7, or a combination thereof, based on the weight of the plastics in the MPW. The MPW can comprise plastics having or obtained from plastics having at least 30, at least 50, at least 70, at least 90, at least 95, or at least 99 weight percent of at least one, at least two, at least three, or at least four different kinds of resin ID codes. The MPW can comprise plastics having or obtained from plastics having from 30 to 99, or from 50 to 98, or from 70 to 97, or from 90 to 95 weight percent of from one to four, or from two to three, different kinds of resin ID codes.

In one embodiment or in combination with any of the mentioned embodiments, PET and polyolefins in combination make up at least 50, at least 75, at least 90, at least 95, or at least 99 weight percent of the MPW, on a dry plastic basis. The PET can make up at least 5, at least 10, at least 20, at least 30, at least 40, at least 50, at least 75, at least 90, or at least 95 weight percent of the MPW, on a dry plastic basis. The PVC can make up at least 0.001, at least 0.01, at least 0.05, at least 0.1, or at least 0.25 weight percent and/or not more than 5, not more than 4, not more than 3, not more than 2, not more than 1, not more than 0.75, or not more than 0.5 weight percent of the MPW. The PET and PVC can be in combination in any of these mentioned amounts relative to the weight of the MPW.

In one embodiment or in combination with any of the mentioned embodiments, PET and polyolefins in combination make up at least 50, at least 75, at least 90, at least 95, or at least 99 weight percent of the MPW, on a dry plastic basis. PET and polyolefins in combination can make up from 50 to 99.9, or from 75 to 99, or from 90 to 95 weight percent of the MPW, on a dry plastic basis. PET can make up at least 5, or at least 20, or at least 50, or at least 75, or at least 90 weight percent of the MPW, on a dry plastic basis. PET can make up from 5 to 99, or from 20 to 98, or from 50 to 97, or from 75 to 96, or from 90 to 95 weight percent of the MPW, on a dry plastic basis. PVC can make up from 0.001 to 5, or from 0.01 to 3, or from 0.05 to 2, or from 0.1 to 1, or from 0.25 to 0.75 weight percent of the MPW. The PET and PVC can be in combination in any of these mentioned amounts relative to the weight of the MPW.

In one embodiment or in combination with any of the mentioned embodiments, the MPW comprises multi-component polymers. As used herein, the term "multi-component polymers" refers to articles and/or particulates comprising at least one synthetic or natural polymer combined with, attached to, or otherwise physically and/or chemically associated with at least one other polymer and/or non-polymer solid. The polymer can be a synthetic polymer or plastic, such as PET, olefins, and/or nylons. The non-polymer solid can be a metal, such as aluminum. The multi-component polymers can include metalized plastics. In one embodiment or in combination with any of the mentioned embodiments, the MPW comprises multi-component plastics in the form of multi-layer polymers. As used herein, the term "multi-layer polymers" refers to multi-component polymers comprising PET and at least one other polymer and/or non-polymer solid physically and/or chemically associated together in two or more physically distinct layers. A polymer or plastic is considered a multi-layered polymer even though a transition zone may exist between two layers, such as may be present in adhesively adhered layers or co-extruded layers. An adhesive between two layers is not deemed to be a layer. The multi-layer polymers may comprise a layer comprising PET and a one or more additional layers at least one of which is a synthetic or natural polymer that is different from PET, or a polymer which has no ethylene terephthalate repeating units, or a polymer which has no alkylene terephtalate repeating units (a "non-PET polymer layer"), or other non-polymer solid. Examples of non-PET polymer layers include nylons, polylactic acid, polyolefins, polycarbonates, ethylene vinyl alcohol, polyvinyl alcohol, and/or other plastics or plastic films associated with PET-containing articles and/or particulates, and natural polymers such as whey proteins. The multi-layer polymers may include metal layers, such as aluminum, provided that at least one additional polymer layer is present other than the PET layer. The layers may be adhered with adhesive bonding or other means, physically-adjacent (i.e., articles pressed against the film), tackified (i.e., the plastics heated and stuck together), co-extruded plastic films, or otherwise attached to the PET-containing articles. The multi-layer polymers may comprise PET films associated with articles containing other plastics in the same or similar manner. The MPW may comprise multi-component polymers in the form of PET and at least one other plastic, such as polyolefins (e.g., polypropylene) and/or other synthetic or natural polymers, combined in a single physical phase. For example, the MPW comprises a heterogenous mixture comprising a compatibilizer, PET, and at least one other synthetic or natural polymer plastic (e.g., non-PET plastic) combined in a single physical phase. As used herein, the term "compatibilizer" refers to an agent capable of combining at least two otherwise immiscible polymers together in a physical mixture (i.e., blend).

In one embodiment or in combination with any of the mentioned embodiments, the MPW comprises not more than 20, not more than 10, not more than 5, not more than 2, not more than 1, or not more than 0.1 weight percent nylons, on a dry plastic basis. The MPW can comprise from 0.01 to 20, from 0.05 to 10, from 0.1 to 5, or from 1 to 2 weight percent nylons, on a dry plastic basis. The MPW can comprise not more than 40, not more than 20, not more than 10, not more than 5, not more than 2, or not more than 1 weight percent multi-component polymers, on a dry plastic basis. The MPW can comprise from 0.1 to 40, from 1 to 20, or from 2 to 10 weight percent multi-component polymers, on a dry plastic basis. The MPW can comprise not more than 40, not more than 20, not more than 10, not more than 5, not more than 2, or not more than 1 weight percent multi-layer polymers, on a dry plastic basis. The MPW can comprise from 0.1 to 40, from 1 to 20, or from 2 to 10 weight percent multi-layer polymers, on a dry plastic basis.

In one embodiment or in combination with any of the mentioned embodiments, non-plastic solids make up at least 0.1, at least 1, at least 2, at least 4, or at least 6 weight percent of the MPW and/or not more than 25, not more than 15, not more than 10, not more than 5, or not more than 2.5 weight percent of the MPW. Non-plastic solids can make up from 0.1 to 25, or from 1 to 15, or from 2 to 10 weight percent of the MPW. Non-plastic solids may include inert filler materials (e.g., calcium carbonate, hydrous aluminum silicate, alumina trihydrate, calcium sulfate), metals, rocks, sand, glass, additives (e.g., thixotropes, pigments and colorants, fire retardants, suppressants, UV inhibitors & stabilizers, conductive metal or carbon, release agents such as zinc stearate, waxes, and silicones) and the like.

Non-plastic solids may also comprise cellulosic materials, such as cellulosic fiber materials from cardboard. In one embodiment or in combination with any of the mentioned embodiments, the cellulosic materials make up at least 0.01, at least 0.1, at least 0.2, or at least 0.5 weight percent of the MPW and/or not more than 20, not more than 15, not more than 12, or not more than 10 weight percent of the MPW. The cellulosic materials can make up from 0.01 to 20, from 0.1 to 15, from 0.5 to 10, or from 1 to 5 weight percent of the MPW. Such cellulosic materials may impede the separation of plastic particles, for example in the density separation processes described below. Thus, a friction washer or other process may be used to remove cardboard and/or other cellulosic materials from the MPW prior to feeding the MPW to the plastic separation processes described herein.

In one embodiment or in combination with any of the mentioned embodiments, liquids make up at least 0.01, at least 0.1, at least 0.5, or at least 1 weight percent of the MPW and/or not more than 25, not more than 10, not more than 5, or not more than 2.5 weight percent of the MPW. Liquids can make up from 0.01 to 25, from 0.1 to 10, from 0.5 to 5, or from 1 to 2.5 weight percent of the MPW.

The MPW may contain recycle (post-consumer or post-industrial (or pre-consumer) textiles. Textiles may contain natural and/or synthetic fibers, rovings, yarns, nonwoven webs, cloth, fabrics and products made from or containing any of the aforementioned items. Textiles can be woven, knitted, knotted, stitched, tufted, pressing of fibers together such as would be done in a felting operation, embroidered, laced, crocheted, braided, or nonwoven webs and materials. Textiles as used herein include fabrics, and fibers separated from a textile or other product containing fibers, scrap or off spec fibers or yarns or fabrics, or any other source of loose fibers and yarns. A textile also includes staple fibers, continuous fibers, threads, tow bands, twisted and/or spun yarns, grey fabrics made from yarns, finished fabrics produced by wet processing gray fabrics, and garments made from the finished fabrics or any other fabrics. Textiles include apparels, interior furnishings, and industrial types of textiles. Textiles also include post-industrial textiles or post-consumer textiles or both.

Examples of textiles in the apparel category (things humans wear or made for the body) include sports coats, suits, trousers and casual or work pants, shirts, socks, sportswear, dresses, intimate apparel, outerwear such as rain jackets, cold temperature jackets and coats, sweaters, protective clothing, uniforms, and accessories such as scarves, hats, and gloves. Examples of textiles in the interior furnishing category include furniture upholstery and slipcovers, carpets and rugs, curtains, bedding such as sheets, pillow covers, duvets, comforters, mattress covers; linens, tablecloths, towels, washcloths, and blankets. Examples of industrial textiles include transportation (auto, airplanes, trains, buses) seats, floor mats, trunk liners, and headliners; outdoor furniture and cushions, tents, backpacks, luggage, ropes, conveyor belts, calendar roll felts, polishing cloths, rags, soil erosion fabrics and geotextiles, agricultural mats and screens, personal protective equipment, bullet proof vests, medical bandages, sutures, tapes, and the like.

The nonwoven webs that are classified as textiles do not include the category of wet laid nonwoven webs and articles made therefrom. While a variety of articles having the same function can be made from a dry or wet laid process, the article made from the dry laid nonwoven web is classified as a textile. Examples of suitable articles that may be formed from dry laid nonwoven webs as described herein can include those for personal, consumer, industrial, food service, medical, and other types of end uses. Specific examples can include, but are not limited to, baby wipes, flushable wipes, disposable diapers, training pants, feminine hygiene products such as sanitary napkins and tampons, adult incontinence pads, underwear, or briefs, and pet training pads. Other examples include a variety of different dry or wet wipes, including those for consumer (such as personal care or household) and industrial (such as food service, health care, or specialty) use. Nonwoven webs can also be used as padding for pillows, mattresses, and upholstery, batting for quilts and comforters. In the medical and industrial fields, nonwoven webs of the present invention may be used for medical and industrial face masks, protective clothing, caps, and shoe covers, disposable sheets, surgical gowns, drapes, bandages, and medical dressings. Additionally, nonwoven webs as described herein may be used for environmental fabrics such as geotextiles and tarps, oil and chemical absorbent pads, as well as building materials such as acoustic or thermal insulation, tents, lumber and soil covers and sheeting. Nonwoven webs may also be used for other consumer end use applications, such as for, carpet backing, packaging for consumer, industrial, and agricultural goods, thermal or acoustic insulation, and in various types of apparel. The dry laid nonwoven webs as described herein may also be used for a variety of filtration applications, including transportation (e.g., automotive or aeronautical), commercial, residential, industrial, or other specialty applications. Examples can include filter elements for consumer or industrial air or liquid filters (e.g., gasoline, oil, water), including nanofiber webs used for microfiltration, as well as end uses like tea bags, coffee filters, and dryer sheets. Further, nonwoven webs as described herein may be used to form a variety of components for use in automobiles, including, but not limited to, brake pads, trunk liners, carpet tufting, and under padding.

The textiles can include single type or multiple type of natural fibers and/or single type or multiple type of synthetic fibers. Examples of textile fiber combinations include all natural, all synthetic, two or more type of natural fibers, two or more types of synthetic fibers, one type of natural fiber and one type of synthetic fiber, one type of natural fibers and two or more types of synthetic fibers, two or more types of natural fibers and one type of synthetic fibers, and two or more types of natural fibers and two or more types of synthetic fibers.

Natural fibers include those that are plant derived or animal derived. Natural fibers can be cellulosics, hemicellulosics, and lignins. Examples of plant derived natural fibers include hardwood pulp, softwood pulp, and wood flour; and other plant fibers including those in wheat straw, rice straw, abaca, coir, cotton, flax, hemp, jute, bagasse, kapok, papyrus, ramie, rattan, vine, kenaf, abaca, henequen, sisal, soy, cereal straw, bamboo, reeds, esparto grass, bagasse, Sabai grass, milkweed floss fibers, pineapple leaf fibers, switch grass, lignin-containing plants, and the like. Examples of animal derived fibers include wool, silk, mohair, cashmere, goat hair, horsehair, avian fibers, camel hair, angora wool, and alpaca wool.

Synthetic fibers are those fibers that are, at least in part, synthesized or derivatized through chemical reactions, or regenerated, and include, but are not limited to, rayon, viscose, mercerized fibers or other types of regenerated cellulose (conversion of natural cellulose to a soluble cellulosic derivative and subsequent regeneration) such as lyocell (also known as Tencel), Cupro, Modal, acetates such as polyvinylacetate, polyamides including nylon, polyesters such as PET, olefinic polymers such as polypropylene and polyethylene, polycarbonates, poly sulfates, poly sulfones, polyethers such as polyether-urea known as Spandex or elastane, polyacrylates, acrylonitrile copolymers, polyvinylchloride (PVC), polylactic acid, polyglycolic acid, sulfopolyester fibers, and combinations thereof.

The textiles can be in any of the forms mentioned above, such as size reduction via chopping, shredding, harrowing, confrication, pulverizing, or cutting a feedstock of textiles to make size reduced textiles. The textiles can also be densified. Examples of processes that densify include those that agglomerate the textiles through heat generated by frictional forces or particles made by extrusion or other external heat applied to the textile to soften or melt a portion or all of the textile.

In one embodiment or in combination with any of the mentioned embodiments, the amount of textiles (including textile fibers) in the MPW is at least 0.1 weight percent, or at least 0.5 weight percent, or at least 1 weight percent, or at least 2 weight percent, or at least 5 weight percent, or at least 8 weight percent, or at least 10 weight percent, or at least 15 weight percent, or at least 20 weight percent material obtained from textiles or textile fibers, based on the weight of the MPW. The amount of textiles (including textile fibers) in the MPW can be not more than 50, not more than 40, not more than 30, not more than 20, not more than 15, not more than 10, not more than 8, not more than 5, not more than 2, not more than 1, not more than 0.5, not more than 0.1, not more than 0.05, not more than 0.01, or not more than 0.001 weight percent, based on the weight of the MPW.

In one embodiment or in combination with any of the mentioned embodiments, the amount of textiles (including textile fibers) in the MPW is at least 0.1 weight percent, or at least 1 weight percent, or at least 5 weight percent, or at least 10 weight percent, or at least 20 weight percent material obtained from textiles or textile fibers, based on the weight of the MPW. The amount of textiles (including textile fibers) in the MPW can be from 0.1 to 50 weight percent, or from 1 to 40 weight percent, or from 5 to 35 weight percent, or from 10 to 30 weight percent, or from 20 to 25 weight percent material obtained from textiles or textile fibers, based on the weight of the MPW.

In one embodiment or in combination with any of the mentioned embodiments, the MPW is provided as a waste stream from another processing facility, for example a municipal recycling facility or reclaimer facility. The MPW can comprise a MRF or reclaimer waste stream comprising at least 20, at least 30, at least 40, at least 50, at least 60, at least 70, at least 80, or at least 90 weight percent PET and/or not more than 99, not more than 98, not more than 97, not more than 96, or not more than 95 weight percent PET, on a dry plastics basis. The MPW can comprise a MRF or reclaimer waste stream comprising from 20 to 99, from 50 to 98, from 75 to 97, or from 90 to 95 weight percent PET.

In one embodiment or in combination with any of the mentioned embodiments, the MPW comprises a colored PET waste stream comprising 50 weight percent to 90 weight percent PET, on a dry plastic basis. In one embodiment or in combination with any of the mentioned embodiments, the MPW comprises a wet fines waste stream comprising 25 weight percent to 75 weight percent PET, on a dry plastic basis. In one embodiment or in combination with any of the mentioned embodiments, the MPW comprises an eddy current (metal) waste stream comprising 80 weight percent to 98 weight percent PET, on a dry plastic basis. In one embodiment or in combination with any of the mentioned embodiments, the MPW comprises a flaked waste stream comprising 40 weight percent to 80 weight percent PET, on a dry plastic basis. In one embodiment or in combination with any of the mentioned embodiments, the MPW comprises a plastic dust waste stream comprising 95 weight percent to 99 weight percent PET, on a dry plastic basis.

The MPW feedstock to the separation process(es) described herein, and particularly to the first density separation stage in such embodiment, may comprise unprocessed MPW or MPW that has been debaled, subjected to size reduction (e.g., to form MPW particulates), or otherwise treated or pre-processed. Regardless, the MPW feedstock to the separation process(es), and particularly to the first density separation stage, may comprise the plastics and non-plastic components at the amounts described above. However, in one embodiment or in combination with any of the mentioned embodiments, the MPW feedstock to the separation process(es), and particularly to the first density separation stage, may comprise relatively low amounts or no amount of one or more of certain components, as described below.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of biowaste materials, with the total weight of the MPW feedstock taken as 100 weight percent on a dry basis. The MPW feedstock can comprise from 0.01 to 20, from 0.1 to 10, from 0.2 to 5, or from 0.5 to 1 weight percent of biowaste materials, with the total weight of the MPW feedstock taken as 100 weight percent on a dry basis. As used herein, the term "biowaste" refers to material derived from living organisms or of organic origin. Exemplary biowaste materials include, but are not limited to, cotton, wood, saw dust, food scraps, animals and animal parts, plants and plant parts, and manure.

In one embodiment or in combination with any of the mentioned embodiments, the MPW feedstock comprises not more than 20, not more than 15, not more than 12, not more than 10, not more than 8, not more than 6, not more than 5, not more than 4, not more than 3, not more than 2, or not more than 1 weight percent of manufactured cellulose products, with the total weight of the MPW feedstock taken as 100 weight percent on a dry basis. The MPW feedstock can comprise from 0.01 to 20, from 0.1 to 10, from 0.2 to 5, or from 0.5 to 1 weight percent of manufactured cellulose products, with the total weight of the MPW feedstock taken as 100 weight percent on a dry basis. As used herein, the term "manufactured cellulose products" refers to nonnatural (i.e., manmade or machine-made) articles, and scraps thereof, comprising cellulosic fibers. Exemplary manufactured cellulose products include, but are not limited to, paper and cardboard.

As noted above, the MPW may comprise non-plastic solids. In one embodiment or in combination with any of the mentioned embodiments, no separate separation process is needed or included to remove non-plastic solids from the MPW. However, in one embodiment or in combination with any of the mentioned embodiments, at least a portion of the non-plastic solids in the MPW may be separated before the MPW feedstock is fed to the separation process(es), and particularly to the first density separation stage. Regardless, the MPW feedstock can comprise not more than 20, not more than 15, not more than 12, not more than 10, not more than 8, not more than 6, not more than 5, not more than 4, not more than 3, not more than 2, or not more than 1 weight percent of non-plastic solids, with the total weight of the MPW feedstock taken as 100 weight percent on a dry basis. The MPW feedstock can comprise from 0.01 to 20, from 0.1 to 10, from 0.2 to 5, or from 0.5 to 1 weight percent of non-plastic solids, with the total weight of the MPW feedstock taken as 100 weight percent on a dry basis.

After separation, the PET-enriched stream 20 generally comprises at least 70, at least 80, at least 90, at least 95, or at least 99 weight percent PET on a dry basis. In one embodiment or in combination with any of the mentioned embodiments, the PET-enriched stream 20 comprises from 70 to 99.9, from 80 to 99, or from 90 to 98 weight percent PET on a dry basis.

In one embodiment or in combination with any of the mentioned embodiments, the PET-enriched stream 20 is enriched in concentration of PET relative to the concentration of PET in the MPW stream 10, or the PET-depleted stream 30, or both, on an undiluted solids dry basis. For example, if the PET-enriched stream 20 is diluted with liquid or other solids after separation, the enrichment would be on the basis of a concentration in the undiluted PET-enriched stream 20, and on a dry basis. The PET-enriched stream 20 can have a percent PET enrichment relative to the MPW stream 10, the PET-depleted stream 30, or both that is at least 10%, at least 20%, at least 40%, at least 50%, at least 60%, at least 80%, at least 100%, at least 125%, at least 150%, at least 175%, at least 200%, at least 225%, at least 250%, at least 300%, at least 350%, at least 400%, at least 500%, at least 600%, at least 700%, at least 800%, at least 900%, or at least 1000% as determined by the formula:

$$\% \ PETenrichment = \frac{PETe - PETm}{PETm} \times 100 \ \text{and}$$

$$\% \ PETenrichment = \frac{PETe - PETd}{PETd} \times 100$$

where PETe is the concentration of PET in the PET-enriched stream 20 on an undiluted dry weight basis; and PETm is the concentration of PET in the MPW stream 10 on a dry weight basis, and PETd is the concentration of PET in the PET-depleted stream 30 on a dry weight basis.

In one embodiment or in combination with any of the mentioned embodiments, the PET-enriched stream 20 has a percent PET enrichment relative to the MPW stream 10, the PET-depleted stream 30, or both that is at least 10%, at least 100%, at least 200%, at least 300%, at least 500%, or at least 1000% as determined by the above formula. The PET-enriched stream 20 can have a percent PET enrichment relative to the MPW stream 10, the PET-depleted stream 30, or both that is from 10% to 100,000%, from 100% to 50,000%, from 200% to 40,000%, from 300% to 30,000%, from 500% to 20,000%, or from 1000% to 10,000%, as determined by the above formula.

In one embodiment or in combination with any of the mentioned embodiments, the PET-enriched stream 20 is also enriched in halogens, such as fluorine (F), chlorine (Cl), bromine (Br), iodine (I), and astatine (At), and/or halogen-containing compounds, such as PVC, relative to the concentration of halogens in the MPW stream 10, or the PET-depleted stream 30, or both. The PET-enriched stream 20 can have a percent PVC enrichment relative to the MPW stream 10 that is at least 1%, at least 3%, at least 5%, at least 7%, at least 10%, at least 15%, at least 20%, at least 40%, at least 50%, at least 60%, at least 80%, at least 100%, at least 125%, at least 150%, at least 175%, at least 200%, at least 225%, at least 250%, at least 300%, at least 350%, at least 400%, at least 500%, as determined by the formula:

$$\% \ PVCenrichment = \frac{PVCe - PVCm}{PVCm} \times 100 \ \text{and}$$

$$\% \ PVCenrichment = \frac{PVCe - PVCd}{PVCd} \times 100$$

where PVCe is the concentration of PVC in the PET-enriched stream 20 on an undiluted dry weight basis; and PVCm is the concentration of PVC in the MPW stream 10 on an undiluted dry weight basis, and where PVCd is the concentration of PVC in the PET-depleted stream 30 on an undiluted dry weight basis.

In one embodiment or in combination with any of the mentioned embodiments, the PET-enriched stream 20 has a percent PVC enrichment relative to the MPW stream 10 that is at least 1%, at least 10%, at least 50%, at least 100%, at least 200%, at least 300%, at least 400%, or at least 500%, as determined by the above formula. The PET-enriched stream 20 can have a percent PVC enrichment relative to the MPW stream 10 that is from 1% to 50,000%, from 10% to 40,000%, from 50% to 30,000%, from 100% to 20,000%, from 200% to 15,000%, from 300% to 10,000%, from 400% to 5,000%, or from 500% to 1,000%, as determined by the above formula.

In one embodiment or in combination with any of the mentioned embodiments, the PET-enriched stream 20 comprises at least 0.1, at least 0.5, at least 1, or at least 2 and/or not more than 10, not more than 8, or not more than 6, or not more than 4 weight percent halogen-containing compounds on a dry basis, or at least 0.05, at least 0.06, at least 0.08, or at least 0.1 wt. %, or at least 0.5 wt. %, at least 1 wt. %, at least 1.5 wt. %, or at least 2 wt. % and/or not more than 10, not more than 8, or not more than 6 weight percent halogens, or chlorine, on a dry basis. The PET-enriched stream 20 can comprise from 0.1 to 10, or from 0.1 to 4, from 0.5 to 8, from 1 to 6, or from 2 to 5 weight percent halogen-containing compounds on a dry basis, or 0.05 to 10, from 0.06 to 10, or 0.06 to 8, or 0.06 to 6, or 0.06 to 5, or 0.08 to 8, or 0.08 to 6, or 0.08 to 4, or 0.08 to 3, or from 0.1 to 10, or from 0.1 to 4, or from 0.5 to 8, or from 1 to 6, or from 2 to 5 weight percent halogen on a dry basis. However, it should be understood that the halogen concentration in the PET-enriched stream (and the PET-depleted stream) is based, at least in part, on the halogen content in the MPW feedstock, and thus even lower amounts of halogens may be present in the PET-enriched stream. The PET-enriched stream 20 can comprise not more than 1000 ppm, not more than 500 ppm, not more than 100 ppm, not more than 50 ppm, not more than 15 ppm, not more than 10 ppm, not more than 5 ppm, or not more than 1 ppm halogens and/or halogen-containing compounds on a dry basis.

As described herein, the plastic separation may be achieved using one or more density separation stages. Since the density of typical PET plastics (approximately 1.27-1.40 g/cc) and the density of typical PVC plastics (1.15-1.7 g/cc) overlap, density separation processes will generally result in some amount of PVC remaining in the same stream with the PET plastic after the separation processes. Thus, in one embodiment or in combination with any of the mentioned embodiments, the PVC content in the MPW 10 is not separated as a PVC-enriched stream separate from the PET-enriched stream 20. In one embodiment or in combination with any of the mentioned embodiments, at least 50 weight percent of the PVC content in the MPW 10 is separated from the MPW together with the PET in the PET-enriched stream 20. The PET-enriched stream 20 can comprise at least 0.1, at least 0.5, at least 1, or at least 2 and/or not more than 10, not more than 8, or not more than 6 weight percent PVC on a dry basis. The PET-enriched stream 20 can comprise from 0.1 to 10, from 0.5 to 8, from 1 to 6, or from 2 to 5 weight percent PVC on a dry basis.

In one embodiment or in combination with any of the mentioned embodiments, the PVC content in the PET-enriched stream 20 is not separated from the PET-enriched stream 20 prior to processing the PET polymers of the PET-enriched stream 20 in downstream chemical recycling processes. For example, at least 50, at least 60, at least 70, at least 80, at least 90, at least 95, at least 98, at least 99, or at least 100 weight percent of the PVC in the PET-enriched stream 20 may remain in the PET-enriched stream 20 upon processing the PET polymers in the PET enriched stream 20 in downstream chemical recycling processes. In one embodiment or in combination with any of the mentioned embodiments, at least 50, at least 75, at least 90, at least 95, at least 99, or at least 100 weight percent of the PVC in the PET-enriched stream 20 remains in the PET-enriched stream 20 upon processing the PET polymers in the PET enriched stream 20 in downstream chemical recycling processes. In one embodiment or in combination with any of the mentioned embodiments, from 50 to 100, or from 75 to 99, or from 90 to 95 weight percent of the PVC in the PET-enriched stream 20 remains in the PET-enriched stream 20 upon processing the PET polymers in the PET enriched stream 20 in downstream chemical recycling processes.

In another example, less than 50, less than 40, less than 30, less than 20, less than 10, less than 5, less than 3, less than 2, less than 1, less than 0.5, less than 0.1 weight percent of the PVC in the PET-enriched stream 20 may separated from the PET-enriched stream 20 prior to processing the PET polymers in the PET-enriched stream 20. In one embodiment or in combination with any of the mentioned embodiments, less than 50, less than 25, less than 10, less than 5, less than 1, or less than 0.1 weight percent of the PVC in the PET-enriched stream 20 is separated from the PET-enriched stream 20 prior to processing the PET polymers in the PET-enriched stream 20. In one embodiment or in combination with any of the mentioned embodiments, from 0.001 to 50, from 0.01 to 25, from 0.1 to 10, from 0.5 to 5, or from 1 to 2 weight percent of the PVC in the PET-enriched stream 20 is separated from the PET-enriched stream 20 prior to processing the PET polymers in the PET-enriched stream 20. The PET-enriched stream, that is also enriched in PVC, can be mixed with a separate PET-enriched stream having a lower PVC content, thereby diluting the concentration of PVC in the initial PET-enriched stream.

The density separation methods described herein are capable of separating and removing heavier (more dense) and lighter (less dense) plastics from the PET-enriched stream 20. In one embodiment or in combination with any of the mentioned embodiments, the PET-enriched stream 20 is depleted in lighter plastic components, for example polyolefins, such as polyethylene, polypropylene, and the like, which generally have notably lower densities than PET and PVC and can thus be separated from the PET and PVC in the one or more density separation stage(s). Similarly, the PET-enriched stream 20 is generally depleted in heavy plastics, for example polytetrafluoroethylene, which has a higher density than PET and PVC. The PET-enriched stream 20 can comprise not more than 50, not more than 40, not more than 30, not more than 20, not more than 10, not more than 5, or not more than 1 weight percent polyolefins on a dry basis. The PET-enriched stream 20 can comprise not more than 50, not more than 25, not more than 10, not more than 5, or not more than 1 weight percent polyolefins on a dry basis. The PET-enriched stream 20 can comprise from 0.01 to 50, from 0.1 to 25, from 0.2 to 10, from 0.5 to 5, or from 1 to 2 weight percent polyolefins on a dry basis.

Additionally, other plastic and non-plastic components from the MPW 10 may be separated from the PET (and PVC) by density separation or other separation methods. For example, in one embodiment or in combination with any of the mentioned embodiments, the PET-enriched stream 20 comprises not more than 2, not more than 1, not more than 0.5, or not more than 0.1 weight percent of adhesives on a dry basis. The PET-enriched stream 20 can comprise from 0.001 to 2, from 0.01 to 1, or from 0.1 to 0.5 weight percent of adhesives on a dry basis. Typical adhesives include carpet glue, latex, styrene butadiene rubber, and the like.

In one embodiment or in combination with any of the mentioned embodiments, the PET-enriched stream 20 is depleted in nylons, relative to the PET-depleted stream 30. Nylons, or nylon polymers, are a family of synthetic polymers composed of polyamides (i.e., repeating units linked by amide links), and are generally in the form of melt-processed fibers, films, or other shapes. The nylon content of a particular stream may generally be measured or represented by the nitrogen content of the stream. The PET-enriched stream 20 can be depleted in nylons by at least 10%, or at least 25%, or at least 40%, or at least 50%, or at least 60%, or at least 70%, or at least 80%, or at least 85%, or at least 90%, or at least 95%, or at least 97%, or at least 98, in each case relative to the nylons concentration in the PET depleted stream 30, calculated on the basis of weight percent of nitrogen atoms in the individual streams. The sampling method can include taking a random sample from each stream, optionally taking 2 samples from each stream each 24 hour period for two weeks, and dried to a moisture content of less than 10 wt. %. The formula to carry out such a calculation is as set forth in Formula 1:

$$\% \text{ nitrogen atom depletion in } ePETstream = \frac{\text{wt. \% } NdPET - \text{wt \% } NePET}{\text{wtwt \% } NdPET} \times 100$$

where:
wt % N is weight percent of nitrogen atoms in a stream
dPET is the PET depleted stream and
ePET is the PET enriched stream The PET-enriched stream 20 can be depleted in the concentration of nylons, relative to the MPW 10 stream, in the same amounts as stated above using the same formula, substituting wt % NMPW (weight percent of nitrogen atoms in the MPW stream) for the wt % NePET in Formula 1.

In one embodiment or in combination with any of the mentioned embodiments, the PET-depleted stream 30 is enriched in the concentration of nylons, relative to the PET-enriched stream 20. The PET-depleted stream 30 can be enriched in concentration of nylons by at least 10%, or at least 25%, or at least 50%, or at least 75%, or at least 100%, or at least 150%, or at least 200%, or at least 250%, or at least 300%, or at least 350%, or at least 400%, or at least 450%, or at least 500%, or at least 600%, or at least 700%, or at least 800%, or at least 1000%, in each case relative to the nylons concentration in the PET-enriched stream 20, calculated on the basis of weight percent of nitrogen atoms in the individual streams. The sampling method can include taking a random sample from each stream, optionally taking 2 samples from each stream each 24 hour period for two weeks. The formula to carry out such a calculation is according to Formula 2:

$$\% \text{ Nenrinchment in } dPETstream = \frac{\text{wt. \% } NdPET - \text{wt \% } NePET}{\text{wtwt \% } NdPET} \times 100$$

where:
wt % N is weight percent of nitrogen atoms in a stream
dPET is the PET depleted stream and
ePET is the PET enriched stream The PET-depleted stream 30 can be enriched in the concentration of nylons, relative to the MPW 10 stream, at least 10%, or at least 25%, or at least 40%, or at least 50%, or at least 60%, or at least 70%, or at least 80%, or at least 85%, or at least 90%, in each case relative to the nylons concentration in the MPW stream 10, using the same formula 2, substituting wt % NMPW (weight percent of nitrogen atoms in the MPW stream) for the wt % NePET in Formula 2.

In one embodiment or in combination with any of the mentioned embodiments, the PET-enriched stream 20 comprises not more than 1, not more than 0.5, not more than 0.1, not more than 0.05, or not more than 0.03 weight percent nylon on a dry basis. The PET-enriched stream 20 can comprise from 0.001 to 10, from 0.005 to 5, or from 0.01 to 1, or from 0.02 to 0.1 weight percent nylon on a dry basis.

In one embodiment or in combination with any of the mentioned embodiments, the PET-enriched stream 20 is depleted in multi-layer polymers, relative to the MPW 10, the PET-depleted stream 30, or both. The PET-enriched stream 20 can comprise not more than 10, not more than 5, not more than 2, not more than 1, or not more than 0.1 weight percent multi-layer polymers on a dry basis. The PET-enriched stream 20 can comprise from 0.01 to 10, from 0.05 to 5, or from 0.1 to 2, or from 0.5 to 1 weight percent multi-layer polymers on a dry basis.

In one embodiment or in combination with any of the mentioned embodiments, the PET-enriched stream 20 is depleted in multi-component polymers, relative to the MPW 10, the PET-depleted stream 30, or both. The PET-enriched stream 20 can comprise not more than 10, not more than 5, not more than 2, not more than 1, or not more than 0.1 weight percent multi-component polymers on a dry basis. The PET-enriched stream 20 can comprise from 0.01 to 10, from 0.05 to 5, or from 0.1 to 2, or from 0.5 to 1 weight percent multi-component polymers on a dry basis.

Additionally, in one embodiment or in combination with any of the mentioned embodiments, the PET-enriched stream 20 comprises not more than 4, not more than 3, not more than 2, not more than 1, not more than 0.5, or not more than 0.1 weight percent plastic fillers and solid additives on a dry basis. The PET-enriched stream 20 can comprise from 0.001 to 4, from 0.01 to 2, or from 0.1 to 1 weight percent plastic fillers and solid additives on a dry basis. Exemplary fillers and additives include silicon dioxide, calcium carbonate, talc, silica, glass, glass beads, alumina, and other solid inerts, which do not chemically react with the plastics or other components in the in processes described herein.

In one embodiment or in combination with any of the mentioned embodiments, the PET-enriched stream 20 comprises not more than 2, not more than 1, not more than 0.5, not more than 0.2, or not more than 0.1 weight percent cellulosic materials. The PET-enriched stream 20 can comprise from 0.001 to 4, from 0.01 to 2, or from 0.1 to 1 weight percent cellulosic materials.

As described in greater detail below, in one embodiment or in combination with any of the mentioned embodiments, the pre-processing step(s) (e.g., friction washing) and/or separation process(es) described herein can be particularly effective at separating nylons and other polymer or non-polymer solids associated with PET in the form of multi-layer polymers or other multi-component polymers. Regardless the mode of association, the pre-processing and/or separation process(es) may effectively disassociate and separate the nylon and/or other polymers and non-polymer solids from the PET, thereby allowing for increased separation efficiency of these components. In one embodiment or in combination with any of the mentioned embodiments, the PET-enriched stream 20 comprises not more than 5, not more than 4, not more than 3, not more than 2, not more than 1, not more than 0.5, or not more than 0.1 weight percent associated PET-nylon on a dry basis. The PET-enriched stream 20 can comprise from 0.001 to 5, from 0.01 to 2, or from 0.1 to 1 weight percent associated PET-nylon on a dry basis. The PET-enriched stream 20 may comprise not more than 20, not more than 15, not more than 10, not more than 5, not more than 2, or not more than 1 weight percent of the associated PET-nylon that is present in the MPW and/or the MPW feedstock stream fed to the first separation stage, on a dry basis. The PET-enriched stream 20 may comprise from 0.01 to 20, from 0.1 to 10, or from 1 to 5 weight percent of the associated PET-nylon that is present in the MPW and/or the MPW feedstock stream fed to the first separation stage, on a dry basis.

The concentration by weight of PET in the PET-depleted stream 30 is generally less than the concentration of PET in the PET-enriched stream 20, or the concentration of PET in the MPW feed 10, or the concentration of PET in the MPW feed 10 and the PET-enriched stream 20, each on an undiluted dry weight basis. In one embodiment or in combination with any of the mentioned embodiments, the PET-depleted stream 30 is also depleted in the concentration of PVC relative to the concentration of PVC in the PET-enriched stream 20, or the concentration of PVC in the MPW feed 10, or the concentration of PVC in both the MPW feed 10 and the PET-enriched stream 20. The PET-depleted stream can comprise not more than 10, not more than 8, not more than 6, not more than 4, not more than 2, or not more than 1 weight percent PVC on a dry plastic basis. The PET-depleted stream can comprise from 0.01 to 10, from 0.1 to 5, or from 1 to 2 weight percent PVC on a dry plastic basis.

Due to the separation of polyolefins from the PET, the PET-depleted stream 30 is enriched in polyolefins relative to the concentration of polyolefins in the MPW feed 10, or the PET-enriched stream 20, or both, on an undiluted solids dry basis. In one embodiment or in combination with any of the mentioned embodiments, the PET-depleted stream 30 has a percent polyolefin enrichment relative to the MPW stream 10 or relative to the PET-enriched stream 20 or both that is at least 10%, at least 20%, at least 40%, at least 50%, at least 60%, at least 80%, at least 100%, at least 125%, at least 150%, at least 175%, at least 200%, at least 225%, at least 250%, at least 300%, at least 350%, at least 400%, at least 500%, at least 600%, at least 700%, at least 800%, at least 900%, or at least 1000% as determined by the formula:

$$\% \ POenrichment = \frac{POd - POm}{POm} \times 100 \text{ and}$$

$$\% \ POenrichment = \frac{POd - POe}{POe} \times 100$$

where POd is the concentration of polyolefins in the PET-depleted stream 30 on an undiluted dry weight basis; and POm is the concentration of PO in the MPW stream 10 on a dry weight basis, and POe is the concentration of PO in the PET-enriched stream 20.

In one embodiment or in combination with any of the mentioned embodiments, the PET-depleted stream 30 has a percent polyolefin enrichment relative to the MPW stream 10 or relative to the PET-enriched stream 20 or both that is at least 10%, at least 100%, at least 200%, at least 500%, or at least 1000% as determined by the above formula. The PET-depleted stream 30 can have a percent polyolefin enrichment relative to the MPW stream 10 or relative to the PET-enriched stream 20 or both that is from 10% to 50,000%, from 100% to 40,000%, from 200% to 30,000%, from 500% to 20,000%, or from 1000% to 10,000%, as determined by the above formula.

In one embodiment or in combination with any other embodiments, the PET-depleted stream 30 is also depleted in halogens, such as fluorine (F), chlorine (Cl), bromine (Br), iodine (I), and astatine (At), and/or halogen-containing compounds, such as PVC, relative to the concentration of halogens in the MPW stream 10, the PET-enriched stream 20, or both. The PET-depleted stream 30 can have a percent PVC depletion, relative to the MPW stream 10 or the PET-enriched stream 20, that is at least 1%, at least 3%, at least 5%, at least 7%, at least 10%, at least 15%, at least 20%, at least 25%, at least 30%, at least 35%, at least 40%, at least 50%, at least 60%, at least 65%, at least 70%, at least 75%, at least 80%, at least 85%, or at least 90% as determined by the formula:

$$\% \ PVC depletion = \frac{PVCm - PVCd}{PVCm} \times 100 \text{ and}$$

$$\% \ PVC depletion = \frac{PVCe - PVCd}{PVCm} \times 100$$

where PVCm is the concentration of PVC in the MPW stream 10 on an undiluted dry weight basis;

PVCd is the concentration of PVC in the PET-depleted stream 30 on an undiluted dry weight basis; and PVCe is the concentration of PVC in the PET-enriched stream 20 on an undiluted dry weight.

In one embodiment or in combination with any of the mentioned embodiments, the PET-depleted stream 30 has a percent PVC depletion, relative to the MPW stream 10 or the PET-enriched stream 20, that is at least 1%, at least 10%, at least 25%, at least 50%, at least 75%, or at least 90%, as determined by the above formula. The PET-depleted stream 30 can have a percent PVC depletion, relative to the MPW stream 10 or the PET-enriched stream 20, that is from 1% to 100%, from 10% to 99%, from 25% to 98%, from 50% to 97%, from 75% to 96%, or from 90% to 95%, as determined by the above formula.

In one embodiment or in combination with any other embodiments, the PET-depleted stream 30 is also depleted in PET, relative to the concentration of PET in the MPW stream 10, the PET-enriched stream 20, or both. The PET-depleted stream 30 can have a percent PET depletion, relative to the MPW stream 10 or the PET-enriched stream 20, that is at least 1%, at least 3%, at least 5%, at least 7%, at least 10%, at least 15%, at least 20%, at least 25%, at least 30%, at least 35%, at least 40%, at least 50%, at least 60%, at least 65%, at least 70%, at least 75%, at least 80%, at least 85%, or at least 90% as determined by the formula:

$$\% \ PET depletion = \frac{PETm - PETd}{PETm} \times 100 \text{ and}$$

$$\% \ PET depletion = \frac{PETe - PETd}{PETe} \times 100$$

where PETm is the concentration of PET in the MPW stream 10 on an undiluted dry weight basis;

PETd is the concentration of PET in the PET-depleted stream 30 on an undiluted dry weight basis; and PETe is the concentration of PET in the PET-enriched stream 20 on an undiluted dry weight.

In one embodiment or in combination with any of the mentioned embodiments, the PET-depleted stream 30 has a percent PET depletion, relative to the MPW stream 10 or the PET-enriched stream 20, that is at least 1%, at least 10%, at least 25%, at least 50%, at least 75%, or at least 90% as determined by the above formula. The PET-depleted stream 30 can have a percent PET depletion, relative to the MPW stream 10 or the PET-enriched stream 20, that is from 1% to 100%, from 10% to 99%, from 25% to 98%, from 50% to 97%, from 75% to 96%, or from 90% to 95%, as determined by the above formula.

The percentage enrichment or depletion in any of the above embodiments can be an average over 1 week, or over 3 days, or over 1 day, and the measurements can be conducted to reasonably correlate the samples taken at the exits of the process to MPW bulk from which the sample of MPW is taking into account the residence time of the MPW to flow from entry to exit. For example, if the average residence time of the MPW is 2 minutes, then the outlet sample would be taken two minutes after the input sample, so that the sample correlate to one another.

In one embodiment or in combination with any of the mentioned embodiments, the PET-depleted stream 30 comprises at least 50, at least 60, at least 70, at least 80, at least 90, at least 95, or at least 98 weight percent polyolefins on a dry plastic basis. The PET-depleted stream 30 can comprise at least 50, at least 75, at least 90, or at least 98 weight percent polyolefins on a dry plastic basis. The PET-depleted stream 30 can comprise from 50 to 100, from 75 to 99, or from 90 to 98 weight percent polyolefins on a dry plastic basis.

In one embodiment or in combination with any of the mentioned embodiments, the PET-depleted stream 30 is enriched in nylons, relative to the MPW 10, the PET-enriched stream 20, or both. The PET-depleted stream 30 can comprise at least 0.1, at least 0.5, at least 1, or at least 2 weight percent and/or not more than 10, not more than 8, not more than 6, or not more than 4 weight percent nylons on a dry plastic basis. The PET-depleted stream 30 can comprise from 0.1 to 10, from 0.5 to 8, from 1 to 6, or from 2 to 4 weight percent nylons on a dry plastic basis. The weight ratio of the nylons in the PET-depleted stream to the nylons in the PET-enriched stream can be at least 1:1, at least 2:1, at least 5:1, at least 10:1, at least 50:1, or at least 100:1.

In one embodiment or in combination with any of the mentioned embodiments, the PET-depleted stream 30 is enriched in multi-layer polymers, relative to the MPW 10, the PET-enriched stream 20, or both. However, in one embodiment or in combination with any of the mentioned embodiments, the PET-depleted stream 30 is depleted in multi-layer polymers, relative to the MPW 10. The PET-depleted stream 30 can comprise at least 0.001, at least 0.01, at least 0.1, or at least 1 weight percent and/or not more than 10, not more than 8, not more than 6, or not more than 4 weight percent multi-layer polymers on a dry plastic basis. The PET-depleted stream 30 comprises from 0.001 to 10, from 0.01 to 8, from 0.1 to 6, or from 1 to 4 weight percent multi-layer polymers on a dry plastic basis. The weight ratio of the multi-layer polymers in the PET-depleted stream to the multi-layer polymers in the PET-enriched stream can be at least 1:1, at least 2:1, at least 5:1, at least 10:1, at least 50:1, or at least 100:1.

In one embodiment or in combination with any of the mentioned embodiments, the PET-depleted stream 30 is enriched in multi-component polymers, relative to the MPW 10, the PET-enriched stream 20, or both. However, in one embodiment or in combination with any of the mentioned embodiments, the PET-depleted stream 30 is depleted in multi-component polymers, relative to the MPW 10. The PET-depleted stream 30 can comprise at least 0.001, at least 0.01, at least 0.1, or at least 1 weight percent and/or not more than 10, not more than 8, not more than 6, or not more than 4 weight percent multi-component polymers on a dry plastic basis. The PET-depleted stream 30 can comprise from 0.001 to 10, from 0.01 to 8, from 0.1 to 6, or from 1 to 4 weight percent multi-component polymers on a dry plastic basis. The weight ratio of the multi-component polymers in the PET-depleted stream to the multi-component polymers in the PET-enriched stream can be at least 1:1, at least 2:1, at least 5:1, at least 10:1, at least 50:1, or at least 100:1.

As noted above, in one embodiment or in combination with any of the mentioned embodiments, the separating comprises at least one density separation stage. In one embodiment or in combination with any of the mentioned embodiments, the separating comprises at least two density separation stages (i.e., first and second density separation stages). The at least one density separation stage can comprise a sink-float density separation stage and/or a centrifugal force density separation stage. The sink-float density separation stage refers to a tank, vessel, or other appropriate container holding a liquid medium, such as water, that is capable of separating components of a feed mixture based on differences in density of the components. Components having a density greater than that of the liquid medium sink to the bottom of the tank, while components having a density less than that of the liquid medium float on the liquid surface. Various mechanical means can be used to recover the sunken components as a heavies or "high density" stream and to recover the floating components as a lights or "low density" stream.

In one embodiment or in combination with any of the mentioned embodiments, the liquid medium comprises water. Salts, saccharides, and/or other additives can be added to the liquid medium, for example to increase the density of the liquid medium and adjust the target separation density of the sink-float separation stage. In one embodiment or in combination with any of the mentioned embodiments, the liquid medium comprises a concentrated salt solution. In one or more such embodiments, the salt is sodium chloride. In one or more other embodiments, however, the salt is a non-halogenated salt, such as acetates, carbonates, citrates, nitrates, nitrites, phosphates, sulfates, and/or hydroxides. In one embodiment or in combination with any of the mentioned embodiments, the liquid medium comprises a concentrated salt solution comprising sodium bromide, sodium dihydrogen phosphate, sodium hydroxide, sodium iodide, sodium nitrate, sodium thiosulfate, potassium acetate, potassium bromide, potassium carbonate, potassium hydroxide, potassium iodide, calcium chloride, cesium chloride, iron chloride, strontium chloride, zinc chloride, manganese sulfate, zinc sulfate, and/or silver nitrate. In one embodiment or in combination with any of the mentioned embodiments, the salt is a caustic component. The concentrated salt solution may have a pH of greater than 7, greater than 8, greater than 9, or greater than 10. In one embodiment or in combination with any of the mentioned embodiments, the salt comprises sodium hydroxide, potassium hydroxide, and/or potassium carbonate. In one embodiment or in combination with any of the mentioned embodiments, the salt is potassium carbonate.

Advantageously, when the concentrated salt solution comprises potassium carbonate and/or other caustic component(s) (e.g., hydroxides, such as sodium hydroxide and/or potassium hydroxide), the use of a separate caustic component to control pathogens and odors can be avoided. Therefore, in one embodiment or in combination with any of the mentioned embodiments, no separate caustic component is introduced to the density separation stage(s).

In one embodiment or in combination with any of the mentioned embodiments, the liquid medium comprises a saccharide, such as sucrose. In one embodiment or in combination with any of the mentioned embodiments, the liquid medium comprises carbon tetrachloride, chloroform, dichlorobenzene, dimethyl sulfate, and/or trichloro ethylene. The particular components and concentrations of the liquid medium may be selected depending on the desired target separation density of the separation stage.

In one embodiment or in combination with any of the mentioned embodiments, the centrifugal force density separation stage refers to a device that utilizes a vortex to separate components of a feed mixture based on differences in density of the components. The device may be configured such that centrifugal acceleration causes the less dense components to move toward the central core of the vortex while the more dense components move away from the core. The centrifugal force density separation stage may be a cyclone separator. The centrifugal force density separation stage may be a hydrocyclone separator, which includes a liquid medium that separates components based on the ratio of their centripetal force to fluid resistance. Advantageously, as explained in more detail below, friction and/or caustic solutions in hydrocyclone separators may be effective at disassociating individual plastic components in multi-layer polymers materials. Thus, the use of one or more hydrocyclone separators can increase the separation efficiency of PET from nylons and plastic films, as well as the separation efficiency of other plastics or non-plastics from PET films. This can have the effect of reducing the nylon and plastic film content in the PET-enriched stream(s) and/or reducing the PET in the PET-depleted stream(s) (e.g., the olefin-enriched stream). The centrifugal force density separation stage may use any of the same or different liquid mediums described above with respect to the sink-float stage, and may also include salts, saccharides, and/or other additives, for example to increase the density of the liquid medium and adjust the target separation density. The centrifugal force density separation stage may comprise a vertical or angled/inclined device. Regardless the embodiment, the centrifugal force density separation stage may be configured such that the feed mixture is fed into a middle location, with one of the heavies or lights stream being removed from a location above the feed and the other being removed from a location below the feed. The centrifugal force density separation stage may comprise a center outlet for less dense materials at a location above a wall outlet for more dense materials.

Embodiments that utilize at least two density separation stages are described below.

Figure 2:
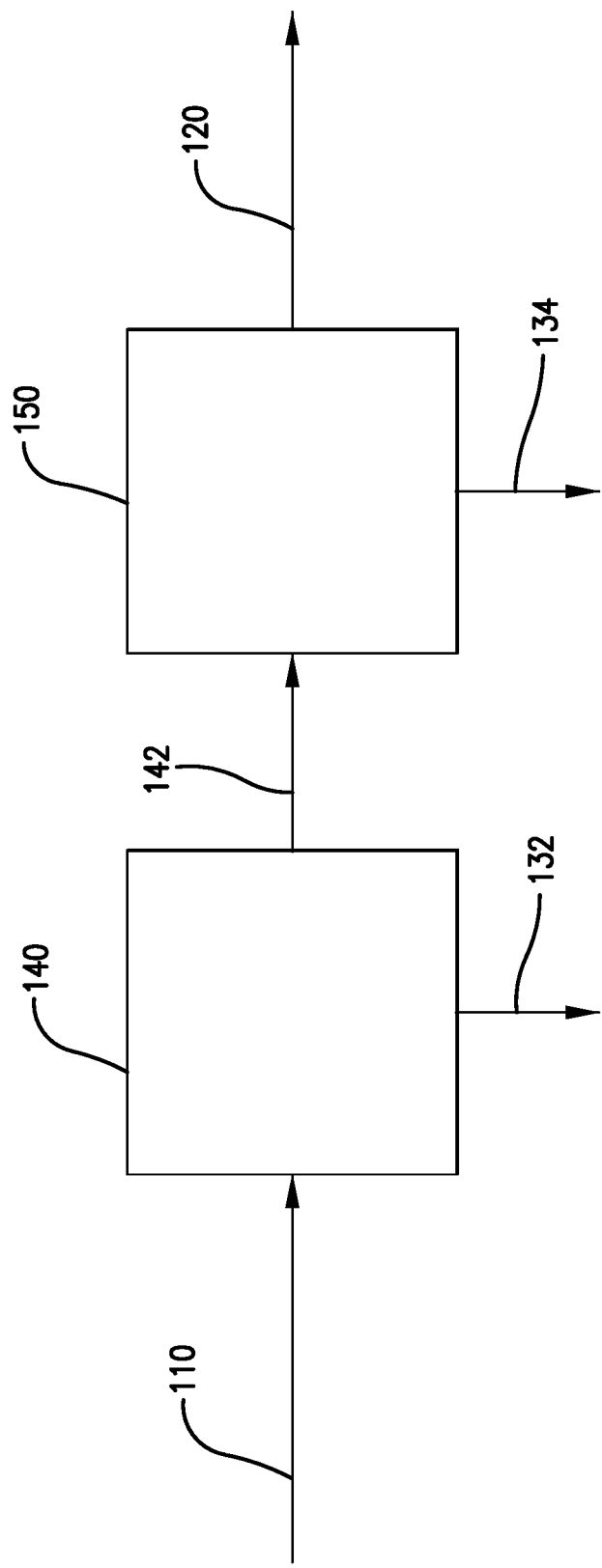
FIG. 2 depicts a general process for separating MPW into a PET-enriched stream and a PET-depleted stream utilizing two density separation stages according to one embodiment of the present invention.

As depicted in FIG. 2, in one embodiment or in combination with any of the mentioned embodiments, the waste plastic separation methods comprise at least two density separation stages 140, 150. In certain such embodiments, the methods generally comprise introducing mixed waste plastic (MPW) particulates 110 into the first density separation stage 140 and feeding an output 142 from the first density separation stage 140 into the second density separation stage 150. The density separation stages 140, 150 can be any system or unit operation that performs a density separation process, as defined herein. At least one of the density separation stages 140, 150 can comprise a centrifugal force separation stage or a sink-float separation stage. Each of the first 140 and second 150 density separation stages can comprise a centrifugal force separation stage and/or a sink-float separation stage.

To produce a PET-enriched material stream 120, one of the density separation stages 140, 150 generally comprises a low-density separation stage and the other generally comprises a high-density separation stage. As defined herein, the low-density separation stage has a target separation density less than the target separation density of the high-density separation stage. In one embodiment or in combination with any of the mentioned embodiments, the low-density separation stage has a target separation density less than the density of PET, and the high-density separation stage has a target separation density greater than the density of PET.

In one embodiment or in combination with any of the mentioned embodiments, the low-density separation stage has a target separation density that is less than 1.35, less than 1.34, less than 1.33, less than 1.32, less than 1.31, or less than 1.30 g/cc and/or at least 1.25, at least 1.26, at least 1.27, at least 1.28, or at least 1.29 g/cc.

In one embodiment or in combination with any of the mentioned embodiments, the high-density separation stage has a target separation density that is at least 0.01, at least 0.025, at least 0.05, at least 0.075, at least 0.1, at least 0.15, or at least 0.2 g/cc greater than the target separation density of the low-density separation stage. The high-density separation stage can have a target separation density that is from 0.01 to 20, from 0.025 to 18, from 0.05 to 15, from 0.075 to 12, from 0.1 to 10, from 0.15 to 5, or from 0.2 to 1 g/cc greater than the target separation density of the low-density separation stage.

In one embodiment or in combination with any of the mentioned embodiments, the target separation density of the high-density separation stage is at least 1.31, at least 1.32, at least 1.33, at least 1.34, at least 1.35, at least 1.36, at least 1.37, at least 1.38, at least 1.39, or at least 1.40 g/cc and/or not more than 1.45, not more than 1.44, not more than 1.43, not more than 1.42, or not more than 1.41 g/cc.

In one embodiment or in combination with any of the mentioned embodiments, the target separation density of the low-density separation stage is in the range of 1.25 to 1.35, 1.26 to 1.34, 1.27 to 1.33, 1.28 to 1.32, or 1.29 to 1.31 g/cc and/or the target separation density of said high-density separation stage is in the range of 1.35 to 1.45, 1.36 to 1.44, 1.37 to 1.43, 1.38 to 1.42, or 1.39 to 1.41 g/cc.

It should be understood that the target separation densities referred to herein refer to targeting the plastic densities for separation, as opposed to targeting the densities of the concentration salt solution used in the separation processes, which may or may not be the same as the target separation density for the plastic materials. For example, in a typical sink/float separation stage, the plastic and the concentration salt solution densities are the same or substantially the same. However, in a typical hydrocyclone separation stage, the concentrated salt solution density is generally not greater than the target plastic density, but the concentrated salt solution density can be less than the target plastic density. Further, it should be understood that a claimed or stated target separation density value or range is deemed to have been established or satisfied if the process actually separates the plastics at a value within a claimed or stated target separation density value, regardless of intent and regardless of the density of the salt solutions.

In one embodiment or in combination with any of the mentioned embodiments, a hydrocyclone separator is used with a concentrated salt solution generally having a liquid density of 0.95 to 1.45 g/cc. In one embodiment or in combination with any of the mentioned embodiments, a hydrocyclone separator can be used with a concentrated salt solution having a liquid density of 1.25 to 1.35 g/cc and a target plastic separation density of 1.25 to 1.35 g/cc. Such embodiments will generally allow for higher PET purity, but results in a large yield loss. A hydrocyclone separator can also be used with a concentrated salt solution having a density of 0.95 to 1.20, or or 1.00 to 1.10 to g/cc and a target plastic separation density of 1.25 to 1.35 g/cc. Such embodiments will generally result in lower PET purity, but the PET yield is higher. Thus, when one or more hydrocyclone density separators are used, the density of the concentration salt solution may be selected, adjusted, or otherwise controlled based on the desired PET purity and/or yield specifications.

In one embodiment or in combination with any of the mentioned embodiments, at least one of said first 140 or second 150 density separation stages has a density separation efficiency with respect to PET of at least 90, at least 95, at least 98, at least 99, or at least 99.5 percent. At least one of said first 140 or second 150 density separation stages can have a density separation efficiency with respect to PET of 90 to 99.9, 95 to 99.5, or 98 to 99 percent.

In one embodiment or in combination with any of the mentioned embodiments, each of said first 140 and second 150 density separation stages has a density separation efficiency with respect to PET of at least 90, at least 95, at least 98, at least 99, or at least 99.5 percent. Each of said first 140 and second 150 density separation stages can have a density separation efficiency with respect to PET of 90 to 99.9, 95 to 99.5, or 98 to 99 percent.

In one embodiment or in combination with any of the mentioned embodiments, the first density separation stage 140 is the low-density separation stage and the second density separation stage 150 is the high-density separation stage. The first density separation stage 140 can produce a first PET-depleted stream 132 as a polyolefin-enriched stream and a PET-enriched output stream 142 that is fed into the second density separation stage 150. The PET-enriched output stream 142 can also be PVC-enriched. The first PET-depleted stream 132 as the polyolefin-enriched stream can comprise less than 10, less than 5, less than 1, less than 0.5, less than 0.25, or less than 0.1 weight percent PET and/or less than 10, less than 8, less than 6, less than 4, less than 2, or less than 1 weight percent PVC on a dry plastic basis. The first PET-depleted stream 132 as the polyolefin-enriched stream can comprise 0.001 to 10, 0.01 to 5, 0.1 to 2, or 0.5 to 1 weight percent PVC on a dry plastic basis.

The PET-enriched output stream 142 fed into the second density separation stage 150 is separated into a second PET-enriched stream 120 and a second PET-depleted stream 134 as a heavies-enriched stream, which includes plastics and/or other materials having a density greater than PET. The second PET-enriched stream 120 can also be PVC-enriched. The second PET-enriched stream 120 can be polyolefin-depleted. The second PET-depleted stream 134 as the heavies-enriched stream can comprise less than 10, less than 5, less than 1, less than 0.5, or less than 0.1 weight percent PET. The second PET-depleted stream 134 as the heavies-enriched stream can comprise from 0.001 to 10, from 0.01 to 5, or from 0.1 to 1 weight percent PET.

In one embodiment or in combination with any of the mentioned embodiments, the second PET-depleted stream 134 as the heavies-enriched stream further comprises non-plastic solids and/or heavy plastics having a density greater than 1.45 g/cc. The non-plastic solids can comprise sand, metal, and/or glass. The second PET-enriched stream 120 can be subjected to solid-liquid mechanical separation and/or drying to thereby provide a PET-enriched plastic material product.

In one other embodiment or in combination with any of the mentioned embodiments, the first density separation stage 140 is the high-density separation stage and the second density separation stage 150 is the low-density separation stage. The first density separation stage 140 can produce a first PET-depleted stream 132 as a heavies-enriched stream and a PET-enriched output stream 142 that is fed into the second density separation stage 150. The PET-enriched output stream 142 can also be PVC-enriched. The PET-enriched output stream 142 can also be polyolefin-enriched. The first PET-depleted stream 132 as the heavies-enriched stream can comprise less than 10, less than 5, less than 1, less than 0.5, less than 0.25, or less than 0.1 weight percent PET. The second PET-depleted stream 134 as the heavies-enriched stream can comprise from 0.001 to 10, from 0.01 to 5, or from 0.1 to 1 weight percent PET.

Again, in one embodiment or in combination with any of the mentioned embodiments, the first PET-depleted stream 132 as the heavies-enriched stream further comprises non-plastic solids and/or heavy plastics having a density greater than 1.45 g/cc. The non-plastic solids can comprise sand, metal, and/or glass.

The PET-enriched output stream 142 fed into the second density separation stage 150 is separated into a second PET-enriched stream 120 and a second PET-depleted stream 134 as a polyolefins-enriched stream. In one embodiment or in combination with any of the mentioned embodiments, the second PET-enriched stream 120 is also PVC-enriched. The second PET-depleted stream 134 as the polyolefin-enriched stream can comprise less than 10, less than 5, less than 1, less than 0.5, less than 0.25, or less than 0.1 weight percent PET and/or less than 10, less than 8, less than 6, less than 4, less than 2, or less than 1 weight percent PVC on a dry plastic basis. The second PET-depleted stream 134 as the polyolefin-enriched stream can comprise 0.001 to 10, 0.01 to 5, 0.1 to 2, or 0.5 to 1 weight percent PVC on a dry plastic basis. The second PET-depleted stream 134 as the polyolefin-enriched stream, or the PET-depleted inventory pile, can comprise less than 10,000 ppm, less than 5,000 ppm, less than 2,500 ppm, less than 1,500 ppm, less than 1,200 ppm, less than 1,000 ppm, less than 800 ppm, less than 600 ppm, less than 400 ppm, less than 200 ppm, or less than 150 ppm, less than 125 ppm, or less than 100 ppm of halogens on a dry plastic basis and/or at least 1 ppm, at least 5 ppm, at least 10 ppm, at least 25 ppm, at least 50 ppm, at least 75 ppm, or at least 100 ppm of halogens on a dry plastic basis. The second PET-depleted stream 134 as the polyolefin-enriched stream can comprise from 1 ppm to 5,000 ppm, from 5 ppm to 2,500 ppm, from 10 ppm to 1,500 ppm, from 25 ppm to 1,200 ppm, from 50 ppm to 1,000 ppm, from 75 ppm to 800 ppm, or from 100 ppm to 600 ppm halogens on a dry plastic basis. The second PET-enriched stream 120 can be subjected to solid-liquid mechanical separation and/or drying to thereby provide the PET-enriched plastic material product.

In one embodiment or in combination with any of the mentioned embodiments, the amount of PVC present in the particulate plastic solids, and namely the PET-enriched and PET-depleted depleted streams, can be calculated by first measuring the concentration of halogens, especially chlorine, within the solids and performing a mathematical correlation to derive a PVC content. The mathematical correlation can be taken as $$X\,ppm\,PVC = Y\,ppm\,Cl \times \left(62.496\ \frac{\text{g}}{\text{mol}} PVC \div 35.45\ \text{g/mol Cl}\right).$$

The amount of halogen can also be determined by the stated amount of PVC in the PET enriched stream/pile or the PET depleted stream/pile by solving for halogens in the above stated formula.

The sampling to determine halogen count is to take a random sample from an inventory pile.

In one embodiment, the halogen count or the PVC content is representative of an average over a test period of 3 days, or 7 days, or 20 days, or 30 days, or 60 days, or 90 days, or 120 days. In such a case, the method employed to determine the halogen or PVC content is to daily take a set of four samples with equal weight between 100 g to 1 kg from the PET depleted stream or PET depleted inventory pile over the test period (e.g. 10 days, 20 days, 30 days). One sample is taken from the top % of the pile, the remaining three from the ⅓ quadrants around the pile at a depth below 0.2 meters from the surface. The daily halogen count is taken as a median average of the four samples, and the halogen count over the test period is taken as a median average over the days in the test period. The method for determining the halogen content is combustion ion chromatography. In the method, the plastic samples are ground using a 1.0 mm discharge screen. Combustion ion chromatography is then performed on 15 mg the ground sample.

The sampling to determine halogen count or the PVC content can be taken directly from the PET depleted stream or the PET enriched stream or from a packaged quantity derived from said streams, such as a quantity placed in a super sack or other bulk container. In one embodiment where the sampling is taken directly from the subject stream, the sampling method comprising taking at least 4 samples, each weighing between 100 g to 1 kg, from the production line of dry particulate plastics, with each sample being spaced 5 minutes apart. In one embodiment, where the sampling is taken from a packaged quantity of the subject stream, one sample, weighing between 100 g to 1 kg, is taken from the top of each of four such containers (e.g., super sacks), with a minimum duration between samples of 24 hours over the test period (e.g., 10 days, 20 days, 30 days).

In any of the halogen values mentioned throughout, the halogen count is representative of chlorine, bromine and fluorine, and in each case, the mention of halogen content provides support for expressing a limitation of the halogen content to chlorine. The stated amounts of halogens, PVC, or microorganisms throughout this description can be with respect to an inventory pile having a volume of at least any one of the stated values below, e.g. greater than 76.46 m³ (100 yd³), greater than 382.28 m³ (500 yd³), or greater than 764.56 m³ (1000 yd³), or from 76.46 m³ (100 yd³) to 191,139 m³ (250,000 yd³), or from 382.28 m³ (500 yd³) to 152,911 m³ (200,000 yd³), or from 764.56 m³ (1000 yd³) to 76,455 m³ (100,000 yd³).

The stated amounts of halogens, PVC, or microorganisms can be with respect to an inventory pile or particulate plastic solid stream derived from a stream or other quantity of mixed plastic waste having a volume of at least any of the stated values below, e.g., greater than 76.46 m³ (100 yd³), greater than 382.28 m³ (500 yd³), or greater than 764.56 m³

(1000 yd³), or from 76.46 m³ (100 yd³) to 191,139 m³ (250,000 yd³), or from 382.28 m³ (500 yd³) to 152,911 m³ (200,000 yd³), or from 764.56 m³ (1000 yd³) to 76,455 m³ (100,000 yd³). The process from which the inventory pile or particulate plastic solid stream is produced from the mixed plastic waste can be a continuous process, such as a continuous plastic separation process, and especially a continuous density separation process. The inventory pile or particulate plastic solid stream can be produced by the continuous process at an average rate of at least 2,000 lbs/hr, at least 3,500 lb/hr, at least 5,000 lb/hr, at least 6,500 lb/hr, at least 8,000 lb/hr, at least 9,500 lb/hr, or at least 10,000 lb/hr, wherein the average rate is calculated based upon at least 4 contiguous hours of operation daily, for a period of at least 10 days, at least 20 days, or at least 30 days.

In one embodiment or in combination with any of the mentioned embodiments, the process by which the mixed plastic waste is separated into a polyolefin-enriched stream and PET-enriched stream can also effect a separation of the halogen content of the mixed plastic waste, so that one product stream becomes enriched in halogens and one becomes depleted in halogens. Commonly, the PET-enriched stream is the stream that becomes enriched in halogens, although this need not always be the case and can depend upon the characteristics of the plastic present in the mixed plastic waste and the relative quantities of polyolefin and PET in the mixed plastic waste. The ratio of halogens present in the polyolefin-enriched stream or inventory pile formed therefrom to halogens present in the PET-enriched stream or inventory pile formed therefrom (expressed as a decimal number) can be less than 5, less than 4.5, less than 4, less than 3.5, less than 3, less than 2.5, less than 2, less than 1.5, less than 1, or less than 0.9 and/or at least 0.1, at least 0.15, at least 0.25, at least 0.3, at least 0.4, at least 0.5, or at least 0.65, or at least 0.8. The ratio of halogens present in the polyolefin-enriched stream or inventory pile formed therefrom to halogens present in the PET-enriched stream or inventory pile formed therefrom can be from 0.1 to 5, from 0.15 to 4.5, from 0.25 to 4, from 0.3 to 3.5, from 0.4 to 3, from 0.5 to 2.5, or from 0.65 to 2 or from 0.8 to 1.5.

In one embodiment or in combination with any of the mentioned embodiments, the first PET-enriched stream 142 and the second PET-enriched stream 120 described according to any of the embodiments above can be recovered as a PET-enriched material product. However, the second PET-enriched stream 120 can have a higher concentration of PET on a dry basis than the first PET-enriched stream 142. The first PET-enriched stream 142 can comprise at least 75, at least 90, at least 95, at least 98, or at least 99 weight percent PET on a dry plastic basis. The second PET-enriched stream 120 can comprise at least 90, at least 95, at least 98, at least 99, at least 99.5, at least 99.8, or at least 99.9 weight percent PET on a dry plastic basis.

In one embodiment or in combination with any of the mentioned embodiments, the first PET-enriched stream 142 can comprise 75 to 99.9, 90 to 99.8, or 95 to 99 weight percent PET on a dry plastic basis. The second PET-enriched stream 120 can comprise 90 to 100, 95 to 99.9, 98 to 99.8, or 99 to 99.5 weight percent PET on a dry plastic basis.

Embodiments that utilize specific arrangements of sink-float and/or centrifugal force density separation stages are described below. It will be understood that the embodiments described below generally have the same or similar stream compositions, separation efficiencies, and other features described above unless otherwise stated.

In one embodiment or in combination with any of the mentioned embodiments, each of the first 140 and second 150 density separation stages comprise a sink-float density separation stage.

Figure 3:
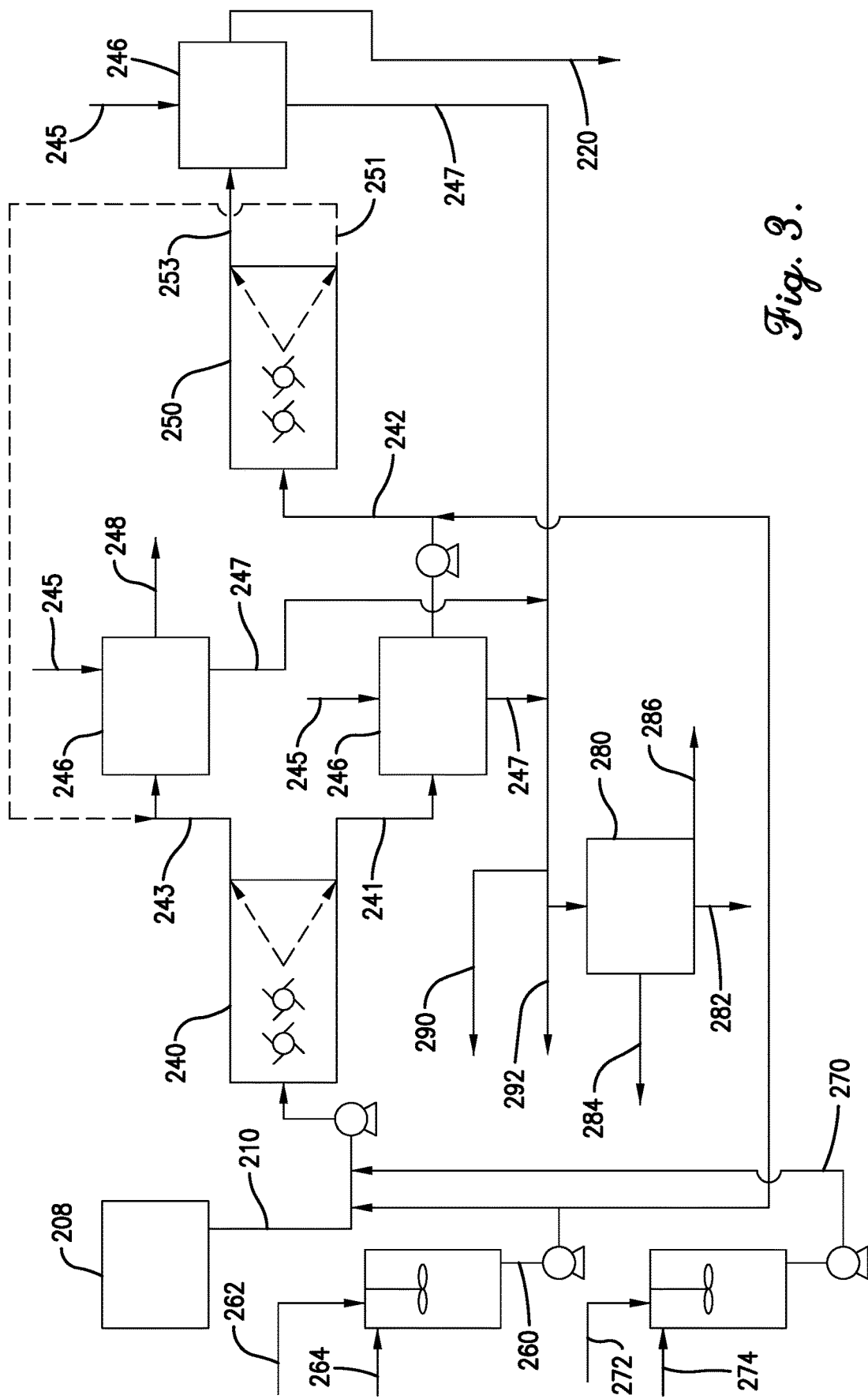
FIG. 3 depicts a detailed process for separating MPW into a PET-enriched stream and a PET-depleted stream according to one embodiment of the present invention.

As depicted in FIG. 3, in one embodiment or in combination with any of the mentioned embodiments, the first sink-float density separation stage 240 is the low-density separation stage and the second sink-float density separation stage 250 is the high-density separation stage.

Turning to FIG. 3, mixed plastic waste (MPW) particulates 210 are fed from a plastic granulator 208 or other source to a low-density sink-float separation stage 240. In one embodiment or in combination with any of the mentioned embodiments, the MPW particulates 210 are provided as solid plastic particulates, as described herein. A liquid medium, as described herein, can be combined with the mixed plastic waste particulates 210 being fed to the low-density sink-float stage 240. The liquid medium may be fed directly into the low-density sink-float stage 240 without being combined with the MPW particulate feed 210. The liquid medium may be fed into one or more other locations within the process discussed below, including into an outlet stream 242 from the first separation stage 240 and/or directly into the second separation stage 250. It will be understood that the liquid medium used in this and other embodiments described below can be selected depending on the desired target separation density of the separation stage.

In the embodiment shown in FIG. 3, a concentrated salt solution 260 is prepared by mixing a salt component 262 with water 264 to form a concentrated salt solution 260 as the liquid medium. As shown, the concentrated salt solution 260 is fed to both of the first 240 and second 250 sink-float separation stages. In one embodiment or in combination with any of the mentioned embodiments, the same concentrated salt solution 260 is fed to both separation stages 240, 250, and the flow rates of the concentrated salt solution 260 to each separation stage are independently controlled such that the salt concentration in one of the first 240 or second 250 sink-float stages is greater than the other of the first 240 or second 250 sink-float stage. In embodiments such as shown in FIG. 3, the flow rates of the concentrated salt solution 260 to each separation stage are independently controlled such that the salt concentration in the first sink-float stage 240 is less than the salt concentration of the second sink-float stage 250. The salt concentration and/or flow rates can be selected or varied as necessary to achieve the desired target separation density and efficiency within each density separation stage. It will be understood that the same or similar process shown in FIG. 3 may be carried out using a saccharide solution or other liquid medium within the scope of this technology.

A caustic solution 270 may also be prepared and combined with the MPW particulates 210 or separately added to the first sink-float stage 240. In one embodiment or in combination with any of the mentioned embodiments, a caustic solution 270 may be fed into one or more other locations within the process discussed below, including into an outlet stream 242 from the first separation stage 240, directly into the second separation stage 250, and/or into one or more enriched streams from the first 240 or second 250 separation stage. The caustic solution 270 may be prepared by mixing a caustic component 272 with water 274. The caustic solution 270, which can be heated (not shown), also acts as a cleaning and/or sanitizing agent for the process equipment, killing pathogens and reducing odors within the streams and/or equipment. The caustic solution 270 generally comprises a base (or strong base) solution. In one embodiment or in combination with any of the mentioned embodiments, the caustic solution has a pH of greater than 7, greater than 8, greater than 9, or greater than 10. The caustic solution 270 can comprise a hydroxide compound, such as sodium hydroxide, potassium hydroxide, calcium hydroxide, lithium hydroxide, strontium hydroxide, barium hydroxide, and/or cesium hydroxide. The caustic solution 270 can have a caustic component concentration of 2 to 100 mg/L. However, as described above, the concentrated salt solution may comprise a caustic component. Thus, in one embodiment or in combination with any of the mentioned embodiments, no separate caustic solution and/or caustic component is introduced to the density separation stage(s).

The low-density sink-float stage 240 produces at least two outputs, including a heavies output stream 241 and low density (lights) stream 243, which generally comprises predominantly plastics having a lower density than the heavies output stream 241. In one embodiment or in combination with any of the mentioned embodiments, the heavies output stream 241 is PET-enriched. The heavies output stream 241 can be PVC-enriched. The low-density stream 243 can be polyolefin-enriched.

In the embodiment of FIG. 3, both the low-density stream 243 and heavies output stream 241 from the low-density sink-float stage 240 are rinsed with water 245. The resulting light wet plastics 248 from the low-density stream 241 are dried and optionally stored for use in downstream plastic chemical recycling processes.

After rinsing, the PET-enriched heavies output stream 242 is fed into a high-density sink-float stage 250. The high-density sink-float stage 250 produces at least two outputs, including a high density, heavies-enriched stream 251 and a medium density, PET-enriched stream 253. The density of the high-density, heavies-enriched stream 251 is higher than the density of the medium density, PET-enriched stream 253, based on the densities of the total plastics in each stream. Additionally, the medium density, PET-enriched stream 253 has a density that is higher than the low density, polyolefin-enriched stream 243 described above, based on the densities of the total plastics in each stream. In one embodiment or in combination with any of the mentioned embodiments, the medium density, PET-enriched stream 253 is also PVC-enriched. The PET-enriched stream 253 from the high-density sink-float stage 250 can then be rinsed with water 245 to produce a PET-enriched wet plastic product stream 220 and dried for use in downstream plastic recycling processes. The high density, heavies stream 251 from the high-density sink-float stage 250 can optionally be combined with the light wet plastics from the low density stream 243 to be rinsed with water 245 and dried, or the high density, heavies stream 251 can be rinsed and dried separately from the light plastics. Although multiple rinsing steps are shown in FIG. 3, it will be understood that one or more of the rinsing steps described herein are optional. While rinsing may reduce the amounts of certain residues (e.g., halides from salts) in the equipment, streams, and final products, in one embodiment or in combination with any of the mentioned embodiments, the separation processes and downstream chemical recycling processes can be performed without removing these residues.

The water used to rinse the plastics after each separation can be recovered in one or more solid/liquid separation units 246. The recovered water 247 can be filtered 290 and/or recycled 292 back for use within the system, for example to be mixed with salt or caustic solutions or to be re-used as rinse water. Additionally, or alternatively, suspended solid components 282 may be recovered from the rinse water 247 by a flocculation process 280, which may also produce a clarified water stream 284 and/or a water purge stream 286.

Figure 4:
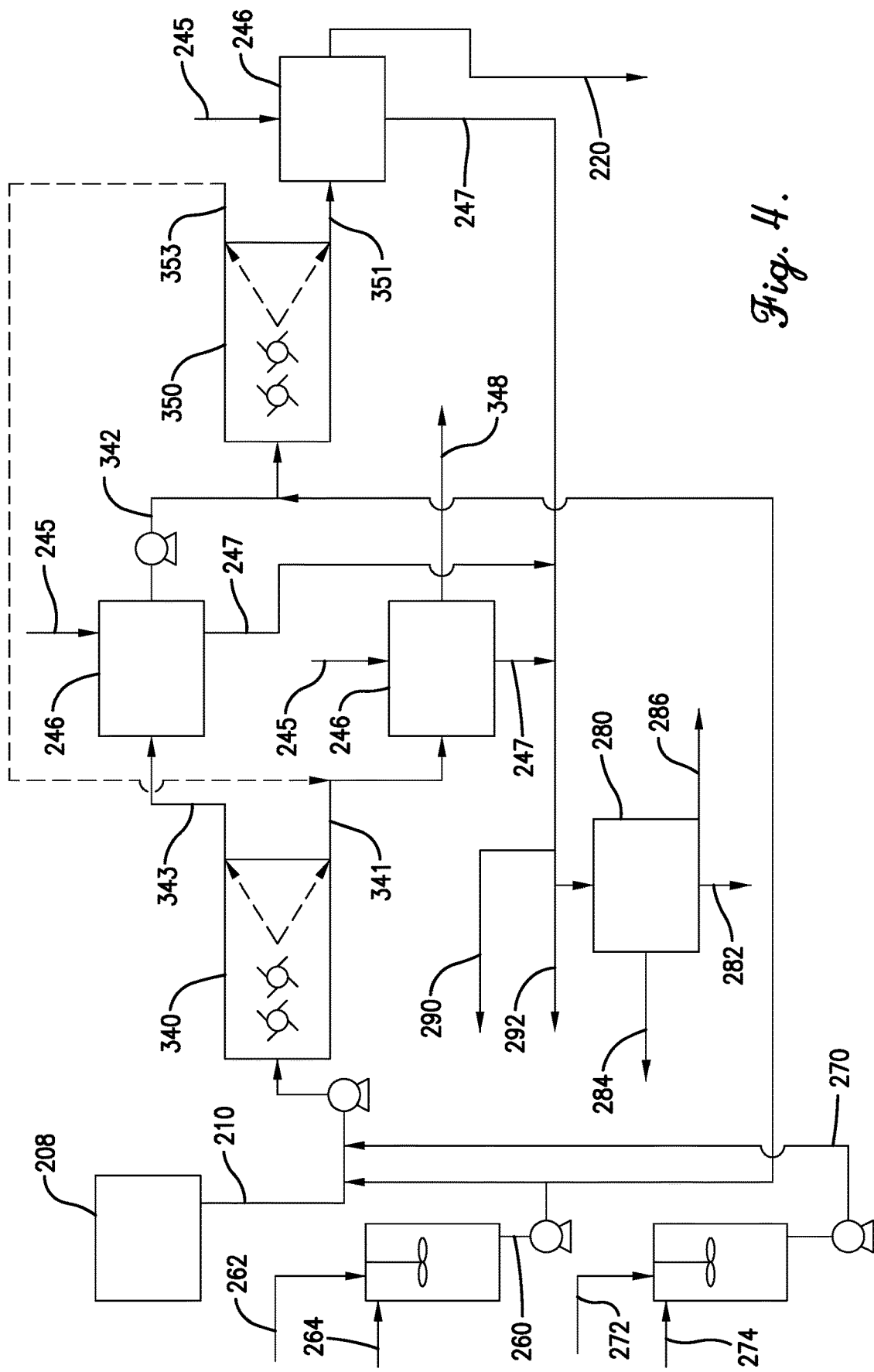
FIG. 4 depicts a detailed process for separating MPW into a PET-enriched stream and a PET-depleted stream according to one embodiment of the present invention.

As depicted in FIG. 4, in one embodiment or in combination with any of the mentioned embodiments, the first sink-float density separation stage 340 is the high-density separation stage and the second sink-float density separation stage 350 is the low-density separation stage.

The embodiment shown in FIG. 4 is similar to the embodiment of FIG. 3, and thus only the differences between the embodiments are discussed below.

In the embodiment of FIG. 4, MPW particulates 210 are fed first to a high-density sink-float separation stage 340. In one embodiment or in combination with any of the mentioned embodiments, the flow rates of the concentrated salt solution 260 to each separation stage are independently controlled such that the salt concentration in the first sink-float stage 340 is greater than the salt concentration in the second sink-float stage 350. Importantly, the concentrated salt solution 260 may be used to set and/or adjust the target separation density of the density separation stage(s), for example, by providing a salt solution having a density at or near the target separation density.

The high-density sink-float stage 340 produces at least two outputs, including a lights output stream 343 and high density (heavies) stream 341, which comprises plastics having a higher density than the plastics of the lights output stream 343. In one embodiment or in combination with any of the mentioned embodiments, the lights output stream 343 is PET-enriched. The lights output stream 343 can be PVC-enriched. The high-density stream 341 can be PET-depleted, PVC-depleted, and/or polyolefin-depleted.

In the embodiment of FIG. 4, both the high-density stream 341 and lights output stream 343 from the high-density sink-float stage 340 are rinsed with water 245. The resulting heavy wet plastics 348 from the high-density stream 341 are dried and optionally stored for use in downstream plastic chemical recycling processes.

After rinsing, the PET-enriched lights output stream 342 is fed into a low-density sink-float stage 350. The low-density sink-float stage 350 produces at least two outputs, including a low-density lights-enriched stream 353 and a medium density PET-enriched stream 351. The density of the particulate plastic solids of low-density lights-enriched stream 353 is less than the density of the particulate plastic solids of the medium density PET-enriched stream 351. Additionally, the density of the particulate plastic solids of the medium density PET-enriched stream 351 has a density that is less than the density of the particulate plastic solids of the high-density polyolefin-depleted stream 341 described above, based on the densities of the total plastics in each stream. In one embodiment or in combination with any of the mentioned embodiments, the medium density PET-enriched stream 351 is also PVC-enriched. The PET-enriched stream 351 from the low-density sink-float stage 350 can then be rinsed with water 245 to produce a PET-enriched wet plastic product stream 220 and dried for use in downstream plastic recycling processes. The low-density lights stream 353 from the low-density sink-float stage 350 can optionally be combined with the heavy wet plastics from the high-density stream 341 to be rinsed with water 245 and dried, or the low density lights stream 353 can be rinsed and dried separately from the heavy plastics.

In one embodiment or in combination with any of the mentioned embodiments, each of the first 140 and second 150 density separation stages comprises a centrifugal force density separation stage.

Figure 5:
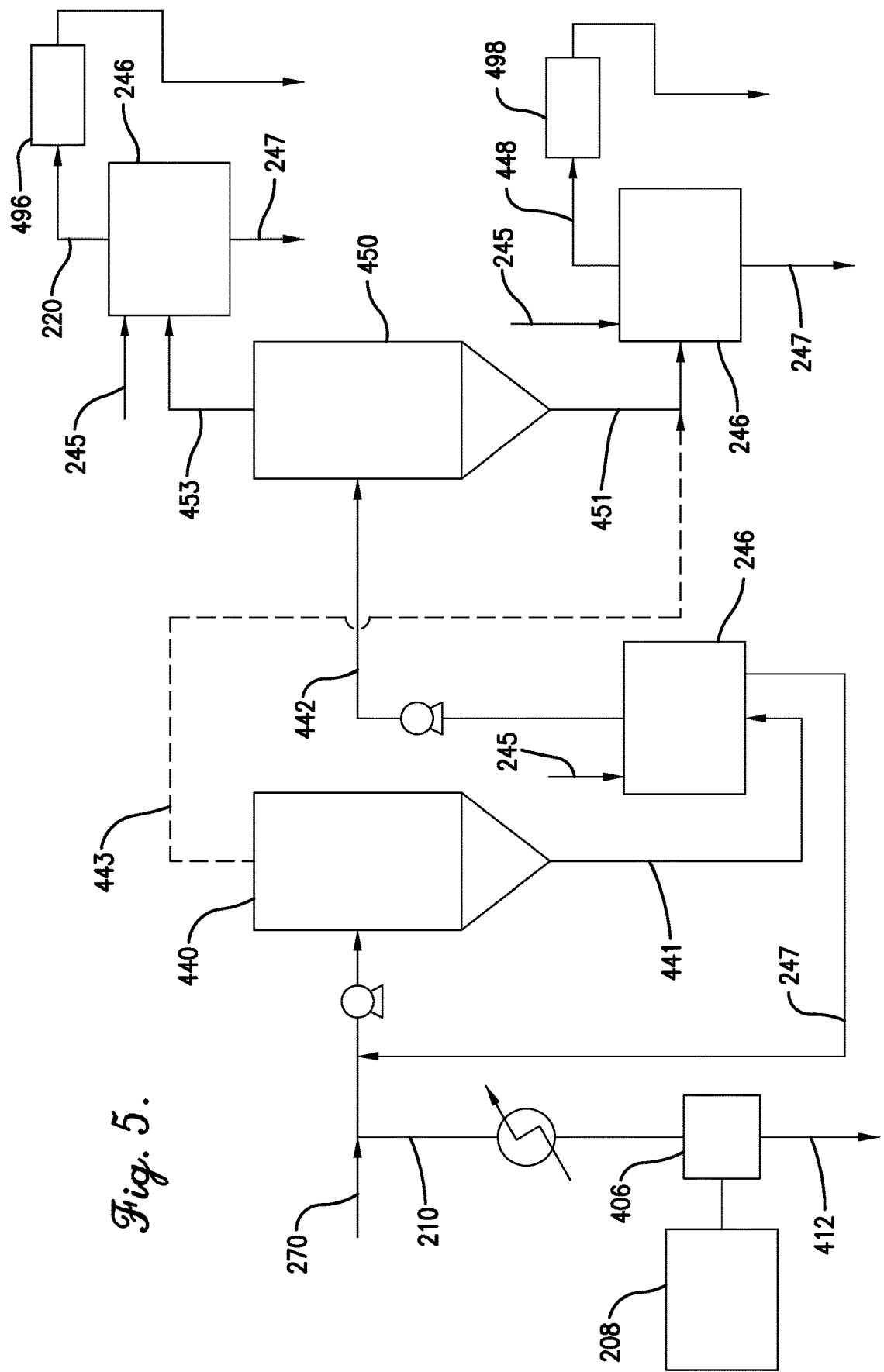
FIG. 5 depicts a detailed process for separating MPW into a PET-enriched stream and a PET-depleted stream according to one embodiment of the present invention.

As depicted in FIG. 5, in one embodiment or in combination with any of the mentioned embodiments, the first centrifugal force density separation stage 440 is the low-density separation stage and the second centrifugal force density separation stage 450 is the high-density separation stage.

Turning to FIG. 5, mixed plastic waste particulates 210 are fed from a plastic granulator 208 or other source to the low-density centrifugal force separation stage 440 (shown in FIG. 5 as a cyclone separator, although it will be understood that other centrifugal force separators may also be used in accordance with the technology herein). In one embodiment or in combination with any of the mentioned embodiments, a drop box 406 or other solids separation system may be used to remove heavy solids 412 from the mixed plastic waste particulates 210 before being fed to the separation stages. The low-density centrifugal force separation stage 440 can be a hydrocyclone separator. Water may be provided to the hydrocyclone as a recycle 247 from stream from downstream rinsing processes or be separately added as a dedicated water feed (not shown). A concentrated salt solution (not shown) may be prepared as described above and combined with the mixed plastic waste particulates 210 or fed directly into the low-density centrifugal force separation stage 440. The use of a concentrated salt solution in the hydrocyclone separator can improve separation efficiency at the target separation density as compared to a hydrocyclone separator using only water. The flow rates of the concentrated salt solution to each separation stage can be independently controlled such that the salt concentration in the first centrifugal force separation stage 440 is less than the salt concentration in the second centrifugal force separation stage 450.

A caustic solution 270 may also be combined with the MPW particulates 210 and fed to the low-density centrifugal force separation stage 440 (as shown in FIG. 5) or separately added to the centrifugal force separation stage without the MPW particulates 210.

The low-density centrifugal force separation stage 440 produces at least two outputs, including a PET-enriched, heavies output stream 441 and a low density (lights) stream 443, which comprises plastics having a lower density than the heavies output stream 441. In one embodiment or in combination with any of the mentioned embodiments, the heavies output stream 441 is PET-enriched. The heavies output stream 441 can also be PVC-enriched. The low-density stream 443 can be polyolefin-enriched.

Both the low-density stream 443 and heavies output stream 441 from the low-density centrifugal force separation stage 440 are rinsed with water 245. The resulting light wet plastics from the low-density stream 443, which are PET-depleted, can be rinsed 246 with water 245 to form a PET-depleted stream 448 and dried 498 and optionally stored for use in downstream plastic recycling processes.

After rinsing, the PET-enriched, heavies output stream 442 is fed into a high-density centrifugal force separation stage 450. Similar to the low-density centrifugal force separation stage 440, a concentrated salt solution (not shown) can be combined with the heavies output stream 442 and fed to the high-density centrifugal force separation stage 450. In one other embodiment or in combination with any of the mentioned embodiments, however, the concentrated salt solution may be fed directly into the high-density centrifugal force separation stage 450 without being combined with the heavies output stream 442.

The high-density centrifugal force separation stage 450 produces at least two outputs, including a high density, heavies stream 451 and a medium density, PET-enriched lights stream 453. The density of the high density, heavies stream 451 is greater than the density of the medium density, PET-enriched lights stream 453, based on the densities of the total plastics in each stream. Additionally, the medium density, PET-enriched stream 453 has a density that is greater than the low-density polyolefin-enriched stream 443 described above, based on the densities of the total plastics in each stream. In one embodiment or in combination with any of the mentioned embodiments, the medium density, PET-enriched stream 453 is also PVC-enriched. The PET-enriched stream 453 from the high-density centrifugal force separation stage 450 can then be rinsed with water 245 to produce a PET-enriched wet plastic product stream 220 and dried 496 for use in downstream plastic recycling processes. The high density, heavies stream 451 from the high-density centrifugal force separation stage 450 can optionally be combined with the light wet plastics from the low density stream 443 to be rinsed 246 with water 245 to form a PET-depleted stream 448 and dried 498, or the high density heavies stream 451 can be rinsed and dried separately from the light plastics.

Figure 6:
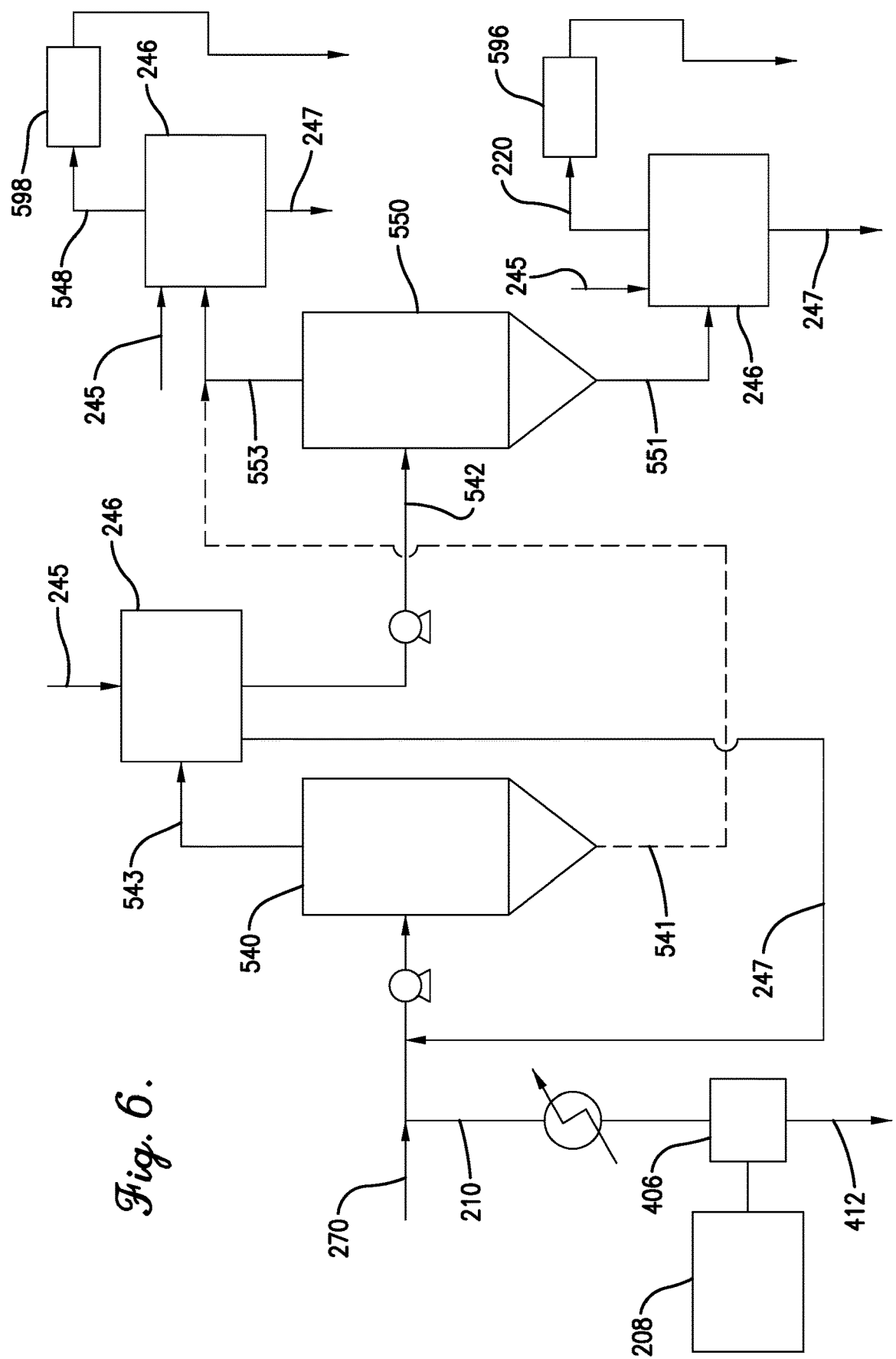
FIG. 6 depicts a detailed process for separating MPW into a PET-enriched stream and a PET-depleted stream according to one embodiment of the present invention.

As depicted in FIG. 6, in one embodiment or in combination with any of the mentioned embodiments, the first centrifugal force density separation stage 540 is the high-density separation stage and the second centrifugal force density separation stage 550 is the low-density separation stage.

The embodiment shown in FIG. 6 is similar to the embodiment of FIG. 5, and thus only the differences between the embodiments are discussed below.

In the embodiment of FIG. 6, mixed plastic waste particulates 210 are fed first to a high-density centrifugal force separation stage 540. In one embodiment or in combination with any of the mentioned embodiments, the flow rates of the concentrated salt solution (not shown) to each separation stage can be independently controlled such that the salt concentration in the first centrifugal force separation stage 540 is greater than the salt concentration in the second centrifugal force separation stage 550, and thus the target separation density of the first centrifugal force separation stage 540 is greater than the target separation density of the second centrifugal force separation stage 550.

The high-density centrifugal force separation stage 540 produces at least two outputs, including a PET-enriched, lights output stream 543 and a high density (heavies) stream 541, which comprises plastics having a higher density than the lights output stream 543. In one embodiment or in combination with any of the mentioned embodiments, the lights output stream 543 is PET-enriched. The lights output stream 543 can also be PVC-enriched. The high-density stream 541 can be PET-depleted, PVC-depleted, and/or polyolefin-depleted, and enriched in plastics having a density greater than PET.

Both the high-density stream 541 and lights output stream 543 from the high-density centrifugal force separation stage 540 are rinsed 246 with water 245. The resulting heavy wet plastics 548 from the high-density stream 541, which are PET-depleted, are dried 598 and optionally stored for use in downstream plastic recycling processes.

After rinsing, the PET-enriched, lights output stream 542 is fed into a low-density centrifugal force separation stage 550. The low-density centrifugal force separation stage 550 produces at least two outputs, including a low density, lights stream 553 and a medium density, PET-enriched heavies stream 551. The density of the low density, lights stream 553 is less than the density of the medium density, PET-enriched heavies stream 551, based on the densities of the total plastics in each stream. Additionally, the medium density, PET-enriched stream 551 has a density that is less than the high density, polyolefin-depleted stream 541 described above, based on the densities of the total plastics in each stream. In one embodiment or in combination with any of the mentioned embodiments, the medium density, PET-enriched stream 551 is also PVC-enriched. The PET-enriched stream 551 from the low-density centrifugal force separation stage 550 can then be rinsed 246 with water 245 to produce a PET-enriched wet plastic product stream 220 and dried 596 for use in downstream plastic recycling processes. The low density, lights stream 553 from the low-density centrifugal force separation stage 550 can optionally be combined with the heavy wet plastics from the high-density stream 541 to be rinsed 246 with water 245 to form a PET-depleted stream 548 and dried 598, or the low-density lights stream 553 can be rinsed and dried separately from the heavy plastics.

In one embodiment or in combination with any of the mentioned embodiments, one of the first 140 and second 150 density separation stages comprises a sink-float density separation stage, and the other of the first 140 and second 150 density separation stages comprises a centrifugal force density separation stage.

Referring again to FIG. 2, in one embodiment or in combination with any of the mentioned embodiments, the first density separation stage 140 is a sink-float separation stage, and the second density separation stage 150 is a centrifugal force separation stage. In one or more such embodiments, the waste plastic separation method generally comprises introducing MPW particulates 110 into a sink-float separation stage and feeding an output 142 from the sink-float separation stage into a centrifugal force separation stage.

Referring again to FIG. 2, in one embodiment or in combination with any of the mentioned embodiments, the first density separation stage 140 is a centrifugal force separation stage, and the second density separation stage 150 is a sink-float separation stage. In one or more such embodiments, the waste plastic separation method comprises introducing MPW particulates 110 into a centrifugal force separation stage and feeding an output 142 from the centrifugal force separation stage into a sink-float separation stage.

Figure 7:
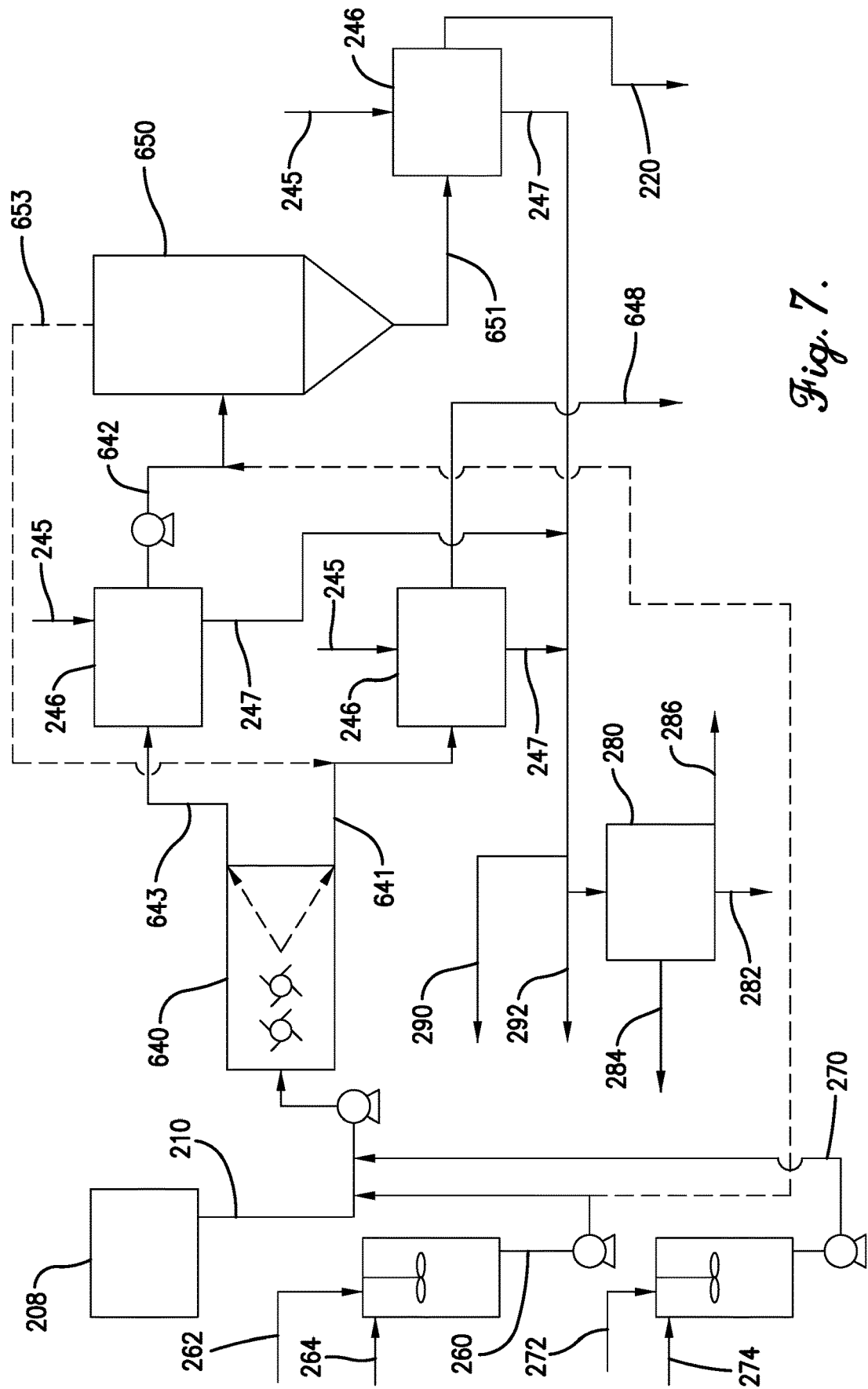
FIG. 7 depicts a detailed process for separating MPW into a PET-enriched stream and a PET-depleted stream according to one embodiment of the present invention.

As depicted in FIG. 7, in one embodiment or in combination with any of the mentioned embodiments, the first density separation stage 640 is a high-density sink-float separation stage and the second density separation stage 650 is a low-density centrifugal force separation stage.

The embodiment shown in FIG. 7 is similar to the embodiment of FIG. 4, and thus only the differences between the embodiments are discussed below.

In the embodiment of FIG. 7, MPW particulates 210 are fed first to a high-density sink-float separation stage 640. In one embodiment or in combination with any of the mentioned embodiments, the flow rates of the concentrated salt solution 260 to each separation stage are independently controlled to achieve the desired target separation density and separation efficiencies for each stage.

The high-density sink-float stage 640 produces at least two outputs, including a lights output stream 643 and high density (heavies) stream 641. The PET-enriched lights output stream 643 is rinsed 246 and fed into the low-density centrifugal force separation stage 650. The low-density centrifugal force separation stage 650 produces at least two outputs, including a low-density lights-enriched stream 653 and a medium density PET-enriched stream 651. The density of the particulate plastic solids of the low-density, lights-enriched stream 653 is less than the density of the particulate plastic solids of the medium density, PET-enriched stream 651. Additionally, the particulate plastic solids of the medium density, PET-enriched stream 651 has a density that is less than the particulate plastic solids of the high density, polyolefin-depleted stream 641. In one embodiment or in combination with any of the mentioned embodiments, the medium density PET-enriched stream 651 is also PVC-enriched. The PET-enriched stream 651 from the low-density centrifugal force separation stage 650 can then be rinsed 246 with water 245 to produce a PET-enriched wet plastic product stream 220 and dried for use in downstream plastic recycling processes. The low-density lights stream 653 from the low-density centrifugal force separation stage can optionally be combined with the heavy wet plastics from the high-density stream 641 to be rinsed 246 with water 245 to form a PET-depleted stream 648 and dried, or the low-density lights stream 653 can be rinsed and dried separately from the heavy plastics.

In one embodiment or in combination with any of the mentioned embodiments, there is also provided facilities and systems for handling of particulate plastic solids obtained from the mixed plastic waste separation systems and processes described herein. In particular, particulate plastic solids handling facilities comprise at least one enclosed structure and a batch or continuous conveyance system associated with the at least one enclosed structure that is configured to selectively deposit the particulate plastic solids into a plastic solids transport system that interconnects the handling facility and a plastic chemical recycling facility and/or at least one inventory pile within the at least one enclosed structure. In one embodiment or in combination with any of the mentioned embodiments, the batch or continuous conveyance system comprises one or more of an elongate overhead conveyor, front end loaders, and/or trucks.

Figure 8:
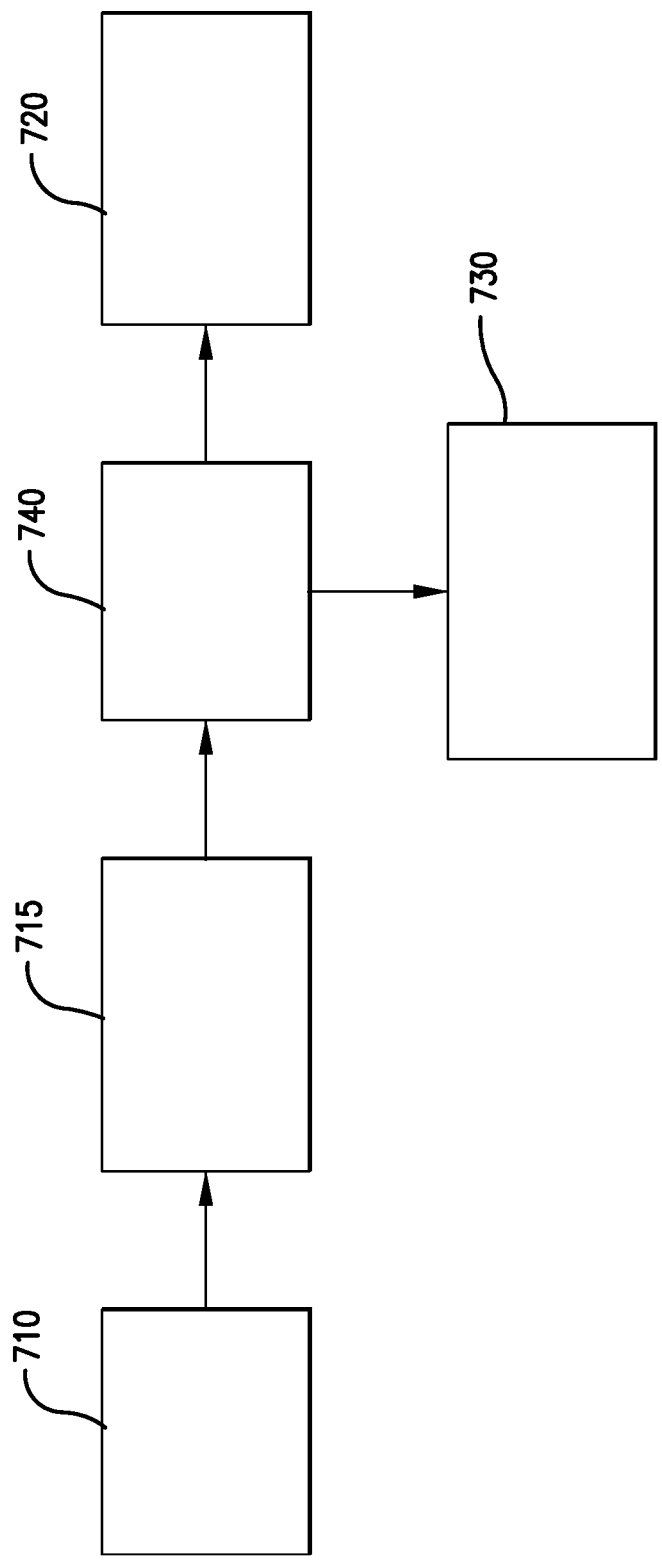
FIG. 8 depicts a general process for separating MPW into a PET-enriched stream and a PET-depleted stream according to one embodiment of the present invention.

In one embodiment or in combination with any of the mentioned embodiments, quantities of particulate plastic solids are provided from a feedstock comprising mixed plastic waste (also referred to herein as MPW). Turning to FIG. 8, such a feedstock 710 is provided. The feedstock 710 may be any mixed waste plastic described herein, such as that obtained from a materials recovery facility or a plastics reclaiming facility. The mixed plastic waste feedstock 710 generally comprises plastic solids having at least one dimension that is greater than 2.54 cm (one inch), greater than 1.91 cm (0.75 inch), or greater than 1.27 cm (0.5 inch), such as used containers. In one embodiment or in combination with any of the mentioned embodiments, the mixed plastic waste feedstock 710 comprises plastic solids having at least one dimension that is 1.27 cm to 25.4 cm, 1.91 cm to 19.1 cm, or 2.54 cm to 12.7 cm.

The mixed plastic waste feedstock 710 may also comprise a plurality of plastic solids that, at one time, had at least one dimension of greater than 2.54 cm (one inch), but the solids may have been compacted, pressed, or otherwise aggregated into a larger unit, such as a bale. However, plastic solids having at least one dimension greater than 2.54 cm (one inch), greater than 1.91 cm (0.75 inch), or greater than 1.27 cm (0.5 inch) are not ideal for the separation and/or recycling processes described herein. Therefore, in one embodiment or in combination with any of the mentioned embodiments, the feedstock 710 is subjected to a mechanical size reduction operation 715, such as grinding, shredding, guillotining, chopping, or other comminuting process that results in the production of particles having a smaller size than the material fed to the size reduction operation. It is important to note that the mechanical size reduction operation 715 includes a size reduction other than crushing, compacting, or forming plastic into bales.

Following mechanical size reduction 715, the particles of the mixed plastic waste are directed to a separation process 740 as described herein, in order to sort the particles into at least one stream that is enriched in polyethylene terephthalate 720 and at least one stream that is enriched in polyolefins 730, with enrichment being relative to the feed stream to the separation process 740. In one embodiment or in combination with any of the mentioned embodiments, the enriched streams 720, 730 from the separation process 740 can then be used in a chemical recycling process.

Figure 9:
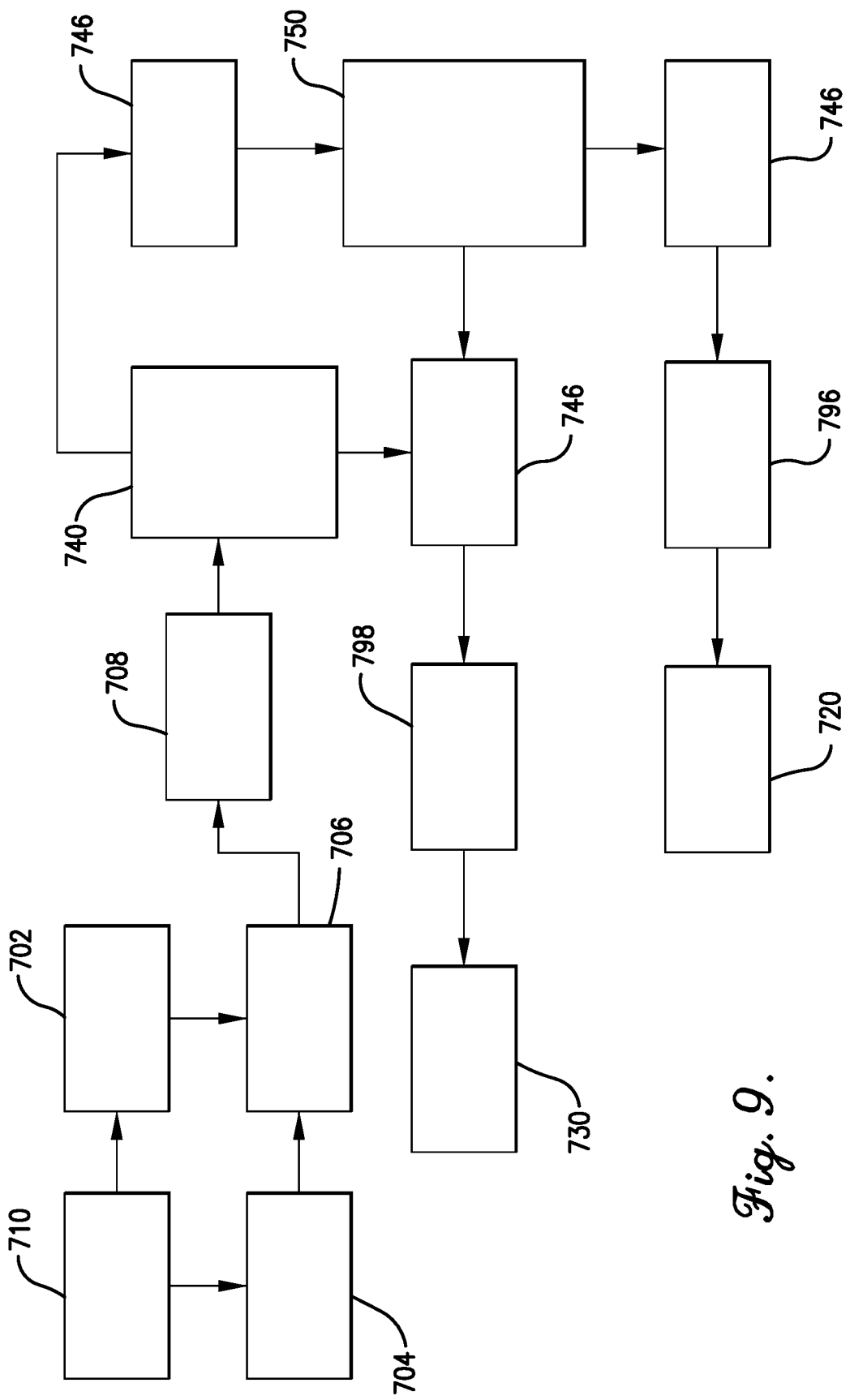
FIG. 9 depicts a general process for separating MPW into a PET-enriched stream and a PET-depleted stream utilizing two density separation stages according to one embodiment of the present invention.

FIG. 9 depicts a more detailed embodiment in which mixed plastic waste is made into sorted plastic particulate streams enriched in either polyethylene terephthalate or polyolefins.

As can be seen, the unsorted mixed plastic waste (as feedstock) 710, which can be obtained from a variety of sources as described above, is transported to a site via, for example, train cars or tractor trailers. In one embodiment or in combination with any of the mentioned embodiments, the unsorted plastic waste may comprise various organic contaminants or residues that may be associated with the plastic waste material's previous use. For example, the plastic waste may comprise food or beverage soils, especially if the plastic material was used in food or beverage packaging. Accordingly, the mixed plastic waste may also contain microorganism contaminants, which grow upon and consume the food or beverage residues present within the plastic waste, and compounds produced by the microorganisms. Exemplary microorganisms that may be present on the surfaces of the plastic solids making up the mixed plastic waste include *E. coli, salmonella, C. dificile, S. aureus, L. monocytogenes, S. epidermidis, P. aeruginosa*, and *P. fluorescens*. Various microorganisms can produce compounds that cause malodors. Exemplary odor-causing compounds include hydrogen sulfide, dimethyl sulfide, methanethiol, putrescine, cadaverine, trimethylamine, ammonia, acetaldehyde, acetic acid, butanoic acid, propanoic acid, and/or butyric acid. Thus, it can be appreciated that the mixed plastic waste could present odor nuisance concerns. Therefore, in one embodiment or in combination with any of the mentioned embodiments, the mixed plastic waste may be stored within an enclosed space, such as a shipping container, enclosed railcar, or enclosed trailer until it can be processed further. In certain embodiments, the mixed plastic waste, once it reaches the site where sorting of the plastic waste is to occur, is stored with the enclosed spaces for no more than one week, no more than 5 days, no more than 3 days, no more than 2 days, or no more than 1 day.

In one embodiment or in combination with any of the mentioned embodiments, any odor generated by the mixed plastic waste or particulate plastic solids can be evaluated through sampling of the headspace air within the enclosure in which the plastic is contained. For example, the odor can be quantitatively assessed through direct measurement of the concentration of any odor-causing compounds present in the sample using, for example, gas chromatography. Additionally and/or alternatively, the odor can be qualitatively assessed through use of an "odor panel" comprised of a certain number of individuals who smell samples of the headspace air and then assign an odor rating for each sample. The results of the odor panel survey can then be statistically analyzed to determine whether any odor remediation steps need to be taken with respect to a certain plastic material.

In one embodiment or in combination with any of the mentioned embodiments, the mixed plastic waste is provided in bales of unsorted or presorted plastic, or in other large, aggregated forms. The bales or aggregated plastics undergo an initial process in which they are broken apart. In one embodiment or in combination with any of the mentioned embodiments, plastic bales can be sent to a debaler machine 702 that comprises, for example, one or more rotating shafts equipped with teeth or blades configured to break the bales apart, and in some instances shred, the plastics from which the bales are comprised. In one other embodiment or in combination with any of the mentioned embodiments, the bales or aggregated plastics can be sent to a guillotine machine 704 where they are chopped into smaller sized pieces of plastic. The debaled and/or guillotined plastic solids can then be subjected to a sorting process 706 in which various non-plastic, heavy materials, such as glass, metal, and rocks, are removed. This sorting process 706 can be performed manually or by a machine. In one embodiment or in combination with any of the mentioned embodiments, sorting machines may rely upon optical sensors, magnets, or sieves to identify and remove the heavy materials.

As explained above, the mixed plastic waste may comprise multi-layer polymers and/or other multi-component polymers comprising two or more synthetic or natural polymer components and/or non-polymer solids combined or otherwise associated together. When polymer components having densities less than that of PET, such as nylons and polyolefins, are combined or associated with PET, the effective densities of such multi-layer plastics and multi-component plastics are also less than the density of PET. Thus, during density separation processes, such multi-layer polymers and multi-component polymers are separated into the PET-depleted stream(s), such as a polyolefin-enriched stream. Similarly, when polymer and non-polymer solid components having densities greater than that of PET, such as metals and heavy plastics, are combined or associated with PET, the effective densities of such multi-layer plastics and multi-component plastics are also greater than the density of PET. Thus, during density separation processes, such multi-layer polymers and multi-component polymers are separated into the PET-depleted stream(s), such as a heavies-enriched stream. While this may result in acceptably high PET purity in the PET-enriched stream, there may be excessive PET yield loss due to the combined or associated PET being separated to the PET-depleted stream(s). In one embodiment or in combination with any of the mentioned embodiments, the mixed plastic waste may undergo one or more pre-washing and/or friction washing processes (not shown) prior to being fed to the density separation process(es). As indicated above, such pre-washing and/or friction washing processes may be particularly effective at separating nylons and other synthetic or natural polymers or non-polymer solids associated with PET in the form of multi-layer polymers or other multi-component polymers. For example, the friction imparted on the plastic articles and/or particulates during such processes can pull apart and disassociate the individual plastic components in the multi-layer polymers. Grinders and/or other size reduction processes may have a similar effect. Additionally or alternatively, the use of caustic solutions and/or heat can also dissociate the individual components in multi-layer polymers, particularly those associated by adhesives. In one embodiment or in combination with any of the mentioned embodiments, one or more of the density separation processes may also be effective in dissociating the individual components of multi-layer polymers or other multi-component polymers, particularly density separation processes using a caustic liquid medium and/or imparting friction onto the particulates (e.g., hydrocyclones). When the multi-component polymer comprises a heterogenous mixture of PET, a compatibilizer, and at least one other synthetic or natural polymer or non-polymer solid combined in a single phase, friction washers and/or cyclones could impart enough energy to dissociate these components, particularly with sufficient heat and a caustic solution at high pH.

In one other embodiment or in combination with any of the mentioned embodiments, the mixed plastic waste may already have undergone some initial separation and/or size-reduction process. In particular, the mixed plastic waste may be in the form of particles or flakes and provided in some kind of container, such as a sack. Depending upon the composition of these plastic solids and what kind of pre-processing they may have been subjected to, the plastic particulates may bypass the debaler 702, guillotine 704, and/or heavies removal station 706 and proceed directly to the granulating equipment 708 for further size reduction.

In one embodiment or in combination with any of the mentioned embodiments, the debaled or broken apart plastic solids are sent to comminution or granulating equipment 708 in which the plastic solids are ground, shredded, or otherwise reduced in size. The plastic materials can be made into particles having an average D90 particle size of less than 2.54 cm (1 inch), less than 1.91 cm (¾ inch), or less than 1.27 cm (½ inch). The average D90 particle size of the plastic materials exiting the granulating equipment can be from 0.16 cm (1/16 inch) to 2.54 cm (1 inch), 0.32 cm (⅛ inch) to 1.91 cm (¾ inch), 0.64 cm (¼ inch) to 1.59 cm (⅝ inch), or 0.95 cm (⅜ inch) to 1.27 cm (½ inch).

Once reduced in size, the particulate plastic can be fed to a density separation process, such as those described herein. Generally, however, the density separation process comprises first 740 and second 750 density separation stages that produce at least two plastic streams having different densities. Each stream exiting each separator undergoes a mechanical dewatering process 746. At least a portion of a plastic stream from the first density separation stage 740 is sent to a second density separation stage 750 that, again, produces at least two plastic streams of different density. As illustrated in FIG. 9, a product stream from the first density separation stage 740 is combined with a product stream from the second density separation stage 750. In one embodiment or in combination with any of the mentioned embodiments, these streams comprise polyolefin enriched streams, comprising higher density and lower density polyolefins. The other product stream from the second density separation stage 750 may be a stream enriched in polyethylene terephthalate. The product streams are then dried 796, 798 forming quantities of polyolefin enriched plastic solids 730 and polyethylene terephthalate enriched plastic solids 720.

In one embodiment or in combination with any of the mentioned embodiments, this process produces one or more quantities of particulate plastic solids. One such quantity of particulate plastic solids comprises greater than 70%, greater than 75%, greater than 80%, greater than 85%, greater than 90%, or greater than 95% by weight polyethylene terephthalate. The one quantity of particulate plastic solids can comprise from 70-99%, from 75-95%, or from 80-90% by weight polyethylene terephthalate (PET).

In one embodiment or in combination with any of the mentioned embodiments, one quantity of particulate plastic solids comprises less than 20%, less than 15%, less than 10%, less than 7.5%, less than 5%, less than 2.5%, or less than 1% by weight of halogens and/or halogen-containing compounds, such as polyvinyl chloride. The one quantity of particulate plastic solids can comprise from 0.1-10%, from 0.5-3%, from 1-2.5%, or from 1.25-2% by weight of halogens, such as polyvinyl chloride.

As described herein, halide-containing salts may be used to assist with density separation of the particulate plastic solids. In one embodiment or in combination with any of the mentioned embodiments, it is desirable to wash the separated particulate plastics to remove these salt residues (and halides), as the presence of halides can adversely affect downstream plastic handling and chemical recycling equipment depending upon the metallurgy of the equipment. Therefore, in one embodiment or in combination with any of the mentioned embodiments, one quantity of particulate plastic solids comprises less than 1000 ppm, less than 800 ppm, less than 600 ppm, less than 400 ppm, less than 300 ppm, less than 200 ppm, or less than 100 ppm of halides. The quantity of particulate plastic solids can comprise a halide content of from 50 ppm to 1000 ppm, from 75 ppm to 800 ppm, from 100 ppm to 600 ppm, or from 125 ppm to 400 ppm. By keeping the level of halides below these levels, the corrosive effects of halides on certain metals from which processing equipment may be constructed can be reduced or avoided.

In one embodiment or in combination with any of the mentioned embodiments, one quantity of particulate plastic solids comprises a moisture content of less than 4%, less than 3%, less than 2% or less than 1% by weight. The quantity of particulate plastic solids can comprise a moisture content of from 0.1-4%, 0.5-3%, 0.75-2.5%, or 1-2% by weight.

In one embodiment or in combination with any of the mentioned embodiments, one quantity of particulate plastic solids comprises at least 0.1%, at least 1%, at least 5%, at least 10%, at least 20%, or at least 40% by weight of solid materials that do not phase change below 270° C. and 1 atm. The phase change being referred to herein can be melting, vaporization, or sublimation. The solid materials present in the quantity of particulate plastic solids can include glass, aluminum, ferrous metals (e.g., steel and stainless steel), other non-ferrous metals, rocks, minerals, crosslinked polyethylene (PEX), polytetrafluoroethylene, calcium carbonate, and/or polyvinyl chloride.

In one embodiment or in combination with any of the mentioned embodiments, the particulate waste plastic solids separation comprises treating the particles with a chemical composition that possesses antimicrobial characteristics, thereby forming treated particulate plastic solids. As discussed herein, sodium hydroxide, potassium carbonate, and/or other caustic components can be used in assisting various density separation processes. The caustic solution, such as sodium hydroxide, potassium carbonate, and/or other caustic components, are used in sufficient quantity to control the growth of and/or effect a reduction in the levels of microorganisms present within the particulate plastic solids while simultaneously effecting a separation at the target density. The benefits of controlling microorganisms, some of which may be pathogenic, within the quantity of particulate plastic solids is readily apparent from a human and animal health standpoint. However, microbial growth on the particulate plastic solids could result in the production of organic residue breakdown products or microbial metabolites, which can be malodorous. Therefore, controlling the levels of microorganisms can also reduce the levels of malodorous chemical compounds contained within the plastic solids. In one embodiment or in combination with any of the mentioned embodiments, the treated particulate plastic solids, or one or each of the inventory piles of PET depleted or PET enriched piles, can have a microorganism content of less than $10^9$ CFU/g, less than $10^7$ CFU/g, less than $10^6$ CFU/g, less than $10^5$ CFU/g, or less than $10^4$ CFU/g, or less than $10^3$ CFU/g, or less than $5 \times 10^2$ CFU/g, or not more than $10^2$ CFU/g, or not more than $5 \times 10^1$ CFU/g, or not more than 40 CFU/g, or not more than 30 CFU/g or not more than 20 CFU/g or not more than 10 CFU/g.

In one embodiment or in combination with any of the mentioned embodiments, the unsorted mixed plastic waste can have a microorganism (e.g., fungi and/or bacteria) count of greater than $10^5$ CFU/g, greater than $10^6$ CFU/g, greater than $10^7$ CFU/g, greater than $10^8$ CFU/g, greater than $10^9$ CFU/g, or greater than $10^{10}$ CFU/g.

The microorganism count in the treated particulate plastic solids or in any one or both of the inventory piles, can have a microorganism count that is less than or reduced relative to the unsorted mixed plastic waste stream. This reduction can be achieved, as discussed below, without application of an anti-microbial agent to plastic beyond that contained in a caustic solution in a sink float density separation stage, or without application of any anti-microbial agent to the plastic at any stage from mixed plastic waste feed to inventory piles, inclusive, other than the caustic solution in a sink float density separation stage. The level of reduction in the microbial count from the mixed plastic waste feed to the inventory pile can be variable, and can be by an amount of at least 10%, or at least 20%, or at least 30%, or at least 40%, or at least 50%, or at least 60%, or at least 70%, or at least 80%, or at least 90%, or at least 95%, or at least 97%, or at least 98%, or at least 99%, calculated by the following formula:

$$\% \, Micro.Reduction = \frac{MCmpw - MCtpp}{MCmpw} \times 100$$

where MCmpw is the microorganism count of the mixed plastic waste feed, and MCtpp is the microorganism count of the treated particulate plastic solids. The microorganism counts are determined by any procedure described herein. In one embodiment or in combination with any of the mentioned embodiments, the polyolefin enriched stream of particulate plastic solids from the separation process exhibits a reduction in microorganism (e.g., fungi and/or bacterial) count of at least 80%, at least 90%, at least 99%, at least 99.9%, at least 99.99%, or at least 99.999% relative to the unsorted mixed plastic waste from which it is derived. The PET-enrich stream of particulate plastic solids from the separation process exhibits a reduction in microorganism (e.g., fungi and/or bacteria) count of at least 80%, at least 90%, at least 99%, at least 99.9%, at least 99.99%, or at least 99.999% relative to the unsorted mixed plastic waste from which it is derived. The microorganism counts can be determined according to any accepted method known in the art, including those described herein. For example, bacteria counts can be determined through sampling of the unsorted mixed plastic waste and polyolefin-enriched and PET-enriched streams and growing bacteria colonies using plate count agar (PCA) media. Fungi counts can be determined through sampling of the unsorted mixed plastic waste and polyolefin-enriched and PET-enriched streams and growing fungi colonies using Sabouraud dextrose agar (SDA) media.

In one embodiment or in combination with any of the mentioned embodiments, the process resulting in a reduction in microorganism counts can have a lasting effect in that regrowth of the microorganisms is controlled and/or inhibited. The reduced microorganism levels within the polyolefin and PET-enriched streams, such as those described above, can be maintained for a period of at least 12 hours, at least 24 hours, at least 2 days, at least 5 days, at least 7 days, or at least 14 days. The reduced microorganism levels within the particulate plastic materials can be observed when the materials are placed into one or more inventory piles for the aforementioned periods of time. A sample can be taken from the one or more inventory piles each day over the course of the given period of time and the microbial levels determined, in the manner set forth below for determining microorganism count. The particulate plastic materials, having gone through the separation process, and placed into one or more inventory piles exhibit a reduction of at least 80%, at least 90%, at least 99%, at least 99.9%, at least 99.99%, or at least 99.999% of any of the aforementioned microorganism counts for a period of at least 12 hours, at least 24 hours, at least 2 days, at least 5 days, at least 7 days, or at least 14 days, measured daily. The particulate plastic solids making up the one or more inventory piles exhibiting microorganism control and/or reduced microorganism levels are relatively dry (i.e., low moisture) and can have a moisture content of less than 4%, less than 3%, less than 2% or less than 1% by weight.

In one embodiment or in combination with any of the mentioned embodiments, the aforementioned reduction in microorganism count is obtained through washing of the particulate mixed plastic waste, or sorted particulate plastic solids in a caustic wash that uses any caustic material described herein. Alternatively, or in addition, the reduction in microorganism count is obtained through a density separation process that includes a liquid density separation medium, especially a caustic medium, as described herein.

In one embodiment or in combination with any of the mentioned embodiments, the reduced microorganism count within the particulate plastic solids, dried and/or sorted into PET-enriched and/or polyolefin enriched streams, and optionally placed into one or more inventory piles, is obtained without application of any antimicrobial agent, aside from the aforementioned caustic wash and/or density separation medium employed in the density separation process.

In one embodiment or in combination with any of the mentioned embodiments, the reduced microorganism count within the particulate plastic solids, dried and/or sorted into PET-enriched and/or polyolefin enriched streams, and optionally placed into one or more inventory piles, is obtained without application of any antimicrobial agent after a last density separation stage or step, or after a drying step through application of external heat energy in a vessel, or after a last liquid density separation step. In one embodiment or in combination with any of the mentioned embodiments, the reduced microorganism count within the particulate plastic solids, dried and/or sorted into PET-enriched and/or polyolefin enriched streams, and optionally placed into one or more inventory piles, is obtained through application of an anti-microbial composition simultaneous with a sink-float density separation stage or step, also referred to as an in-situ microorganism reduction method. The anti-microbial composition can be the solution for effecting separation of the plastics by density, such as a caustic solution, or it can be the density separation solution to which an anti-microbial agent is added. The anti-microbial counts can be obtained without addition of any anti-microbial agent to a caustic solution in the sink float separation stage, or without its addition to any density separation stage, or no other agents other than those mentioned herein as forming a caustic solution are contacted with the mixed plastic waste stream or the separated plastics or inventory piles.

The level of microorganisms present within the quantity of particulate plastic solids may be tested according to one of several procedures including: United States Pharmacopeia 34(6)<61> Microbiological Examination of Nonsterile Products: Microbial Enumeration Tests, and ISO 4833-2: 2015 Microbiology of the food chain—Horizontal method for the enumeration of microorganisms—Part 2: Colony count at 30 degrees C. by the surface plating technique, both of which are incorporated by reference herein in their entireties.

In one embodiment or in combination with any of the mentioned embodiments, a basic method of analysis comprises sampling the plastic, preparing the samples, plating a portion of the sample onto a nutritive media, incubating the plate for cultivation of the microorganism, and then counting the colonies generated.

In one embodiment or in combination with any of the mentioned embodiments, sampling of the quantity of particulate plastic material is conducted by collecting at least five random samples from varying locations within the quantity, each sample weighing approximately 10 to 100 grams. Alternatively, the five random samples may be obtained by first collecting a larger sample (e.g., 2.27 kg (5 lbs.)) and then taking the 10 to 100-gram sample from those initial, larger samples. The aim with sampling is to provide a representation of the status of the entire quantity of particulate plastic solids.

Sample preparation may be adapted from either of the methods referred to above by substituting the particulate plastic solids sample for the pharmaceutical or food sample described in the standard. The samples are aseptically collected and placed into a sterile container such as a polymer bag, and then taken to the lab, where a portion of the sample is weighed into a suitable container such as a polymer bag, or a glass or plastic jar/cup. A volume of appropriate buffer/diluent, typically 10 times the weight of sample, is added. Typical buffers/diluents that may be used include buffered sodium chloride-peptone solution, pH 7.0, phosphate buffer solution, pH 7.2, soybean-casein digest broth, peptone water, and Butterfield's phosphate diluent. A surface-active agent such as one gram of Polysorbate 80 may be added per liter to enhance surface wetting and microbial removal from the plastic. The container is sealed and then mixed, either manually or by a mechanical device. Exemplary mechanical devices include an orbital or wrist-action shaker, and a sonicator bath. The mixing is conducted for a period of at least 30 seconds but not more than 30 minutes. Further dilutions may be included to allow for quantification of higher contamination levels.

Following sample preparation, the standard methods are followed for plating a portion of the sample onto a nutritive medium for cultivation of the microorganism (e.g., bacteria and fungi) at appropriate temperatures and times for the microorganisms. Finally, the resulting colonies are counted, and the resulting concentrations of bacteria and fungi is determined by multiplying the colony counts by the dilution.

In one embodiment or in combination with any of the mentioned embodiments, the quantity of particulate plastic solids is isolated from other quantities of plastic solids, especially other quantities of particulate plastic solids. The quantity of particulate plastic solids can be unpackaged or "loose" in that they may be piled on a floor or other platform without being confined to a walled-container.

Figure 10:
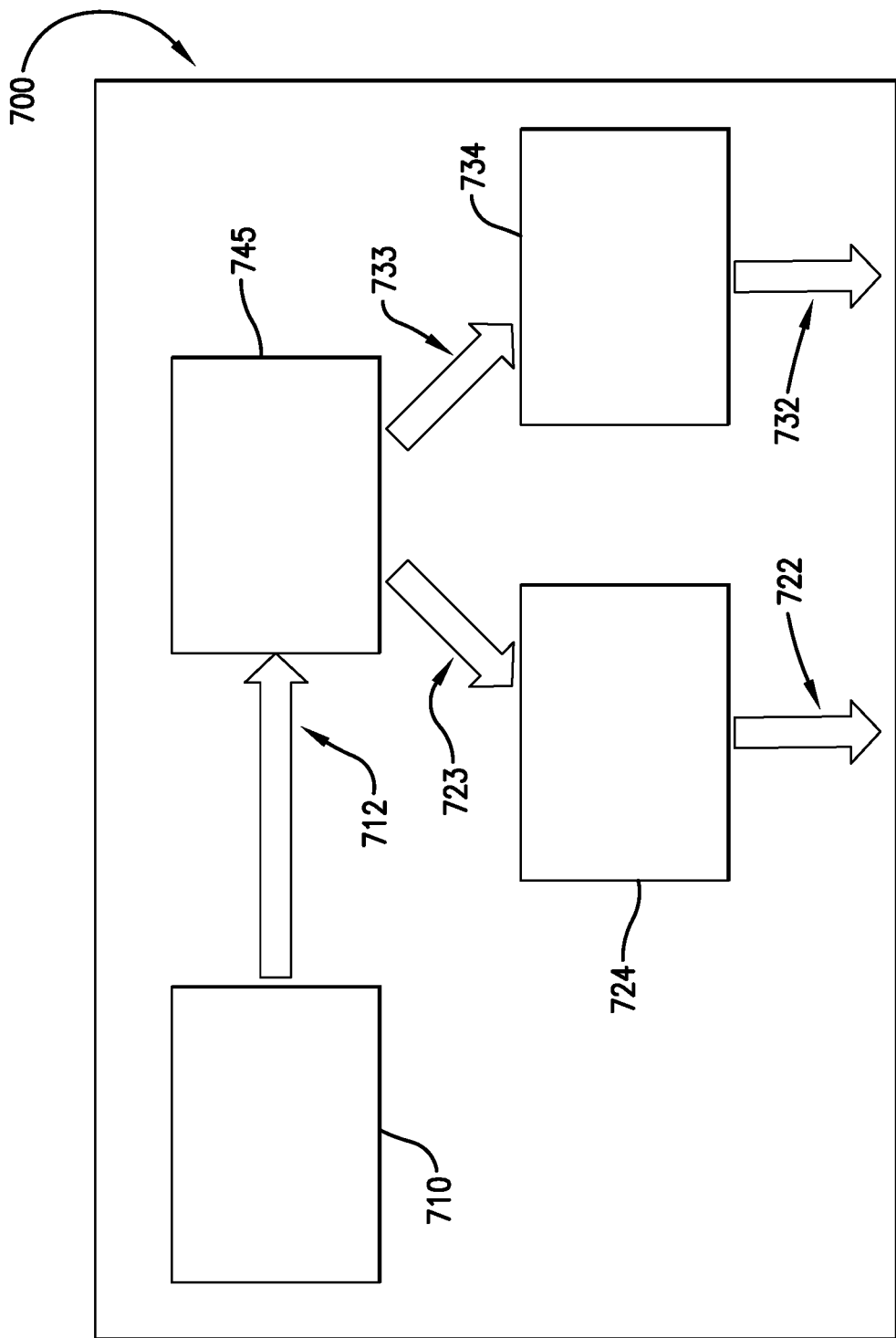
FIG. 10 depicts a plastics separation facility and process according to one embodiment of the present invention.

FIG. 10 illustrates an exemplary plastics separation facility 700 in accordance with one embodiment or in combination with any of the mentioned embodiments. The facility 700 comprises infrastructure for receiving mixed plastic waste as described herein. Such infrastructure can accommodate delivery of mixed plastic waste (shown in FIG. 10 as an unsorted plastic waste feedstock 710) by any useful type of vehicle such as train, truck, or ship (if the facility is situated near a body of water) and comprises equipment to assist in offloading the mixed plastic waste from the vehicle. Once offloaded, the waste plastic 710 can be processed as described above to generate mixed waste plastic particles. These particles are then conveyed 712 to a waste plastic separation system 745, with exemplary separation processes shown in FIGS. 2-7 and described herein. Depending upon the distance between the facility's offloading infrastructure and the waste plastic separation system, the conveyance system employed to transport the particulate waste plastic can be of any type capable of transporting particulate materials. Exemplary conveyance systems include pneumatic conveyors, belt conveyors, bucket conveyors, vibrating conveyors, screw conveyors, cart-on-track conveyors, tow conveyors, trolley conveyors, front-end loaders, trucks, and chain conveyors.

In one embodiment or in combination with any of the mentioned embodiments, the distance between the unsorted waste plastic offloading station and the waste plastic separation system is less than 1609.34 m (one mile), less than 1371.60 m (1500 yards), less than 1143 m (1250 yards), less than 914.40 m (1000 yards), less than 685.80 m (750 yards), less than 457.20 m (500 yards), less than 228.60 m (250 yards), or less than 91.44 m (100 yards).

Following separation of the particulate waste plastic solids within the waste plastic separation system 745, at least two particulate plastic streams are generated: one enriched with polyethylene terephthalate, and one enriched in polyolefins. In one embodiment or in combination with any of the mentioned embodiments, these different streams can be conveyed 722, 732 directly to a downstream chemical recycling process, conveyed 723, 733 to a storage area 724, 734 to await transport to a downstream chemical recycling process, or both simultaneously.

In one embodiment or in combination with any of the mentioned embodiments, the storage area 724, 734, which is discussed in greater detail below, is an enclosed structure comprising a particulate plastic solids inlet for receiving the stream from the separation system and a particulate plastic solids outlet for removing the particulate plastic solids from within the enclosed structure for transport to a downstream chemical recycling process. The inlet and outlet can be interconnected by a conveying system associated with the enclosed structure which may be disposed within the enclosed structure or outside of the enclosed structure. The conveying system can comprise apparatus for diverting the flow of particulate plastic solids being carried thereby and depositing them within the enclosed structure as one of the aforementioned quantities of particulate plastic solids.

In one embodiment or in combination with any of the mentioned embodiments, the quantity of particulate plastic solids deposited within the enclosed structure is greater than 76.46 m³ (100 yd³), greater than 382.28 m³ (500 yd³), or greater than 764.56 m³ (1000 yd³). The quantity of particulate plastic solids deposited within the enclosed structure can be from 76.46 m³ (100 yd³) to 191,139 m³ (250,000 yd³), or from 382.28 m³ (500 yd³) to 152,911 m³ (200,000 yd³), or from 764.56 m³ (1000 yd³) to 76,455 m³ (100,000 yd³). The quantity of particulate plastic solids can be sufficient to operate a downstream chemical recycling process for at least 24 hours, at least 7 days, at least 14 days, or at least 21 days. The quantity of particulate plastic solids can be sufficient to operate a downstream chemical recycling process for a period of time from 24 hours to 90 days, or from 7 days to 75 days, or from 14 days to 60 days, or from 21 days to 45 days. In one embodiment or in combination with any of the mentioned embodiments, the quantity is an isolated quantity. The quantity can be isolated from the separation process in that it is not in continuous fluid or continuous solid/solid communication with the separation process.

In one embodiment or in combination with any of the mentioned embodiments, the particulate plastic solids may be transported directly between the enclosed structure particulate plastic solids inlet and outlet, without being deposited within the structure for any appreciable length of time. However, if the inflow of particulate plastic solids is not sufficient to keep up with the downstream demand for the particulate plastic solids, particulate plastic solids present in a quantity deposited within the enclosed structure may be utilized to make up the shortfall. When the inflow of particulate plastic solids is greater than the downstream demand for the particulate plastic solids, a portion of the particulate plastic solids may be deposited within the enclosed structure for later use. Thus, over time particulate plastic solids may be added to and removed from the quantity being stored within the enclosed structure, resulting in a rotation of particulate plastic solids present within the quantity.

In one embodiment or in combination with any of the mentioned embodiments, the quantity of particulate plastic solids has a volume of at least 764.56 m³ (1000 yd³) over the course of an entire month, and the average D90 particle size within the quantity of particulate plastic solids over that one month period is less than 2.54 cm (1 inch), less than 1.91 cm (¾ inch), or less than 1.27 cm (½ inch). The monthly average D90 particle size of the particulate plastic solids within the quantity stored in the enclosed structure can be from 0.16 cm (¹⁄₁₆ inch) to 2.54 cm (1 inch), 0.32 cm (⅛ inch) to 1.91 cm (¾ inch), 0.64 cm (¼ inch) to 1.59 cm (⅝ inch), or 0.95 cm (⅜ inch) to 1.27 cm (½ inch).

In one embodiment or in combination with any of the mentioned embodiments, the quantity of particulate plastic solids comprises at least at least 764.56 m³ (1000 yd³), at least 1911.39 m³ (2500 yd³), at least 3822.77 m³ (5000 yd³), at least 7645.55 m³ (10,000 yd³), or at least 15,291.10 m³ (20,000 yd³) of the particulate plastics solids that have been a part of the quantity for at least 24 hours, at least 48 hours, or at least 72 hours.

In one embodiment or in combination with any of the mentioned embodiments, at least two compositionally distinct quantities of plastic solids are co-located. One or more particular embodiments are directed toward at least first and second co-located quantities of plastic solids, wherein the first quantity of plastic solids comprises plastic materials that have not been processed to reduce the level of microorganisms thereon, and wherein the second quantity of plastic solids comprises plastic materials that have been processed to reduce the level of microorganism thereon. The first quantity of plastic solids can comprise a mixed waste plastic such as described herein. The first quantity comprises plastic solids in a bulk form, such as in bales, which have not been subjected to a mechanical comminution process. Alternatively, the first quantity comprises plastic solids that have undergone a size reduction operation, such as grinding, chopping, guillotining, debaling, pelletizing, or granulating. In one embodiment or in combination with any of the mentioned embodiments, the first quantity need not be housed in an enclosed structure and can be present as a non-enclosed pile that is exposed to the elements. In one particular embodiment or in combination with any of the mentioned embodiments, the second quantity of plastic solids comprises plastic solids that have been enriched in either polyethylene terephthalate or polyolefins relative to the first quantity of plastic solids. The second quantity of plastic solids may have also been subjected to a mechanical comminution process, such as described herein.

In one other embodiment or in combination with any of the mentioned embodiments, the first quantity of plastic solids comprises plastic solids, especially particulate plastic solids, that have been processed to reduce the level of microorganisms thereon, such as described herein and having the qualities described herein. In one particular embodiment or in combination with any of the mentioned embodiments, the first quantity of plastic solids comprises particulate plastic solids that have been enriched in either polyethylene terephthalate or polyolefins. In a specific embodiment, the first quantity of plastic solids is enriched in polyolefins relative to the second quantity of plastic solids, and the second quantity of plastic solids is enriched in polyethylene terephthalate relative to the first quantity of plastic solids. The second quantity of plastic solids can comprise plastic solids that have been subjected to a mechanical comminution process.

In one embodiment or in combination with any of the mentioned embodiments, the first and second co-located quantities of plastic solids have not been commingled and are maintained as separate, discrete quantities. The first quantity of plastic solids can be housed in at least one first enclosed structure. For example, the first quantity of plastic solids can be placed into more than one enclosed structure, such as existing building that are newly constructed or repurposed existing structures. The second quantity of plastic solids is present as a non-enclosed pile, housed the at least one first enclosed structure, or housed in at least one separate, second enclosed structure. For example, the first and second quantities of plastic solids can be placed within the same enclosed structure that has been partitioned, such as with one or more walls (e.g., concrete walls) so that there is no commingling between the first and second quantities of plastic solids. The first and second enclosed structures can be positioned in series (in which the structures are aligned lengthwise) or in parallel (in which the structures lengthwise are laterally spaced apart) relative to each other. However, it is within the scope of the technology for the first and second quantities of plastic solids to be housed in a common enclosed structure without the quantities being commingled. For example, the first and second quantities of plastic solids can be located in series (i.e., deposited adjacent opposed ends of the enclosed structure and separated by a wall extending transversely to the length of the enclosed structure). Alternatively the first quantity of plastic solids may be located in parallel relative to the second quantity of plastic solids (i.e., disposed on opposite sides of a wall extending parallel to the length of the enclosed structure). In one particular embodiment or in combination with any of the mentioned embodiments, the first enclosed structure is located less than 1609.34 m (one mile), less than 1371.60 m (1500 yards), less than 1143 m (1250 yards), less than 914.40 m (1000 yards), less than 685.80 m (750 yards), less than 457.20 m (500 yards), less than 228.60 m (250 yards), or less than 91.44 m (100 yards) from the second enclosed structure.

In one embodiment or in combination with any of the mentioned embodiments, the first and/or second enclosed structures each comprise an overhead conveying system operable to deposit the a respective quantity of plastic solids into one or more piles within the structure or directly into a conveyor device configured to transport the plastic solids to a downstream chemical recycling process.

Figure 11:
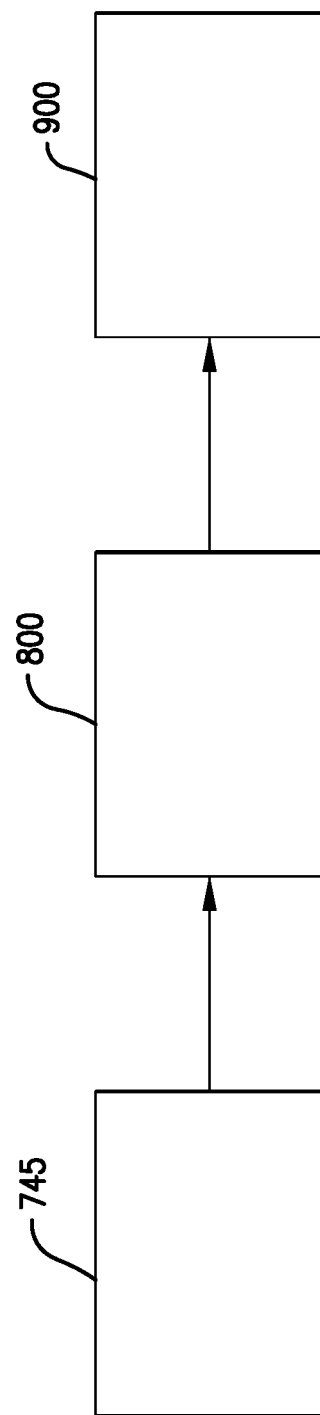
FIG. 11 depicts an arrangement of a waste plastics separation system, a particulate plastic solids handling facility, and a chemical recycling facility according to one embodiment of the present invention.

FIG. 11 depicts another embodiment in which a facility for handling plastic solids 800 is located in between a waste plastic separation system 745 and a plastic chemical recycling facility 900. The waste plastic separation system 745 can be any process, system, or apparatus described herein that is configured to separate mixed waste plastic into at least one stream that is enriched in polyethylene terephthalate and at least one stream that is depleted in polyethylene terephthalate. One or more of these output streams from the waste plastic separation system 745 is delivered to the plastic solids handling facility 800. As described in greater detail below, the plastic solids handling facility 800 can be used as a transfer and/or storage station for particulate plastic solids on their way to a plastic chemical recycling facility 900.

Figure 12:
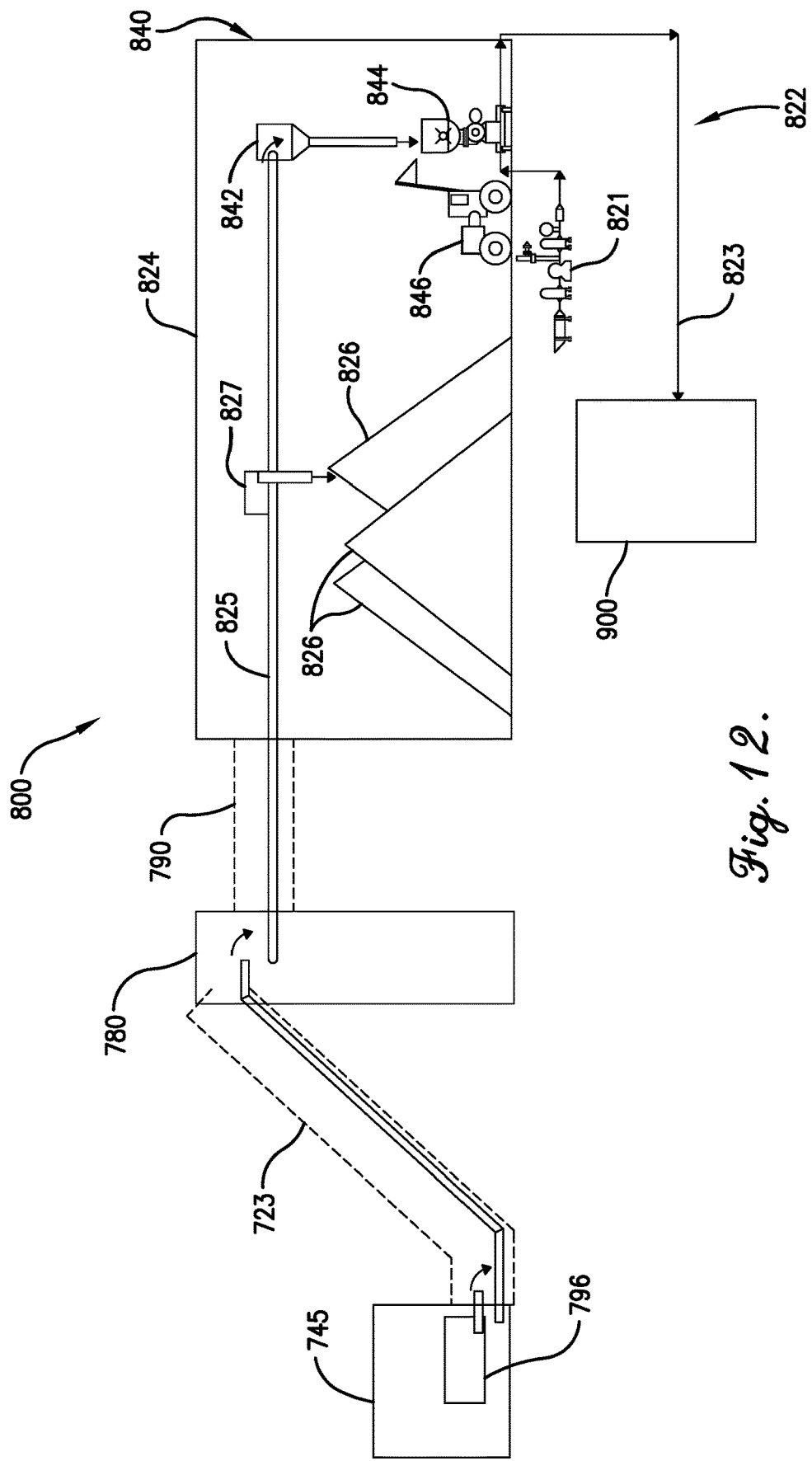
FIG. 12 depicts a particulate plastic solids handling facility and process according to one embodiment of the present invention.

In one embodiment or in combination with any of the mentioned embodiments, the facility for handling plastic solids 800 separated from a mixed plastic waste comprises an enclosed structure, such as any enclosed structure described herein, and an elongate overhead conveyor associated with the enclosed structure. FIG. 12 schematically depicts an exemplary plastic solids handling facility 800. The plastic solids handling facility 800 can be co-located with the waste plastic separation system 745. The plastic solids handling facility can be located less than 1609.34 m (one mile), less than 1371.60 m (1500 yards), less than 1143 m (1250 yards), less than 914.40 m (1000 yards), less than 685.80 m (750 yards), less than 457.20 m (500 yards), less than 228.60 m (250 yards), or less than 91.44 m (100 yards) from the waste plastic separation system.

Also, as with the embodiments described above, the facility for handling plastic solids 800 may comprise at least first 824 and second 834 enclosed structures (see FIG. 13) configured as described herein and configured to process any of the particulate plastic solids streams described herein. However, in one particular embodiment or in combination with any of the mentioned embodiments, the plastic solids facility 800 comprises a first enclosed structure 824 that is configured to receive a polyethylene terephthalate enriched stream 820 from a mixed plastic waste separation system 745 within the particulate plastic solids facility. The plastics solids facility 800 may also comprise a second enclosed structure 834 (see FIG. 13) that is configured to receive a polyethylene terephthalate depleted stream 830 from a mixed plastic waste separation system 745 within said particulate plastic solids facility 800.

As shown in FIG. 12, a conveyor system 723 may be used to transport particulate plastic solids from the waste plastic separation system 745 to the plastic solids handling facility 800, and in the embodiment shown in FIG. 12, to an elongate overhead conveyor 825 of in the first enclosed structure 824. The conveyor system 723 may optionally include a transfer tower 780, one or more bridges 790, or other structures needed or desired to effectively transport the particulate plastic solids. The convey system can be mechanical or pneumatic. The elongate overhead conveyor 825 is configured to selectively deposit a stream of particulate plastic solids into a plastic solids transport system 840 and/or at least one particulate plastic solids inventory pile 826 at different locations along the length of the overhead conveyor 825. In one embodiment or in combination with any of the mentioned embodiments, the overhead conveyor 825 can be located within and/or extend through the interior of the enclosed structure 824. Alternatively, the overhead conveyor 825 can be installed exterior to the enclosed structure 824, but be provided with one or more chutes, ports, conduit sections, or the like that communicate with the interior of the structure 824. Therefore, two or more particulate plastic solids inventory piles 826 can be deposited so as to be arranged in parallel or in series within a single enclosed structure or in adjacent enclosed structures as described above.

In one embodiment or in combination with any of the mentioned embodiments, the overhead conveyor 825 extends at least 50%, at least 60%, at least 70%, at least 80%, or at least 90%, or the entire length of the structure 824. In one other embodiment or in combination with any of the mentioned embodiments, the overhead conveyor 825 extends substantially the length of the enclosed structure 824. In still one other embodiment or in combination with any of the mentioned embodiments, the overhead conveyor 825 extends not more than 95%, not more than 90%, not more than 85%, not more than 80%, not more than 75%, not more than 70%, not more than 65%, or not more than 60% of the length of the enclosed structure 824. The relationship of the conveyor 825 length to the enclosed structure 824 length can be dependent upon the angle of repose of the quantity of particulate plastic solids being deposited by the conveyor 825 within the enclosed structure 824. In one such embodiment or in combination with any of the mentioned embodiments, the conveyor 825 length may be substantially the entire length of the enclosed structure 824 less the distance from the center of the pile 826 to its outermost bottom margin.

In one embodiment or in combination with any of the mentioned embodiments, the elongate overhead conveyor 825 may comprise any type of conveyor described herein such as a belt conveyor, a pneumatic conveyor, a vibrating conveyor, or a screw conveyor. In one particular embodiment or in combination with any of the mentioned embodiments, the overhead conveyor 825 comprises a belt conveyor that includes one or more moveable gates or wipers disposed along the conveyor's length that are configured to divert at least a portion of the particulate plastic solids traveling along the conveyor into, for example, a chute that directs the particulate plastic solids toward the enclosed structure's floor to form a pile 826 of particulate plastic solids. In one other embodiment or in combination with any of the mentioned embodiments, the overhead conveyor 825 comprises a shiftable member, such as a trip stacker 827, that is configured to traverse at least a portion of the length of the conveyor 825 and to divert at least a portion of the particulate plastic solids traveling on the conveyor toward the enclosed structure's floor. The overhead conveyor 825 and structure for diverting the particulate plastic solids can be configured such that the solids are directed toward the enclosed structure's floor at an angle so that the peak of the resulting pile 826 does not reside directly below the overhead conveyor 825.

As noted above, the elongate conveyor 825 is configured to selectively deposit a stream of particulate plastic solids being carried thereby in to at least one inventory pile 826 within the enclosed structure 824. The at least one inventory pile 826 may comprise any quantity of particulate plastic solids described herein. The purpose and function of the at least one inventory pile 826 is discussed further below, but generally, the at least one inventory pile 826 is used when generation of particulate plastic solids by the waste plastic separation system 745 does not entirely align with the demand for particulate plastic solids by a downstream plastic chemical recycling process 900.

In one embodiment or in combination with any of the mentioned embodiments, generally, the at least one inventory pile 826 comprises a quantity of particulate plastic solids enriched in polyethylene terephthalate (as shown in FIG. 12) and/or a quantity of particulate plastic solids depleted in polyethylene terephthalate (not shown). These quantities of particulate plastics solids are generated by a waste plastic separation system 745, which may be co-located with the plastic solids handling facility 800, although this need not always be the case.

The elongate conveyor 825 is also configured to selectively deposit a stream of particulate plastic solids being carried thereby into a plastic solids transport system 840. In one embodiment or in combination with any of the mentioned embodiments, the plastic solids transport system comprises one or more conveyors that interconnect the plastic solids handling facility 800, and the enclosed structure 824 specifically, with a downstream plastics chemical recycling process 900. The plastic solids transport system 840 can comprise a first conveyor 822 configured to transport a polyethylene terephthalate enriched stream in between the particulate plastic solids handling facility 800 and a solvolysis facility 920 (see FIG. 13). The plastic solids transport system 840 can further comprise a second conveyor 832 configured to transport a polyethylene terephthalate depleted stream in between the plastic solids handling facility 800 and at least one of a partial oxidation gasification facility 930 and a pyrolysis facility 940 (see FIG. 13).

In one embodiment or in combination with any of the mentioned embodiments, the plastic solids transport system 840 comprises a device 842 configured to receive particulate plastic solids from the plastic solids handling facility 800 and conveying apparatus 822 for transporting the particulate plastic solids to a downstream plastic chemical recycling process 900. The receiving device 842 can comprise a bin or hopper that is operably connected to a particulate plastic feeder 844, such as a paddle feeder (see FIG. 12), which initiates transport from the handling facility 800 to downstream recycling processes. A front-end loader 846 or similar mechanism may also be used to load the particulate plastic solids into the particulate plastic feeder 844. The paddle feeder is distinguished from other mechanisms that may also be used to move or load the particulate plastic solids within the scope of the technology, including "loss in weight" feeders that may include a screw or belt conveyor connected to the bottom of a hopper. The particulate plastic feeder 844 then directs the particulate plastic solids to the conveying apparatus 822 for transport to the plastic chemical recycling process 900.

In one embodiment or in combination with any of the mentioned embodiments, the conveying apparatus 822 comprises any conveyor suitable for transport of particulate plastic solids as described herein. Exemplary conveyors can include pneumatic conveyors, belt conveyors, bucket conveyors, vibrating conveyors, screw conveyors, cart-on-track conveyors, tow conveyors, trolley conveyors, chain conveyors, and trucks. In one particular embodiment or in combination with any of the mentioned embodiments, the conveying apparatus 822 comprises a pneumatic conveyor which comprises a pneumatic plastic-conveying conduit 823 that interconnects the plastic solids handling facility 800 and the plastic chemical recycling facility 900, a blower 821 which provides the motive force for transport of the particulate plastic solids within the conduit 823, and optionally, at least one dust collector (not shown), which may be located at or near the distal end of the conduit 823.

In one embodiment or in combination with any of the mentioned embodiments, the plastic chemical recycling facility 900 comprises a solvolysis facility 920, a partial oxidation ("POX") gasifier facility 930, or a pyrolysis facility 940. The plastic chemical recycling facility 900 can also comprise an energy generation/production facility. The solvolysis facility 920 may comprise an ester solvolysis facility, such as a methanolysis or PET solvolysis facility. The plastic solids handling facility 800 can be located less than 1609.34 m (one mile), less than 1371.60 m (1500 yards), less than 1143 m (1250 yards), less than 914.40 m (1000 yards), less than 685.80 m (750 yards), less than 457.20 m (500 yards), less than 228.60 m (250 yards), or less than 91.44 m (100 yards) from the plastic chemical recycling facility 900.

Figure 13:
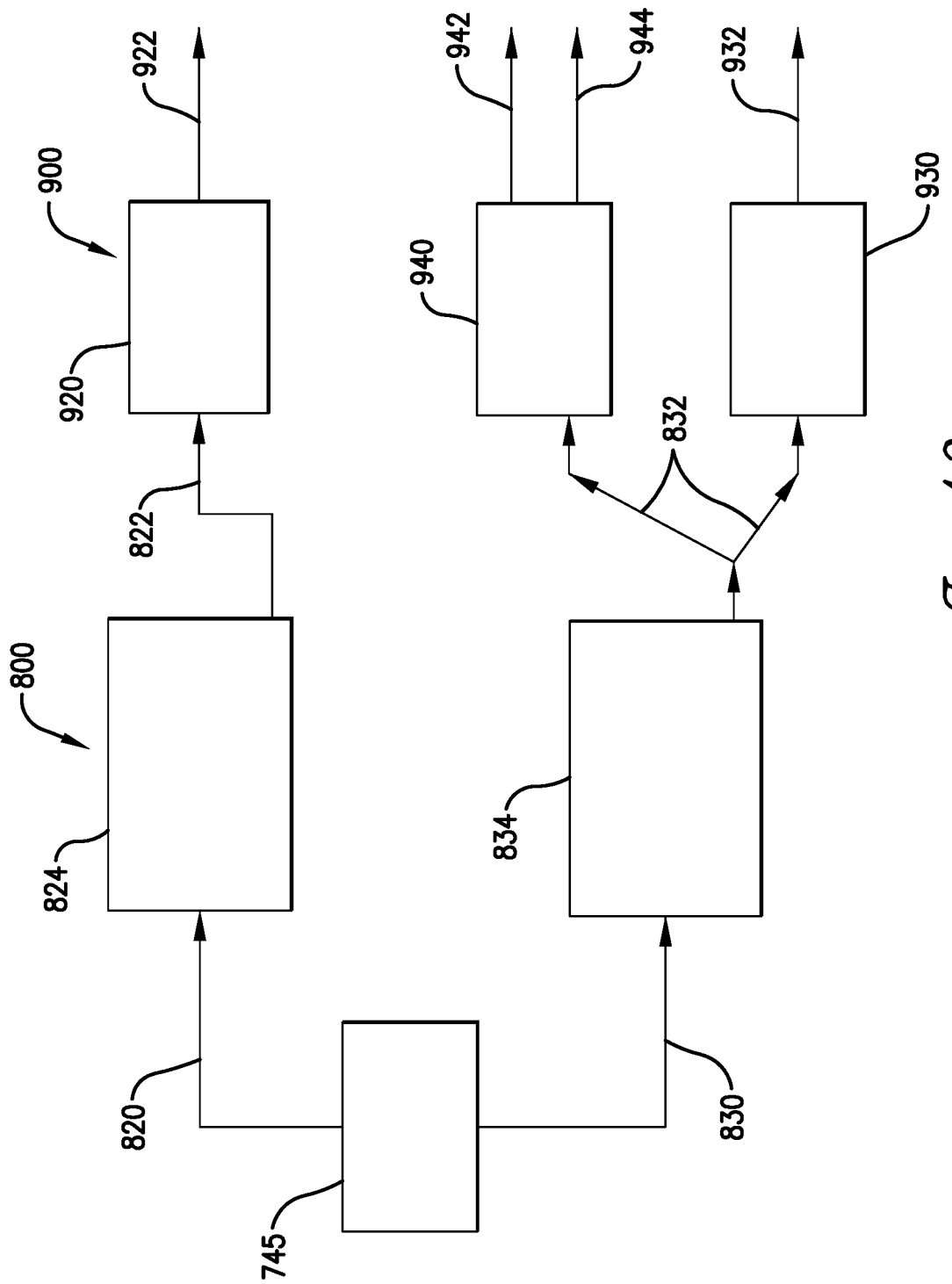
FIG. 13 depicts general process for chemical recycling of MPW according to one embodiment of the present invention.

FIG. 13 schematically depicts an exemplary plastic solids recycling plant that comprises a waste plastic separation system 745 that is operable to produce a particulate plastic solids stream that is enriched in polyethylene terephthalate 820 and a particulate plastic solids stream that is depleted in polyethylene terephthalate 830. Each stream is then conveyed to respective enclosed structures 824, 834, which may comprise any of the enclosed structures described herein that are configured to handle and process such stream. In one particular embodiment or in combination with any of the mentioned embodiments, the enclosed structures comprise the enclosed structure depicted in FIG. 12, which comprises an overhead conveyor 825 that is operable to deposit particulate plastic solids within the structure or to deposit particulate plastic solids within a plastic solids transport system.

Each enclosed structure 824, 834 is configured to provide a stream of particulate plastic solids to at least one respective downstream plastic chemical recycling facility via a particulate plastic solids transport system that is located between the respective structure and facility. In one embodiment or in combination with any of the mentioned embodiments, a first enclosed structure 824 is configured to supply a stream of particulate plastic solids to a solvolysis process 920 in which various solvolysis products 922, including esters, alcohols, and solvolysis coproducts such as heavy organic solvolysis coproducts and light organic solvolysis coproducts, are produced. A particulate plastic solids stream that is enriched in polyethylene terephthalate can be supplied to a PET solvolysis process in which various products are produced including dimethyl terephthalate (DMT), ethylene glycol (EG), methanol, and methanolysis coproducts such as light organic methanolysis coproducts and/or heavy organic methanolysis coproducts.

In one embodiment or in combination with any of the mentioned embodiments, the second enclosed structure 834 is configured to provide a stream of particulate plastic solids, especially a stream that is depleted in polyethylene terephthalate and possibly enriched in polyolefins, to at least one of a POX gasifier facility 930, a solvolysis facility 920, or a pyrolysis facility 940 via a second particulate plastic solids transport system (such as conveyor 832). The POX gasifier facility 930 can be configured to receive solids, optionally in combination with solid fossil fuels such as coal or PET-coke (petroleum coke). The POX gasifier facility 930 is operable to produce synthesis gas 932, optionally a syngas stream of a quality suitable to make chemicals such as methanol or acetyl streams. The pyrolysis facility 940 can be operable to produce various pyrolysis products and byproducts such as pyrolysis gas 942, pyrolysis liquid (such as pyrolysis oil) 944, and pyrolysis residue such as pyrolysis heavy waxes and pyrolysis char (not shown). The solvolysis facility 920 may be configured to decompose at least a portion of the plastic solids (usually PET) in the presence of a solvent to form a principal carboxyl product, such as dimethyl terephthalate, and a principal glycol product, such as ethylene glycol.

In one embodiment or in combination with any of the mentioned embodiments, the chemical recycling facility 900 may also comprise an energy generation/production facility. As used herein, an "energy generation/production facility" is a facility that generates energy (i.e., thermal energy) from a feedstock via chemical conversion (e.g., combustion) of the feedstock.

Any type of energy generation/production facility may be used. In one embodiment or in combination with any of the mentioned embodiments, the energy generation/production facility 900 may comprise at least one furnace or incinerator. The incinerator may be gas-fed, liquid-fed, or solid-fed, or may be configured to accept a gas, liquid, or solid. In one embodiment or in combination with any of the mentioned embodiments, the incinerator may be configured or may accept combinations of solids, gases, and liquids. Specific examples of incinerators or furnaces can include, but are not limited to, rotary kilns and liquid chemical destructors. Temperatures of combustion within the furnace or incinerator can be at least 800, at least 825, at least 850, at least 875, or 900° C. and/or not more than 1200, not more than 1175, not more than 1150, or not more than 1125° C., or from 800 to 1200° C., 850 to about 1150° C., or 900 to 1125° C.

The incinerator or furnace may be configured to thermally combust at least a portion of the hydrocarbon components in the feed stream with an oxygen agent stream. In one embodiment or in combination with any of the mentioned embodiments, the oxygen agent stream comprises at least 5, at least 10, at least 15, at least 20, or at least 25 and/or not more than 70, not more than 65, not more than 60, not more than 55, not more than 50, not more than 45, not more than 40, not more than 35, not more than 30, or not more than 25 mole percent oxygen, based on the total moles of oxygen agent stream, or it can include an amount in the range of from 5 to 70 mole percent, 10 to 55 mole percent, or 10 to 25 mole percent, based on the total moles of the stream. Other components of the oxygen agent stream can include, for example, nitrogen, or carbon dioxide. In other embodiments, the oxygen agent stream comprises air.

In the energy generation/production facility, at least 50, at least 60, at least 70, at least 80, at least 90, or at least 95 weight percent of the feed stream introduced therein can be combusted to form energy and a stream of combustion gases such as water, carbon monoxide, carbon dioxide, and combinations thereof. At least a portion of the feed stream may be treated to remove compounds such as sulfur and/or nitrogen-containing compounds, to minimize the amount of nitrogen and sulfur oxides in the combustion gas stream. In one embodiment or in combination with any of the mentioned embodiments, at least a portion of the energy generated by the energy production/generation facility may be used to directly or indirectly heat a process stream. For example, in one embodiment or in combination with any of the mentioned embodiments, at least a portion of the energy may be used to heat water to form steam, and/or to heat steam and form superheated steam. At least a portion of the energy generated may be used to heat a stream of heat transfer medium (such as, for example, THERMINOL®), which itself, when warmed, may be used to transfer heat to one or more process streams. At least a portion of the energy may be used to directly heat a process stream.

The plastic solids recycling plant depicted in FIG. 13 can be operated in a number of ways. In one embodiment or in combination with any of the mentioned embodiments, the particulate plastic solids are continuously deposited into the particulate plastic solids transport system 840 while the plastic chemical recycling facility 900 is in operation. In such mode of operation, particulate plastic solids carried, for example, by the overhead conveyor 825 are directly transferred to the particulate plastic solids transport system 840 without first being placed into an inventory pile 826 within the enclosed structure(s) 824, 834.

In one other embodiment or in combination with any of the mentioned embodiments, the particulate plastic solids are deposited into at least one inventory pile 826 when the chemical plastic recycling facility 900 is not in operation. When no demand exists for the particulate plastic solids received from the waste plastic separation process 745, the particulate plastic solids can be placed into one or more inventory piles 826 by diverting the solids being carried by the overhead conveyor 825 toward the floor of the enclosed structure.

In one other embodiment or in combination with any of the mentioned embodiments, the particulate plastic solids are loaded into the particulate plastic solids transport system 840 from the at least one inventory pile 826, which was previously formed within the enclosed structure(s) 824, 834, while the plastic chemical recycling facility 900 is in operation. In certain instances, the waste plastic separation process 745 is not producing particulate plastic solids, but it is desirable to continue to operate the plastic chemical recycling facility 900. Therefore, particulate plastic solids are pulled from the one or more inventory piles 826 present within the enclosed structure(s) 824, 834 and fed to the particulate plastic solids transport system 840. This can be accomplished using a front-end loader 846 or a belt loader to deposit particulate plastic solids into a feed bin or hopper of the transport system 840. However, other apparatus for accomplishing this operation may also be used. When using a front-end loader, for example, the transfer of particulate plastic solids from the at least one inventor pile to the particulate plastic solids transport system is performed in a batchwise manner, as contrasted with the use of a belt loader to continuously supply the transport system.

In one other embodiment or in combination with any of the mentioned embodiments, the particulate plastic solids are simultaneously deposited into the particulate plastic solids transport system 840 from both the overhead conveyor 825 and the at least one inventory pile 826. In certain instances, the rate of particulate plastic solids from the waste plastic separation process 745 is insufficient to supply the entire demand for particulate plastic solids by the plastic chemical recycling facility 900. Therefore, particulate plastic solids may be deposited directly from the overhead conveyor 825 into the particulate plastic solids transport system 840 and be pulled from the one or more inventor piles 826 as described above.

Figure 15:
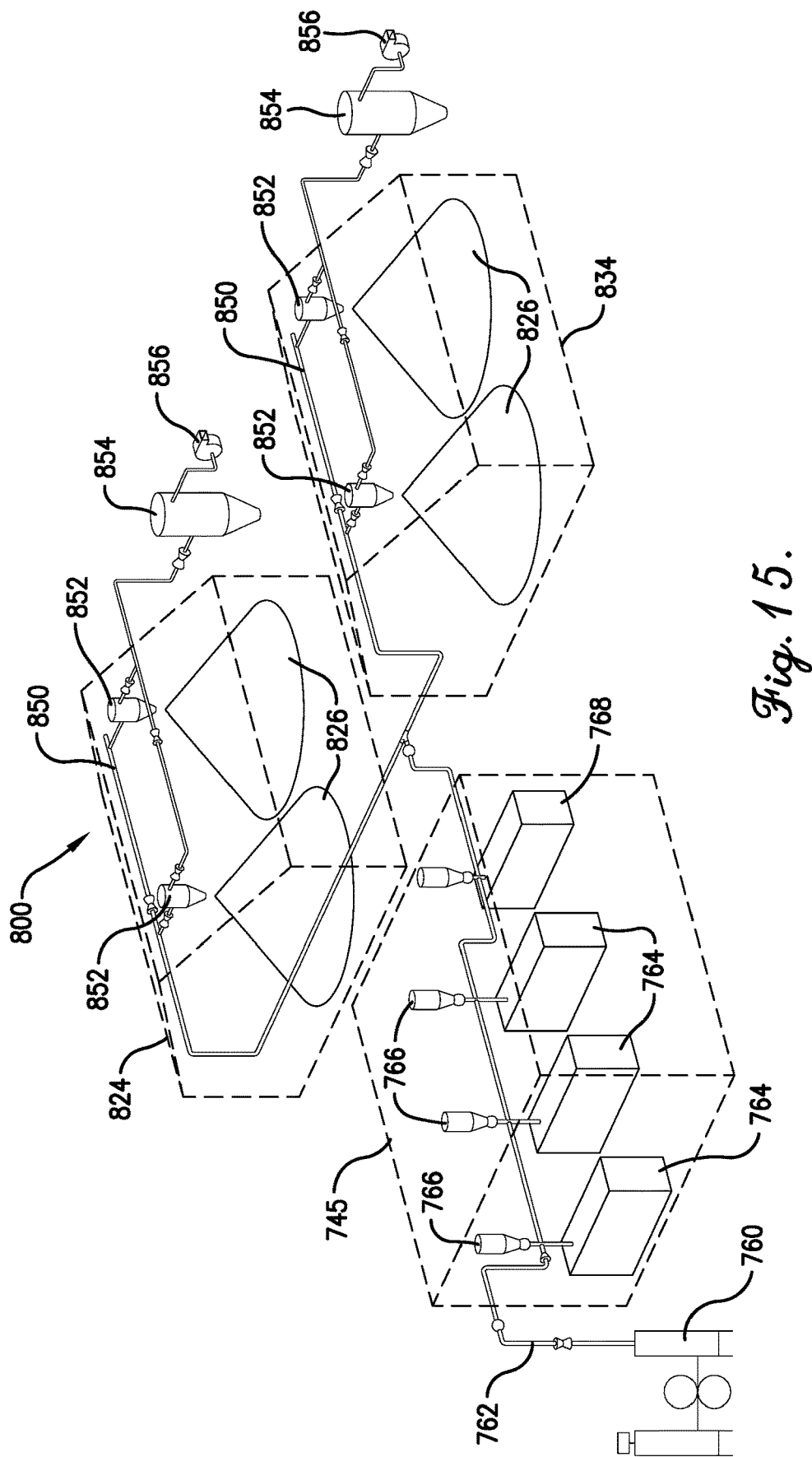
FIG. 15 depicts a particulate plastic solids handling facility and process according to one embodiment of the present invention.

FIG. 15 schematically depicts an embodiment of a particulate plastic solids handling facility 800 that is similar in many respects to the facilities described above with regard to FIGS. 12 and 13. Particulate plastic solids handling facility 800 comprises a first enclosed structure 824 that is configured to receive a polyethylene terephthalate enriched stream from a mixed plastic waste separation system 745 within the particulate plastic solids facility. The particulate plastics solids handling facility 800 also comprise a second enclosed structure 834 that is configured to receive a polyethylene terephthalate depleted stream from mixed plastic waste separation system 745. The PET-enriched and PET-depleted streams may comprise respective particulate plastic solids according to any embodiment or combination of embodiments described herein.

As depicted in FIG. 15, the particulate plastic solids handling facility 800 is co-located with the waste plastic separation system 745 and particulate plastic materials transported therebetween via a conveyor system. The conveyor system can be any type of conveyor system described herein; however, the conveyor system in FIG. 15 is illustrated as pneumatic conveyor system.

The pneumatic conveyor system comprises a loader/blower assembly 760 configured to receive particulate plastic solids from, for example, a density separation process as described above. Assembly 760 is operably connected to plastic-conducting conduit 762. In one embodiment or in combination with any of the mentioned embodiments, the particulate plastic solids can comprise the output streams from a mixed plastic waste separation process, such as any density separation process described herein, and are transported through conduit 762 under the motive force supplied by assembly 760. The particulate plastic solids can comprise very fine particulates, which could present an explosion hazard. Therefore, the particulate plastic solids can be directed through one or more plastic densifiers 764, which can soften and aggregate the particulate plastic solids, and formed into larger particles e.g., pellets or granules, having reduced surface area/weight characteristics. The particles produced by the densifiers 764 can have at least one dimension that is greater than 2.54 cm (one inch), greater than 1.91 cm (0.75 inch), or greater than 1.27 cm (0.5 inch). The particles produced by the densifiers 764 can have at least one dimension that is 1.27 cm to 25.4 cm, 1.91 cm to 19.1 cm, or 2.54 cm to 12.7 cm. Valves 766 control the flow of particulate plastic solids between conduit 762 and densifiers 764. The particulate plastic solids exiting densifiers 764 can be passed through a screening device 768 to remove fines remaining in the particulate plastic solids stream. The particulate plastic solids departing mixed plastic waste separation system 745 are then directed toward one of enclosed structures 824, 834 depending upon the composition of the solids being transported. If the particulate plastics solids comprise a stream that is enriched with PET, the stream is directed into enclosed structure 824. If the particulate plastic solids comprise a stream that is depleted in PET, such as an olefin enriched stream, the stream is directed into enclosed structure 834. One or both of structures 834 can be equipped with a pneumatic overhead conveyor system comprising plastic-conducting conduit 850, and one or more cyclones 852 operably connected to conduit 850 and operable to deposit at least a portion of the particulate plastic solids carried within conduit into one or more particulate plastic solids inventory piles 826. Alternatively, the particulate plastic solids can bypass cyclones 852 and be conveyed to apparatus (see, e.g., particulate plastic feeder 844 from FIG. 12) configured to remove the particulate plastic solids from the enclosed structures 824, 834. Conduit 850 from each enclosed structure is also operably connected to dust collection apparatus 854, which also comprises a blower 856 supplying motive force for transporting the particulate plastic solids through conduit 850. The inventory plies 826 or particulate plastic solids that bypass being deposited into an inventory pile can be further processed and handled according to any embodiment or combination of embodiments described herein.

In one embodiment or in combination with any of the mentioned embodiments, more than one downstream plastic chemical recycling facility is in operation. Therefore, particulate plastic solids from at least one of the enclosed structures is used to supply the recycling facilities. The first enclosed structure can handle or process a particulate plastic solids stream that is enriched in polyethylene terephthalate, and the second enclosed structure can handle or process a particulate plastic solids stream that is depleted in polyethylene terephthalate. The overhead conveyors associated with each enclosed structure can be configured to simultaneously deposit the particulate plastic solid streams into the first and second particulate plastic solids transport systems and/or the first and second inventory piles. Thus, the depositing of the polyethylene terephthalate enriched stream occurs simultaneously with the depositing of said polyethylene terephthalate depleted stream within the respective transport systems. However, the mode in which the particulate plastic solids are supplied from their respective enclosed structures does not always need to be the same, and it is contemplated that different modes may be used simultaneously. For example, the polyethylene terephthalate enriched particulate plastic solids may be fed to the first particulate plastic solids transport system directly from the overhead conveyor, whereas the polyethylene terephthalate depleted particulate plastic solids may be fed to the second particulate plastic solids transport system from the one or more inventory piles of such solids. It is also possible for one enclosed structure to be depositing particulate solid plastic solids into one or more inventory piles, while another enclosed structure is not receiving any particulate plastic solids from the waste plastic separation process.

Additional advantages of the various embodiments of the invention will be apparent to those skilled in the art upon review of the disclosure herein. It will be appreciated that the various embodiments described herein are not necessarily mutually exclusive unless otherwise indicated herein. For example, a feature described or depicted in one embodiment may also be included in other embodiments, but is not necessarily included. Thus, a variety of combinations and/or integrations of the specific embodiments are encompassed by the disclosures provided herein.

EXAMPLE

The following example sets forth a process for separating plastic according to one embodiment of the present invention. It is to be understood, however, that this example is provided by way of illustration and nothing therein should be taken as a limitation upon the overall scope of the invention.

In this example, various mixed plastic waste feedstocks were fed to a separation process comprising a first high density sink-float separation stage (target separation density of 1.4 g/cc) followed by a second low density sink-float separation stage (target separation density of 1.3 g/cc), similar to the process shown in FIG. 4 and described above. Potassium carbonate was used to prepare the concentrated salt solutions for the sink-float stages. Table 1 below provides feedstock and product stream compositions for test runs using different feedstock sources having different plastic content and other waste components. The heavies-enriched stream (i.e., plastics stream having an average plastic density greater than 1.4 g/cc) is not shown in Table 1, since recovery of this stream was negligible in these tests runs. All percentages are given in weight percentages with the total weight of the stream taken as 100% by weight. Nylon content is provided based on measured nitrogen (N) atoms by weight.

TABLE 1

| Run | 1 | 2 | 3 | 4 |
|---|---|---|---|---|
| Feedstock Source | Mixed Waste | Reclaimer PET Waste | Curbside Waste | Reclaimer PET Waste |
| PET in Feed | 39.3% | 83.0% | 54.9% | 84.6% |
| Olefins in Feed | 28.6% | 7.5% | 35.1% | 6.0% |
| Non-Plastic Solids in Feed | 1.1% | 1.0% | 0.6% | 0.6% |
| Solubles in Feed | 31.0% | 8.5% | 9.4% | 9.2% |
| Total Feed (kg) | 121 | 240 | 766 | 350 |
| Feed Bulk Density (lb/cuft) | 13 | 12 | 19 | 21 |
| PET in PET-enriched Stream | 63.4% | 99.6% | 98.8% | 99.5% |
| N in PET-enriched Stream (%) | ND | ND | ND | ND |
| Cl in PET-enriched Stream (ppm) | 3500 | 311 | 287 | 85 |
| Al in PET-enriched Stream (ppm) | 7160 | 796 | 589 | N/A |
| Total PET-enriched Stream (kg) | 75 | 200 | 421 | 286.1 |
| PET in PO-enriched Stream | 6.4% | 9.6% | 1.8% | 21.6% |
| N in PO-enriched Stream (%) | ND | 1.11% | 1.65% | 1.27% |
| Cl in PO-enriched Stream (ppm) | 1500 | 300 | 100 | 100 |
| Al in PO-enriched Stream (ppm) | 12600 | 2000 | 545 | N/A |
| Total PO-enriched Stream (kg) | 37 | 20 | 269 | 24 |
| PET Yield Loss to PO-enriched Stream (%) | N/A | N/A | 1.2% | 1.8% |
| Cardboard in Feed (as solubles) | 24.40% | 1.10% | 0.00% | 0.00% |
| Comments | High cardboard | — | — | Ran out of salt |

| Run | 5 | 6 | 7 | 8 |
|---|---|---|---|---|
| Feedstock Source | Institutional Waste | Reclaimer PET Waste | Curbside Waste | Reverse Vending Machine Material |
| PET in Feed | 67.5% | 88.9% | 55.0% | 93.3% |
| Olefins in Feed | 30.8% | 7.4% | 36.2% | 6.3% |
| Non-Plastic Solids in Feed | 0.8% | 1.5% | 1.9% | 0.4% |
| Solubles in Feed | 0.8% | 2.2% | 6.9% | 0.0% |
| Total Feed (kg) | 59 | 3900 | N/A | 3100 |
| Feed Bulk Density (lb/cuft) | 19 | 20 | N/A | 18 |
| PET in PET-enriched Stream | 98.9% | 99.6% | 99.1% | 98.8% |
| N in PET-enriched Stream (%) | 0.01% | 0.01% | 0.00% | 73 |
| Cl in PET-enriched Stream (ppm) | 313 | 200 | 1467 | |
| Al in PET-enriched Stream (ppm) | 158 | 68 | N/A | |
| Total PET-enriched Stream (kg) | 39.5 | 3455.5 | N/A | 2558.32 |
| PET in PO-enriched Stream | 4.1% | 7.7% | 14.0% | 69.5% |
| N in PO-enriched Stream (%) | 0.01% | 0.04% | 0.02% | 345 |
| Cl in PO-enriched Stream (ppm) | 52 | 560 | 288 | 51 |
| Al in PO-enriched Stream (ppm) | 1300 | 1175 | 1100 | 2100 |
| Total PO-enriched Stream (kg) | 18.5 | 299.9 | N/A | 523.6 |
| PET Yield Loss to PO-enriched Stream (%) | 0.7% | 0.7% | 9% | 11% |
| Cardboard in Feed (as solubles) | 0.00% | 0.00% | 0.00% | 0.90% |
| Comments | — | High Cl | — | High film |

Antimicrobial data was also collected for various samples of mixed plastic waste feedstocks to demonstrate that the use of potassium carbonate in the density separation process described above also provided an antimicrobial effect without the need to use of a separate antimicrobial agent. Samples 1-4 were treated with the potassium carbonate media used in the aforementioned density separation process. Antimicrobial data of the treated and untreated plastic was collected using the testing procedures described herein. Bacteria counts were made using cultures grown on plate count agar (PCA) substrates. Fungi counts were made using cultures grown on Sabouraud dextrose agar (SDA) substrates. The results are provided in Table 2, below. As can be seen, the above-described density separation process was shown to be very effective in reducing bacteria and fungi counts within the plastic.

TABLE 2

| | Sample 1 Mixed Plastic Reclamation Waste | Sample 2 Mixed Plastic Bale | Sample 3 PET Wet Fines | Sample 4 Green Bottle Bale |
|---|---|---|---|---|
| % Bacteria Reduction | 99.9 | 99.3 | 100 | 87.8 |
| % Fungi reduction | 99.3 | 99.9 | 100 | 98.4 |
| Starting PCA [CFU/g] | 1.59E+08 | 1.13E+05 | 2.21E+05 | 2.30E+03 |
| Ending PCA [CFU/g] | 4.00E+03 | 7.50E+02 | <10 | 2.80E+02 |
| Starting SDA [CFU/g] | 7.05E+03 | 1.26E+05 | 2.30E+04 | 6.10E+02 |
| Ending SDA [CFU/g] | 5.00E+01 | 6.50E+01 | <10 | <10 |

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the term "biowaste" refers to material derived from living organisms or of organic origin. Exemplary biowaste materials include, but are not limited to, cotton, wood, saw dust, food scraps, animals and animal parts, plants and plant parts, and manure.

As used herein, the term "caustic" refers to any basic solution (e.g., strong bases, concentrated weak bases, etc.) that can be used in the technology as a cleaning agent, for killing pathogens, and/or reducing odors.

As used herein, the term "centrifugal density separation" refers to a density separation process where the separation of materials is primarily cause by centrifugal forces.

As used herein, the term "chemical recycling" refers to a waste plastic recycling process that includes a step of chemically converting waste plastic polymers into lower molecular weight polymers, oligomers, monomers, and/or non-polymeric molecules (e.g., hydrogen and carbon monoxide) that are useful by themselves and/or are useful as feedstocks to another chemical production process(es).

As used herein, the term "chemical recycling facility" refers to a facility for producing a recycle content product via chemical recycling of waste plastic. A chemical recycling facility can employ one or more of the following steps: (i) preprocessing, (ii) solvolysis, (iii) pyrolysis, (iv) cracking, and/or (v) POX gasification.

As used herein, the term "co-located" refers to the characteristic of at least two objects being situated on a common physical site, and/or within 1609.34 m (one mile) of each other.

As used herein, the term "compatibilizer" refers to an agent capable of combining at least two otherwise immiscible polymers together in a physical mixture (i.e., blend).

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the term "conducting" refers to the transport of a material in a batchwise and/or continuous manner.

As used herein, the term "cracking" refers to breaking down complex organic molecules into simpler molecules by the breaking of carbon-carbon bonds.

As used herein, the term "D90" describes the diameter where ninety percent of a distribution has a smaller particle size and ten percent has a larger particle size.

As used herein, the term "density separation process" refers to a process for separating materials based, at least in part, upon the respective densities of the materials. Moreover, the terms "low-density separation stage" and "high-density separation stage" refer to relative density separation processes, wherein the low-density separation has a target separation density less than the target separation density of the high-density separation stage.

As used herein, the term "depleted" refers to having a concentration (on a dry weight basis) of a specific component that is less than the concentration of that component in a reference material or stream.

As used herein, the term "directly derived" refers to having at least one physical component originating from waste plastic.

As used herein, the term "enriched" refers to having a concentration (on a dry weight basis) of a specific component that is greater than the concentration of that component in a reference material or stream.

As used herein, the term "halide" refers to a composition comprising a halogen atom bearing a negative charge (i.e., a halide ion).

As used herein, the term "halogen" or "halogens" refers to organic or inorganic compounds, ionic, or elemental species comprising at least one halogen atom.

As used herein, the terms "having," "has," and "have" have the same open-ended meaning as "comprising," "comprises," and "comprise" provided above.

As used herein, the term "heavy organic methanolysis coproduct" refers to a methanolysis coproduct with a boiling point greater than DMT.

As used herein, the term "heavy organic solvolysis coproduct" refers to a solvolysis coproduct with a boiling point greater than the principal terephthalyl product of the solvolysis facility.

As used herein, the terms "including," "include," and "included" have the same open-ended meaning as "comprising," "comprises," and "comprise" provided above.

As used herein, the term "indirectly derived" refers to having an assigned recycle content i) that is attributable to waste plastic, but ii) that is not based on having a physical component originating from waste plastic.

As used herein, the term "isolated" refers to the characteristic of an object or objects being by itself or themselves and separate from other materials, in motion or static.

As used herein, the term "light organic methanolysis coproduct" refers to a methanolysis coproduct with a boiling point less than DMT.

As used herein, the term "light organic solvolysis coproduct" refers to a solvolysis coproduct with a boiling point less than the principal terephthalyl product of the solvolysis facility.

As used herein, the term "manufactured cellulose products" refers to nonnatural (i.e., manmade or machine-made) articles, and scraps thereof, comprising cellulosic fibers. Exemplary manufactured cellulose products include, but are not limited to, paper and cardboard.

As used herein, the term "methanolysis coproduct" refers to any compound withdrawn from a methanolysis facility that is not dimethyl terephthalate (DMT), ethylene glycol (EG), or methanol.

As used herein, a "mixed plastic waste," or MPW, refers to a post-industrial (or pre-consumer) plastic, a post-consumer plastic, or a mixture thereof. Examples of plastic materials include, but are not limited to, polyesters, one or more polyolefins (PO), and polyvinylchloride (PVC). Furthermore, as used herein, a "waste plastic" refers to any post-industrial (or pre-consumer) and post-consumer plastics, such as but not limited to polyesters, polyolefins (PO), and/or polyvinylchloride (PVC).

As used herein, the term "multi-component polymers" refers to articles and/or particulates comprising at least one synthetic or natural polymer combined with, attached to, or otherwise physically and/or chemically associated with at least one other polymer and/or non-polymer solid.

As used herein, the term "multi-layer polymers" refers to multi-component polymers comprising PET and at least one other polymer and/or non-polymer solid physically and/or chemically associated together in two or more physically distinct phases.

As used herein, the term "partial oxidation (POX) gasification" or "POX" refers to high temperature conversion of a carbon-containing feed into syngas (carbon monoxide, hydrogen, and carbon dioxide), where the conversion is carried out with an amount of oxygen that is less than the stoichiometric amount of oxygen needed for complete oxidation of carbon to CO2. The feed to POX gasification can include solids, liquids, and/or gases.

As used herein, "PET" means a homopolymer of polyethylene terephthalate, or polyethylene terephthalate modified with modifiers or containing residues or moieties of other than ethylene glycol and terephthalic acid, such as isophthalic acid, diethylene glycol, TMCD (2,2,4,4-tetramethyl-1,3-cyclobutanediol), CHDM (cyclohexanedimethanol), propylene glycol, isosorbide, 1,4-butanediol, 1,3-propane diol, and/or NPG (neopentylglycol), or polyesters having repeating terephthalate units (and whether or not they contain repeating ethylene glycol based units) and one or more residues or moieties of TMCD (2,2,4,4-tetramethyl-1, 3-cyclobutanediol), CHDM (cyclohexanedimethanol), propylene glycol, or NPG (neopentylglycol), isosorbide, isophthalic acid, 1,4-butanediol, 1,3-propane diol, and/or diethylene glycol, or combinations thereof.

As used herein, the term "overhead" refers to the physical location of a structure that is above a maximum elevation of quantity of particulate plastic solids within an enclosed structure.

As used herein, the term "partial oxidation (POX) gasification facility" or "POX Facility" refers to a facility that includes all equipment, lines, and controls necessary to carry out POX gasification of waste plastic and feedstocks derived therefrom.

As used herein, the term "PET solvolysis" refers to a reaction by which a polyester terephthalate-containing plastic feed is chemically decomposed in the presence of a solvent to form a principal terephthalyl product and a principal glycol product.

As used herein, the term "physical recycling" (also known as "mechanical recycling") refers to a waste plastic recycling process that includes a step of melting waste plastic and forming the molten plastic into a new intermediate product (e.g., pellets or sheets) and/or a new end product (e.g., bottles). Generally, physical recycling does not change the chemical structure of the plastic.

As used herein, the term "predominantly" means more than 50 percent by weight. For example, a predominantly propane stream, composition, feedstock, or product is a stream, composition, feedstock, or product that contains more than 50 weight percent propane.

As used herein, the term "preprocessing" refers to preparing waste plastic for chemical recycling using one or more of the following steps: (i) comminuting, (ii) particulating, (iii) washing, (iv) drying, and/or (v) separating.

As used herein, the term "pyrolysis" refers to thermal decomposition of one or more organic materials at elevated temperatures in an inert (i.e., substantially oxygen free) atmosphere.

As used herein, the term "pyrolysis char" refers to a carbon-containing composition obtained from pyrolysis that is solid at 200° C. and 1 atm.

As used herein, the term "pyrolysis gas" refers to a composition obtained from pyrolysis that is gaseous at 25° C.

As used herein, the term "pyrolysis heavy waxes" refers to C20+ hydrocarbons obtained from pyrolysis that are not pyrolysis char, pyrolysis gas, or pyrolysis oil.

As used herein, the term "pyrolysis oil" or "pyoil" refers to a composition obtained from pyrolysis that is liquid at 25° C. and 1 atm.

As used herein, the term "pyrolysis residue" refers to a composition obtained from pyrolysis that is not pyrolysis gas or pyrolysis oil and that comprises predominantly pyrolysis char and pyrolysis heavy waxes.

As used herein, the term "recycle content" refers to being or comprising a composition that is directly and/or indirectly derived from waste plastic.

Figure 14:
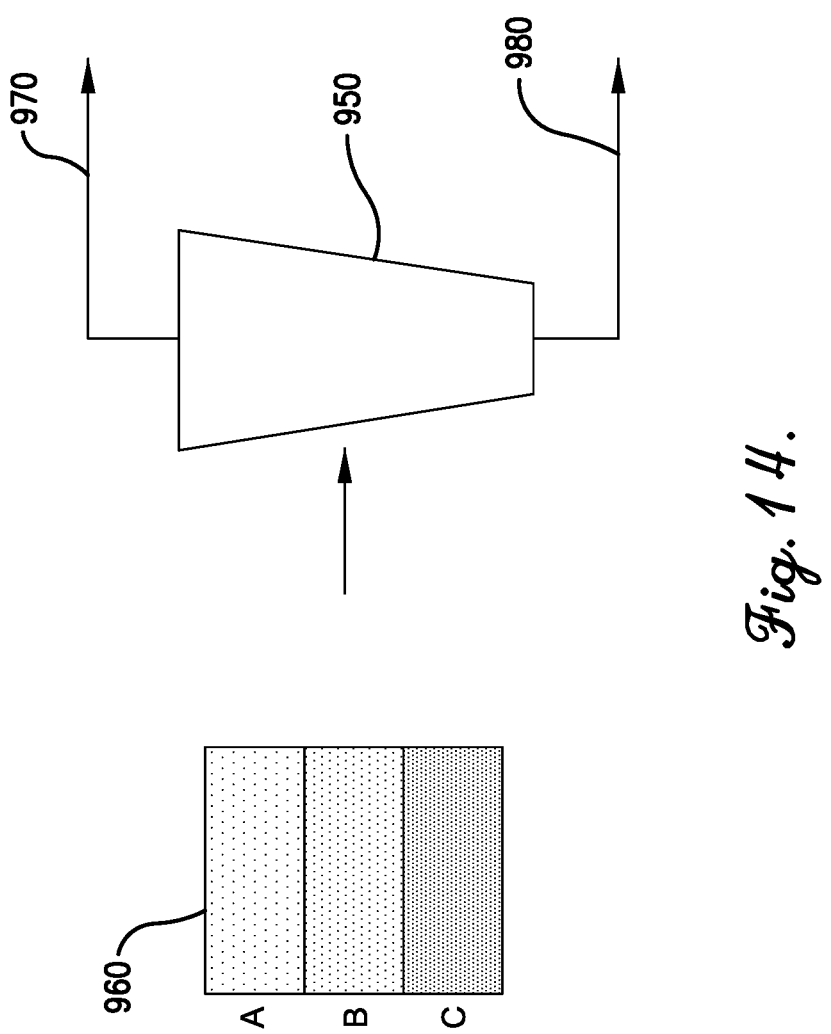
FIG. 14 depicts a general density separation stage according to one embodiment of the present invention.

As used herein, the term "separation efficiency" refers to FIG. 14, which shows separator 950, feedstock 960 (comprising light density component (A), medium density component (B), and high density component (C)), product stream 970 (for light density component (A)), and product stream 980 (for medium density component (B) and high density component (C)), wherein with respect to product stream 970 (per unit time):

Product Efficiency $_A$=Product weight of A/feed rate of A;

Contamination Efficiency $_B$=Product weight of B/Feed rate of B;

Contamination Efficiency $_C$=Product weight of C/Feed rate of C;

Product Purity $_A$=Product weight of A/(Product rate of A+B+C), and wherein with respect to product stream 980 (per unit time):

Contamination Efficiency $_A$=Product weight of A/Feed rate of A;

Product Efficiency $_B$=Product weight of B/Feed rate of B;

Product Efficiency $_C$=Product weight of C/Feed rate of C;

Product Purity=(Product weight of B+C)/(Product rate of A+B+C).

As used herein, the term "sink-float density separation" refers to a density separation process where the separation of materials is primarily caused by floating or sinking in a selected liquid medium.

As used herein, the term "solvolysis" or "ester solvolysis" refers to a reaction by which an ester-containing feed is chemically decomposed in the presence of a solvent to form a principal carboxyl product and a principal glycol product. Examples of solvolysis include, hydrolysis, alcoholysis, and ammonolysis.

As used herein, the term "solvolysis coproduct" refers to any compound withdrawn from a solvolysis facility that is not the principal carboxyl (terephthalyl) product of the solvolysis facility, the principal glycol product of the solvolysis facility, or the principal solvent fed to the solvolysis facility.

As used herein, the term "terephthalyl" refers to a molecule including the following group:

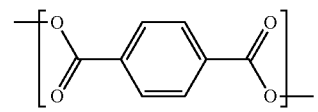

As used herein, the term "principal terephthalyl" refers to the main or key terephthalyl product being recovered from the solvolysis facility.

As used herein, the term "glycol" refers to a component comprising two or more —OH functional groups per molecule.

As used herein, the term "principal glycol" refers to the main glycol product being recovered from the solvolysis facility.

As used herein, the term "target separation density" refers to a density above which materials subjected to a density separation process are preferentially separated into the higher-density output and below which materials are separated in the lower-density output. The target separation density specifies a density value, wherein it is intended that all plastics and other solid materials having a density higher than the value are separated into the higher-density output and all plastics and other solid materials having a density lower than the value are separated into the lower-density output. However, the actual separation efficiency of the materials in a density separation process may depend on various factors, including residence time and relative closeness of the density of a particular material to the target density separation value.

As used herein, the term "waste plastic" refers to used, scrap, and/or discarded plastic materials, such as polyethylene terephthalate (PET), polyolefins (PO), and/or polyvinylchloride (PVC). The waste plastic may also include a number of minor plastic components that total less than 10 weight percent, and individually represent less than 1 weight percent, of the waste plastic content. In one embodiment or more embodiments, the waste plastic may also include a number of minor plastic components (other than PET and polyolefins) that total less than 50, less than 40, less than 30, less than 20, less than 15, or less than 10 weight percent, and optionally can individually represent less than 30, less than 20, less than 15, less than 10, or less than 1 weight percent, of the waste plastic content.

As used herein, the phrase "at least a portion" includes at least a portion and up to and including the entire amount or time period.

As used herein, "downstream" means a target unit operation, vessel, or equipment that:
a. is in fluid (liquid or gas) communication, or in piping communication, with an outlet stream from the radiant section of a cracker furnace, optionally through one or more intermediate unit operations, vessels, or equipment, or
b. was in fluid (liquid or gas) communication, or in piping communication, with an outlet stream from the radiant section of a cracker furnace, optionally through one or more intermediate unit operations, vessels, or equipment, provided that the target unit operation, vessel, or equipment remains within the battery limits of the cracker facility (which includes the furnace and all associated downstream separation equipment).

Claims not Limited to Disclosed Embodiments

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. An isolated quantity of particulate plastic solids comprising greater than 70% by weight polyethylene terephthalate (PET), and
    a) from 0.1% to 10% by weight polyvinyl chloride (PVC), and a moisture content of less than 4% by weight, or
    b) from 0.05% to 10% or 0.1% to 4% by weight halogens, or
    c) from 0.1% to 4% by weight polyvinyl chloride (PVC), and at least 0.1% by weight of solid materials that do not phase change below 270° C. and 1 atm;
    wherein a sampling of the airspace located no more than 3.0 m (10 feet) from the quantity of particulate plastic solids comprises less than 500 ppm of one or more of hydrogen sulfide, dimethyl sulfide, methanethiol, putrescine, cadaverine, trimethylamine, ammonia, acetaldehyde, acetic acid, butanoic acid, propanoic acid, and/or butyric acid.

2. The quantity of particulate plastic solids according to claim 1, wherein the quantity of particulate plastic solids has a microorganism content of less than $10^4$ CFU/g of said particulate plastic solids.

3. The quantity of particulate plastic solids according to claim 2, wherein the quantity of particulate plastic solids has not been treated with any antimicrobial agent other than an antimicrobial composition applied to the particulate plastic solids as a part of a density separation process, and the antimicrobial composition applied to the particulate plastic solids as a part of the density separation process is a caustic solution.

4. The quantity of particulate plastic solids according to claim 3, wherein no other antimicrobial agent has been used in the density separation process other than said caustic solution.

5. The quantity of particulate plastic solids according to claim 2, wherein the microorganism count is obtained without application of any antimicrobial agent after a last density separation stage, or after a drying step through application of external heat energy in a vessel, or after a last liquid density separation step.

6. The quantity of particulate plastic solids according to claim 1, wherein the monthly average D90 particle size within said quantity of particulate plastic solids having a volume of at least m³ (1000 yd³) is less than 2.54 cm (1 inch).

7. The quantity of particulate plastic solids according to claim 1, wherein said PVC or halogen content is determined on inventory piles having a volume of greater than 76.46 m3 (100 yd3).

8. A quantity of particulate plastic solids comprising at least 50% by weight polyolefins on a dry plastic basis, and:
    a) less than 10% by weight PET on a dry plastic basis, and less than 10,000 ppm of halogens, on a dry plastic basis, or
    b) a moisture content of less than 4% by weight, and at least 0.1% by weight nylons and/or at least 0.001% by weight multicomponent polymers on a dry plastic basis, or
    c) less than 10,000 ppm halogens on a dry plastic basis, and at least 0.1% by weight of solid materials that do not phase change below 270° C. and 1 atm; wherein a sampling of the airspace located no more than 3.0 m (10 feet) from the quantity of particulate plastic solids comprises less than 500 ppm of one or more of hydrogen sulfide, dimethyl sulfide, methanethiol, putrescine, cadaverine, trimethylamine, ammonia, acetaldehyde, acetic acid, butanoic acid, propanoic acid, and/or butyric acid.

9. The quantity of particulate plastic solids according to claim 8, wherein the quantity of particulate plastic solids has a microorganism content of less than $10^4$ CFU/g of said particulate plastic solids.

10. The quantity of particulate plastic solids according to claim 9, wherein the quantity of particulate plastic solids has not been treated with any antimicrobial agent other than an antimicrobial composition applied to the particulate plastic solids as a part of a density separation process, and no other antimicrobial agent has been used in the density separation process other than said caustic solution.

11. The quantity of particulate plastic solids according to claim 8, wherein the particulate plastic solids are derived from a mixed plastic waste feed, and wherein the level of microorganism count in the quantity of particulate plastic has been reduced by at least 90% relative to the mixed plastic waste feed.

12. The quantity of particulate plastic solids according to claim 8, wherein the quantity of particulate plastic solids is unpackaged.

13. The quantity of particulate plastic solids according to claim 8, wherein the quantity of particulate plastic solids is derived from a quantity of a mixed plastic waste having a volume of greater than 76.46 m3 (100 yd3).

* * * * *